United States Patent
Miura et al.

(10) Patent No.: US 12,359,838 B2
(45) Date of Patent: Jul. 15, 2025

(54) AIR CONDITIONER

(71) Applicant: DENSO CORPORATION, Kariya (JP)

(72) Inventors: Koji Miura, Kariya (JP); Hiroaki Kawano, Kariya (JP); Motohiro Yamaguchi, Kariya (JP); Kazuya Taniguchi, Kariya (JP); Yoshiki Kato, Kariya (JP); Masamichi Makihara, Kariya (JP); Takahiro Maeda, Kariya (JP); Kuniyoshi Tanioka, Kariya (JP); Toru Okamura, Kariya (JP); Naoya Makimoto, Kariya (JP); Atsushi Yamada, Kariya (JP); Kenta Kayano, Kariya (JP)

(73) Assignee: DENSO CORPORATION, Kariya (JP)

( * ) Notice: Subject to any disclaimer, the term of this patent is extended or adjusted under 35 U.S.C. 154(b) by 521 days.

(21) Appl. No.: 17/484,513

(22) Filed: Sep. 24, 2021

(65) Prior Publication Data

US 2022/0011006 A1 Jan. 13, 2022

Related U.S. Application Data

(63) Continuation of application No. PCT/JP2020/010925, filed on Mar. 12, 2020.

(30) Foreign Application Priority Data

Mar. 29, 2019 (JP) .................................. 2019-067628
Feb. 28, 2020 (JP) .................................. 2020-032898

(51) Int. Cl.
*F24F 11/89* (2018.01)
*B60H 1/00* (2006.01)
(Continued)

(52) U.S. Cl.
CPC .......... *F24F 11/89* (2018.01); *B60H 1/00921* (2013.01); *F24F 11/46* (2018.01);
(Continued)

(58) Field of Classification Search
CPC ........ F24F 11/89; F24F 2140/20; F24F 11/67; F24F 11/46; F25B 2400/0411;
(Continued)

(56) References Cited

U.S. PATENT DOCUMENTS

2004/0050944 A1* 3/2004 Matsunaga ............ B60H 1/143
237/12.3 B
2008/0168766 A1* 7/2008 Oomura ................. B60H 1/025
60/320

(Continued)

FOREIGN PATENT DOCUMENTS

JP 2012195263 A * 10/2012
JP 2015186989 A 10/2015
(Continued)

OTHER PUBLICATIONS

Translated_Yuichi (Year: 2012).*
U.S. Appl. No. 19/079,661, filed Mar. 14, 2025, Koji Miura et al.

*Primary Examiner* — Elizabeth J Martin
*Assistant Examiner* — Samba Nmin Gaye
(74) *Attorney, Agent, or Firm* — Harness, Dickey & Pierce, P.L.C.

(57) ABSTRACT

An air conditioner includes a heat pump cycle, a heating unit, a low-temperature side heat medium circuit, and a heat dissipation amount adjustment control unit. The heat pump cycle has a compressor, a condenser, a decompression unit, and an evaporator. The heating unit has a heating heat exchanger, an outside air radiator, and a heat dissipation amount adjustment unit. The low-temperature side heat medium circuit has a heat generation device. The heat
(Continued)

dissipation amount adjustment control unit controls the heat dissipation amount adjustment unit to adjust a heat dissipation amount in the outside air radiator such that a blown air temperature of the blown air heated by the heating heat exchanger approaches a predetermined target temperature.

11 Claims, 18 Drawing Sheets

(51) Int. Cl.
    *F24F 11/46*     (2018.01)
    *F24F 11/67*     (2018.01)
    *F24F 140/20*     (2018.01)
    *F25B 5/02*     (2006.01)
    *F25B 29/00*     (2006.01)
    *F25B 41/20*     (2021.01)

(52) U.S. Cl.
    CPC ............... *F24F 11/67* (2018.01); *F25B 5/02* (2013.01); *F25B 29/00* (2013.01); *F25B 41/20* (2021.01); *F24F 2140/20* (2018.01); *F25B 2400/0409* (2013.01); *F25B 2400/0411* (2013.01)

(58) Field of Classification Search
    CPC .. F25B 2400/0409; F25B 41/20; F25B 29/00; F25B 5/02; B60H 1/00921
    See application file for complete search history.

(56) References Cited

U.S. PATENT DOCUMENTS

| | | | |
|---|---|---|---|
| 2016/0109163 A1* | 4/2016 | Enomoto | F25B 13/00 62/160 |
| 2017/0021698 A1* | 1/2017 | Hatakeyama | B60H 1/143 |
| 2019/0093546 A1* | 3/2019 | Takagi | F01P 7/167 |
| 2020/0198443 A1 | 6/2020 | Kato et al. | |

FOREIGN PATENT DOCUMENTS

| | | |
|---|---|---|
| JP | 2018124017 A | 8/2018 |
| JP | 2019001244 A | 1/2019 |
| WO | WO-2019058838 A1 | 3/2019 |

\* cited by examiner

AIR CONDITIONER

CROSS REFERENCE TO RELATED APPLICATION

The present application is a continuation application of International Patent Application No. PCT/JP2020/010925 filed on Mar. 12, 2020, which designated the U.S. and claims the benefit of priority from Japanese Patent Application No. 2019-67628 filed on Mar. 29, 2019 and Japanese Patent Application No. 2020-32898 filed on Feb. 28, 2020. The entire disclosures of all of the above applications are incorporated herein by reference.

TECHNICAL FIELD

The present disclosure relates to an air conditioner.

BACKGROUND ART

An air conditioner for a vehicle includes a refrigeration circuit, a low temperature water circuit, and a high temperature water circuit, and is configured to be capable of executing cooling and heating of a vehicle interior. In the low temperature water circuit, a drive device (motor and inverter) and a battery are disposed, and the drive device and the battery are cooled by cooling water of the low temperature water circuit.

SUMMARY

According to a first aspect of the present disclosure, an air conditioner includes a heat pump cycle, a heating unit, a low-temperature side heat medium circuit, and a heat dissipation amount adjustment control unit. The heat pump cycle has a compressor, a condenser, a decompression unit, and an evaporator.

The compressor compresses and discharges a refrigerant. The condenser condenses a high-pressure refrigerant compressed by the compressor by heat exchange. The decompression unit decompresses the refrigerant flowing out of the condenser. The evaporator exchanges heat between a low-pressure refrigerant decompressed by the decompression unit and a low-temperature side heat medium to evaporate the refrigerant.

The heating unit has a heating heat exchanger, an outside air radiator, and a heat dissipation amount adjustment unit. The heating heat exchanger heats blown air to be blown into an air conditioning target space using heat of the high-pressure refrigerant as a heat source. The outside air radiator dissipates the heat of the high-pressure refrigerant to outside air. The heat dissipation amount adjustment unit adjusts a heat dissipation amount of the heat of the high-pressure refrigerant dissipated to the outside air by the outside air radiator.

The low-temperature side heat medium circuit is formed such that the low-temperature side heat medium from which heat is absorbed by heat exchange in the evaporator circulates. The low-temperature side heat medium circuit includes a heat generation device configured and arranged to be coolable by heat exchange with the low-temperature side heat medium. The heat dissipation amount adjustment control unit controls operation of the heat dissipation amount adjustment unit.

The heat dissipation amount adjustment control unit adjusts a heat dissipation amount in the outside air radiator by the heat dissipation amount adjustment unit such that a blown air temperature of the blown air heated by the heating heat exchanger approaches a predetermined target temperature.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
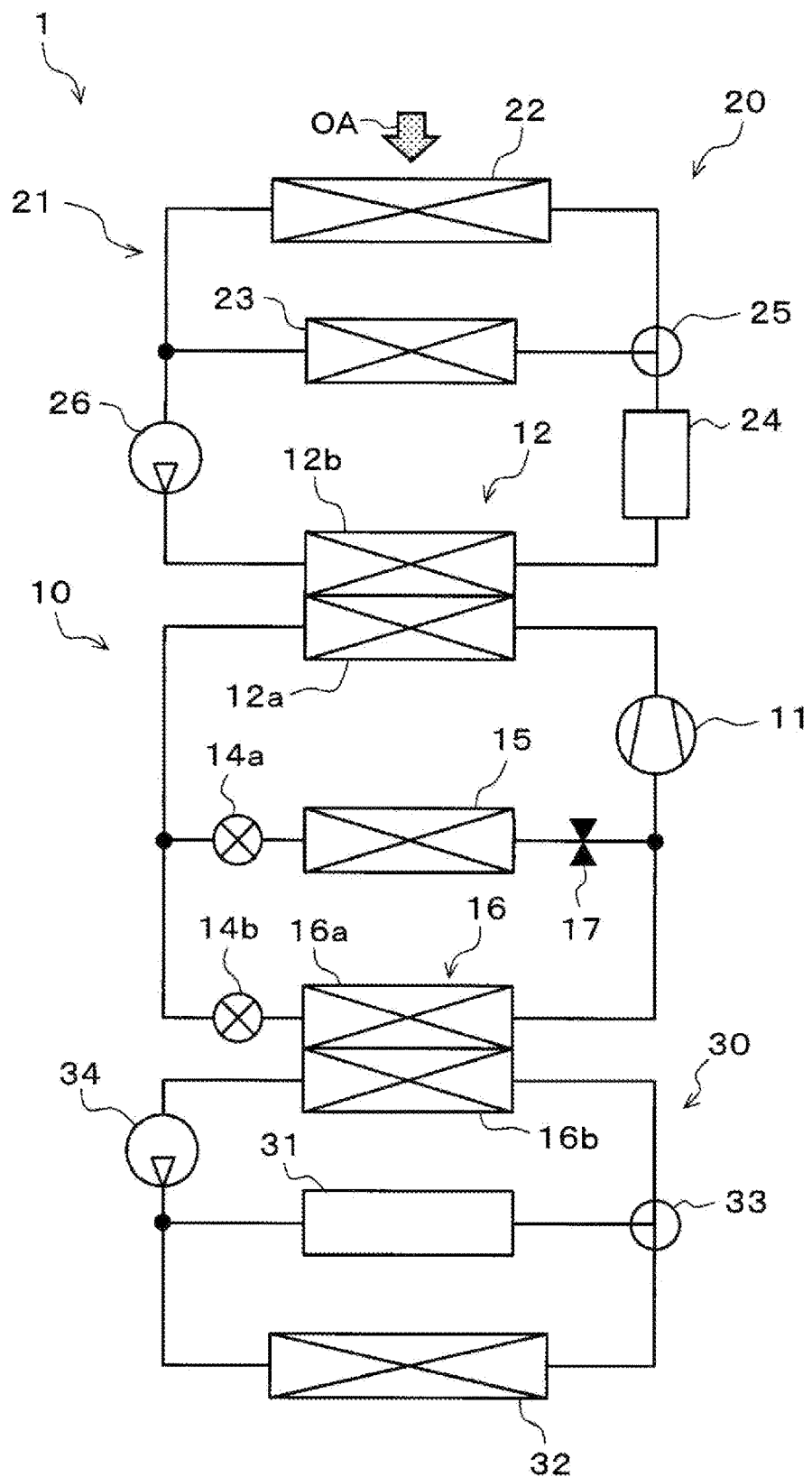
FIG. 1 is an overall configuration diagram of an air conditioner according to a first embodiment.

To begin with, examples of relevant techniques will be described.

Conventionally, an air conditioner for a vehicle includes a refrigeration circuit, a low temperature water circuit, and a high temperature water circuit, and is configured to be capable of executing cooling and heating of a vehicle interior. In the low temperature water circuit, a drive device (motor and inverter) and a battery are disposed, and the drive device and the battery are cooled by cooling water of the low temperature water circuit.

In the air conditioner, waste heat absorbed by cooling of the drive device or the like in the low temperature water circuit is pumped up by the refrigeration circuit and used for heating the vehicle interior as an air conditioning target space via a heater core of the high temperature water circuit. That is, the air conditioner uses the waste heat of the drive device and the like to achieve energy saving when heating the air conditioning target space.

However, the drive device and the battery secondarily generate heat, and thus the amount of waste heat fluctuates at any time according to the operation status of the devices. The waste heat is pumped up from the low temperature water circuit by the refrigeration circuit, and is used for heating blown air in the heater core of the high temperature water circuit. That is, when the amount of waste heat fluctuates, this fluctuation may cause temperature fluctuation of the blown air at the time of heating, and it is assumed that comfort of the air conditioning target space is decreased.

The present disclosure provides an air conditioner that can secure comfort of an air conditioning target space by suppressing an influence of the amount of heat generated by the heat generation device during heating using the waste heat.

According to a first aspect of the present disclosure, an air conditioner includes a heat pump cycle, a heating unit, a low-temperature side heat medium circuit, and a heat dissipation amount adjustment control unit. The heat pump cycle has a compressor, a condenser, a decompression unit, and an evaporator.

The compressor compresses and discharges a refrigerant. The condenser condenses a high-pressure refrigerant compressed by the compressor by heat exchange. The decompression unit decompresses the refrigerant flowing out of the condenser. The evaporator exchanges heat between a low-pressure refrigerant decompressed by the decompression unit and a low-temperature side heat medium to evaporate the refrigerant.

The heating unit has a heating heat exchanger, an outside air radiator, and a heat dissipation amount adjustment unit. The heating heat exchanger heats blown air to be blown into an air conditioning target space using heat of the high-pressure refrigerant as a heat source. The outside air radiator dissipates the heat of the high-pressure refrigerant to outside air. The heat dissipation amount adjustment unit adjusts a heat dissipation amount of the heat of the high-pressure refrigerant dissipated to the outside air by the outside air radiator.

The low-temperature side heat medium circuit is formed such that the low-temperature side heat medium from which heat is absorbed by heat exchange in the evaporator circulates. The low-temperature side heat medium circuit includes a heat generation device configured and arranged to be coolable by heat exchange with the low-temperature side heat medium. The heat dissipation amount adjustment control unit controls operation of the heat dissipation amount adjustment unit.

The heat dissipation amount adjustment control unit adjusts a heat dissipation amount in the outside air radiator by the heat dissipation amount adjustment unit such that a blown air temperature of the blown air heated by the heating heat exchanger approaches a predetermined target temperature.

With this configuration, the heat pump cycle, the heating unit, and the low-temperature side heat medium circuit cooperate with each other to cool the heat generation device via the low-temperature side heat medium, and waste heat of the heat generation device can be pumped up in the heat pump cycle and used for heating the blown air in the heating unit. That is, the air conditioner can achieve air conditioning of the air conditioning target space using the waste heat of the heat generation device while cooling the heat generation device.

By adjusting the heat dissipation amount in the outside air radiator by the heat dissipation amount adjustment unit, the amount of heat of the high-pressure refrigerant to be dissipated to the blown air at the heating heat exchanger can be adjusted. Therefore, by adjusting the heat dissipation amount in the outside air radiator by the heat dissipation amount adjustment unit such that the blown air temperature approaches the predetermined target temperature, the influence of the heat generated by the heat generation device on the temperature of the blown air supplied to the air conditioning target space can be adjusted. That is, the air conditioner can improve the comfort of the air conditioning target space regardless of the amount of heat generated by the heat generation device upon air-conditioning the air conditioning target space using the waste heat of the heat generation device.

According to a second aspect of the present disclosure, an air conditioner includes a heat pump cycle, a heating unit, a low-temperature side heat medium circuit, and a heat exchange amount adjustment control unit. The heat pump cycle has a compressor, a condenser, a decompression unit, and an evaporator.

The compressor compresses and discharges a refrigerant. The condenser condenses a high-pressure refrigerant compressed by the compressor by heat exchange. The decompression unit decompresses the refrigerant flowing out of the condenser. The evaporator exchanges heat between a low-pressure refrigerant decompressed by the decompression unit and a low-temperature side heat medium to evaporate the refrigerant. The heating unit includes a heating heat exchanger that heats blown air to be blown into an air conditioning target space using heat of the high-pressure refrigerant as a heat source.

The low-temperature side heat medium circuit is configured such that the low-temperature side heat medium from which heat is absorbed by heat exchange in the evaporator circulates. The low-temperature side heat medium circuit includes a heat generation device, an outside air heat exchanger, and a heat exchange amount adjustment unit. The heat generation device is arranged to be coolable by heat exchange with the low-temperature side heat medium. The outside air heat exchanger exchanges heat between the low-temperature side heat medium and outside air. The heat exchange amount adjustment unit adjusts a heat exchange amount in the heat generation device and a heat exchange amount in the outside air heat exchanger. The heat exchange amount adjustment control unit controls an operation of the heat exchange amount adjustment unit.

The heat exchange amount adjustment control unit adjusts the heat exchange amount in the outside air heat exchanger such that a blown air temperature of the blown air heated by the heating heat exchanger approaches a predetermined target temperature in a state where a cooling capacity by heat exchange between the heat generation device and the low-temperature side heat medium is maintained.

With this configuration, the heat pump cycle, the heating unit, and the low-temperature side heat medium circuit cooperate with each other to cool the heat generation device via the low-temperature side heat medium, and waste heat of the heat generation device can be pumped up in the heat pump cycle and used for heating the blown air in the heating unit. That is, the air conditioner can achieve air conditioning of the air conditioning target space using the waste heat of the heat generation device while cooling the heat generation device.

The total amount of heat absorbed from the low-temperature side heat medium circuit can be adjusted by adjusting the heat exchange amount in the outside air heat exchanger by the heat exchange amount adjustment unit. Thus, the air conditioner can adjust the amount of heat of the high-pressure refrigerant dissipated to the blown air at the heating heat exchanger.

The heat exchange amount in the outside air heat exchanger is adjusted such that the blown air temperature approaches a predetermined target temperature in a state where the cooling capacity by heat exchange between the heat generation device and the low-temperature side heat medium is maintained. Accordingly, it is possible to adjust the influence of the amount of heat generated by the heat generation device on the temperature of the blown air supplied to the air conditioning target space while appropriately cooling the heat generation device. That is, the air conditioner can improve the comfort of the air conditioning target space regardless of the amount of heat generated by the heat generation device upon air-conditioning the air conditioning target space using the waste heat of the heat generation device.

According to a third aspect of the present disclosure, an air conditioner includes a heat pump cycle, a low-temperature side heat medium circuit, and a device cooling control unit. The heat pump cycle has a compressor, a condenser, a decompression unit, and an evaporator.

The compressor compresses and discharges a refrigerant. The condenser condenses a high-pressure refrigerant compressed by the compressor by heat exchange. The decompression unit decompresses the refrigerant flowing out of the condenser. The evaporator exchanges heat between a low-pressure refrigerant decompressed by the decompression unit and a low-temperature side heat medium to evaporate the refrigerant.

The low-temperature side heat medium circuit is configured such that the low-temperature side heat medium from which heat is absorbed by heat exchange in the evaporator circulates. The low-temperature side heat medium circuit includes a heat generation device arranged to be coolable by heat exchange with the low-temperature side heat medium.

The device cooling control unit performs control related to cooling of the heat generation device. When starting the cooling of the heat generation device, the device cooling control unit starts circulation of the low-temperature side heat medium via the evaporator and then starts circulation of the refrigerant to the evaporator in the low-temperature side heat medium circuit.

Thus, in an environment where the outside air temperature is extremely low temperature, when the heat generation device is cooled via the low-temperature side heat medium and the waste heat of the heat generation device is absorbed, the temperature of the low-temperature side heat medium can be heated by the waste heat of the heat generation device. Operation of a refrigeration cycle is started in a state where the low-temperature side heat medium is warmed in advance, and thus the refrigerant pressure on the low-pressure side in the refrigeration cycle can be increased in advance to some extent. Thus, it is possible to improve the performance at an initial stage regarding the cooling of the heat generation device using the evaporator in a cryogenic environment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

First, a first embodiment of the present disclosure will be described with reference to FIGS. 1 to 3. In the first embodiment, an air conditioner 1 according to the present disclosure is applied to a vehicle air conditioner for an electric vehicle that obtains a driving force for vehicle traveling from an electric motor for traveling. In the electric vehicle, the air conditioner 1 performs air conditioning in a vehicle interior that is an air conditioning target space, and temperature adjustment of a battery 31 as a heat generation device.

The air conditioner 1 can switch between an air-cooling mode, a heating mode, and a dehumidifying and heating mode as an air conditioning operation mode for performing air conditioning in the vehicle interior. The air-cooling mode is an operation mode in which blown air to be blown into the vehicle interior is cooled and blown into the vehicle interior. The heating mode is an operation mode in which the blown air is heated and blown into the vehicle interior. The dehumidifying and heating mode is an operation mode in which the vehicle interior is dehumidified and heated by reheating cooled and dehumidified blown air and blowing the reheated air into the vehicle interior.

The air conditioner 1 can switch presence or absence of cooling of the battery 31 regardless of the state of the air conditioning operation mode. Thus, the operation mode of the air conditioner 1 can be defined by a combination of the state of the air conditioning operation mode and the presence or absence of cooling of the battery 31. Thus, the operation mode of the air conditioner 1 includes seven operation modes including the air-cooling mode, the heating mode, the dehumidifying and heating mode, an independent cooling mode, a cooling and air-cooling mode, a cooling and heating mode, and a cooling, dehumidifying, and heating mode.

The independent cooling mode is an operation mode in which the battery 31 is cooled without air-conditioning the vehicle interior. The cooling and air-cooling mode is an operation mode in which the vehicle interior is cooled and the battery 31 is cooled. The cooling and heating mode is an operation mode in which the vehicle interior is heated and the battery 31 is cooled. The cooling, dehumidifying, and heating mode is an operation mode in which the vehicle interior is dehumidified and heated and the battery 31 is cooled.

In a heat pump cycle 10 of the air conditioner 1, an HFC refrigerant (specifically, R134a) is employed as a refrigerant to constitute a subcritical refrigeration cycle in which a high-pressure side refrigerant pressure does not exceed a critical pressure of the refrigerant. Refrigerating machine oil for lubricating a compressor 11 is mixed in the refrigerant. As the refrigerating machine oil, polyalkylene glycol oil (PAG oil) having compatibility with a liquid-phase refrigerant is employed. A part of the refrigerating machine oil circulates in the cycle together with the refrigerant.

Next, a specific configuration of the air conditioner 1 according to the first embodiment will be described with reference to FIGS. 1 to 3. The air conditioner 1 according to the first embodiment includes a heat pump cycle 10, a heating unit 20, a low-temperature side heat medium circuit 30, an interior air conditioning unit 40, and a control device 50.

First, constituent devices constituting the heat pump cycle 10 in the air conditioner 1 will be described. The heat pump cycle 10 is a vapor compression type refrigeration cycle device.

First, the compressor 11 sucks, compresses, and discharges the refrigerant in the heat pump cycle 10. The compressor 11 is disposed in a vehicle hood. The compressor 11 is an electric compressor in which a fixed capacity type compression mechanism having a fixed discharge capacity is rotationally driven by an electric motor. A rotation speed (that is, refrigerant discharge capacity) of the compressor 11 is controlled by a control signal output from a control device 50 described later.

An inlet side of a refrigerant passage 12a in a heat medium refrigerant heat exchanger 12 is connected to a discharge port of the compressor 11. The heat medium refrigerant heat exchanger 12 is a heat exchanger that dissipates heat of a high-pressure refrigerant discharged from the compressor 11 to a high-temperature side heat medium circulating in a high-temperature side heat medium circuit 21 of the heating unit 20 to heat the high-temperature side heat medium.

The heat medium refrigerant heat exchanger 12 has the refrigerant passage 12a through which the refrigerant of the heat pump cycle 10 flows, and a heat medium passage 12b through which the high-temperature side heat medium of the high-temperature side heat medium circuit 21 flows. The heat medium refrigerant heat exchanger 12 is formed of the same type of metal (an aluminum alloy in the first embodiment) having excellent heat conductivity, and the respective constituent members are integrated by brazing.

Thus, the high-pressure refrigerant flowing through the refrigerant passage 12a and the high-temperature side heat medium flowing through the heat medium passage 12b can exchange heat with each other. The heat medium refrigerant heat exchanger 12 is an example of a condenser that dissipates heat of the high-pressure refrigerant, and constitutes a part of the heating unit 20 described later. As the high-temperature side heat medium flowing through the heat medium passage 12b, a solution containing ethylene glycol, an antifreezing fluid, or the like can be employed.

A refrigerant branch part having a three-way joint structure is connected to an outlet of the refrigerant passage 12a of the heat medium refrigerant heat exchanger 12. The refrigerant branch part branches the flow of the liquid-phase refrigerant flowing out of the heat medium refrigerant heat exchanger 12. In the refrigerant branch part, one of three inflow-outflow ports is a refrigerant inflow port, and the remaining two are refrigerant outflow ports.

A refrigerant inlet side of an interior evaporator 15 is connected to one refrigerant outflow port of the refrigerant branch part via a first expansion valve 14a. A refrigerant inlet side of a chiller 16 is connected to the other refrigerant outflow port of the refrigerant branch part via a second expansion valve 14b.

The first expansion valve 14a is a decompression unit that decompresses the refrigerant flowing out of the one refrigerant outflow port of the refrigerant branch part at least in the air-cooling mode. The first expansion valve 14a is an electric variable throttle mechanism, and includes a valve body and an electric actuator. That is, the first expansion valve 14a is formed by what is called an electric expansion valve.

The valve body of the first expansion valve 14a is configured to be capable of changing a passage opening degree (in other words, a throttle opening degree) of the refrigerant passage. The electric actuator includes a stepping motor that changes the throttle opening degree of the valve body. Operation of the first expansion valve 14a is controlled by a control signal output from the control device 50.

The first expansion valve 14a includes a variable throttle mechanism having a full open function of fully opening the refrigerant passage when the throttle opening degree is fully opened and a full close function of closing the refrigerant passage when the throttle opening is fully closed. That is, the first expansion valve 14a can restrict the refrigerant from exhibiting a decompressing action by fully opening the refrigerant passage.

The first expansion valve 14a closes the refrigerant passage to block inflow of the refrigerant into the interior evaporator 15. That is, the first expansion valve 14a has both a function as a decompression unit that decompresses the refrigerant and a function as a refrigerant circuit switching unit that switches a refrigerant circuit.

The refrigerant inlet side of the interior evaporator 15 is connected to an outlet of the first expansion valve 14a. The interior evaporator 15 is an evaporator that exchanges heat between a low-pressure refrigerant decompressed by the first expansion valve 14a and blown air W to evaporate the low-pressure refrigerant and cool the blown air W at least in the air-cooling mode.

Figure 2:
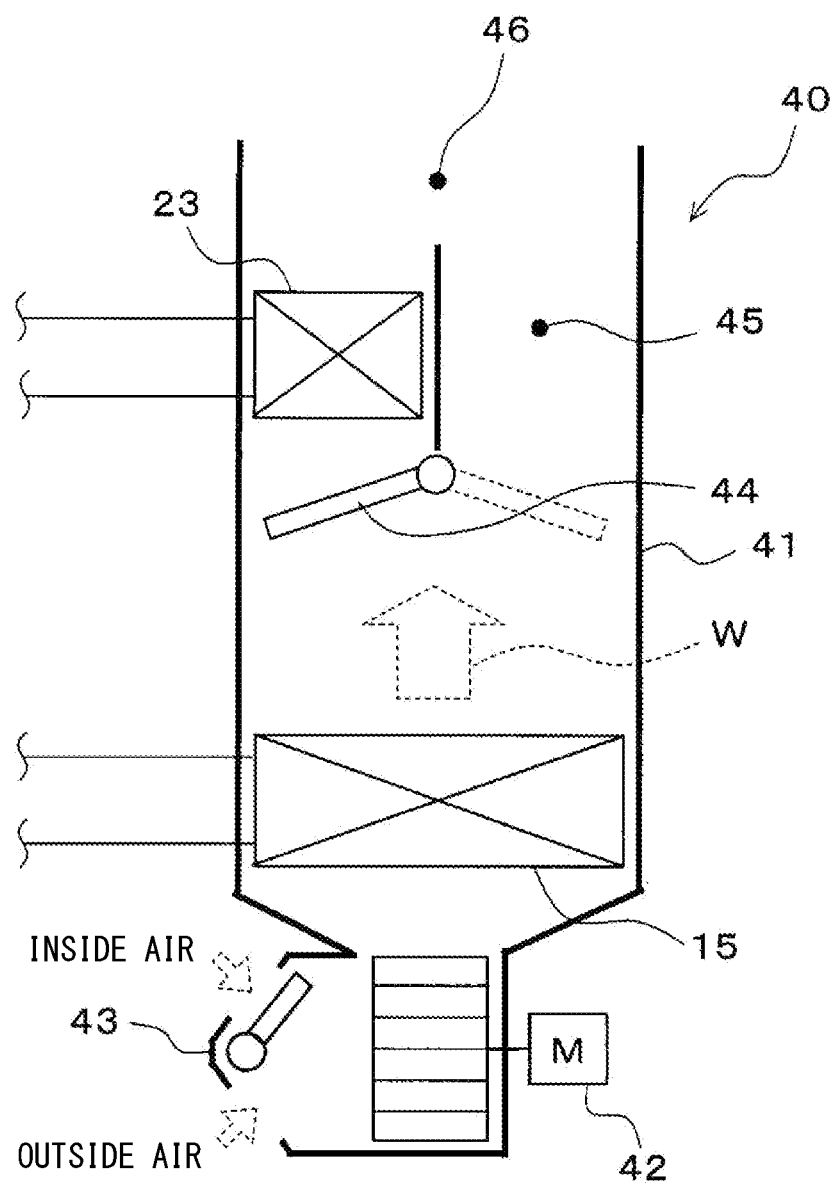
FIG. 2 is an overall configuration diagram of an interior air conditioning unit according to the first embodiment.

As illustrated in FIG. 2, the interior evaporator 15 is disposed in the casing 41 of the interior air conditioning unit 40. That is, the interior evaporator 15 corresponds to an example of a cooling evaporator, and the first expansion valve 14a corresponds to an example of a cooling decompression unit.

As illustrated in FIG. 1, the second expansion valve 14b is connected to the other refrigerant outflow port in the refrigerant branch part. The second expansion valve 14b is a decompression unit that decompresses a refrigerant flowing out of the other refrigerant outflow port of the refrigerant branch part at least in the heating mode.

Similarly to the first expansion valve 14a, the second expansion valve 14b is an electric variable throttle mechanism, and includes a valve body and an electric actuator. That is, the second expansion valve 14b is formed by what is called an electric expansion valve, and has the full open function and the full close function.

That is, the second expansion valve 14b can restrict the refrigerant from exhibiting the decompressing action by fully opening the refrigerant passage. The second expansion valve 14b can block inflow of the refrigerant into the chiller 16 by closing the refrigerant passage. That is, the second expansion valve 14b has both a function as a decompression unit that decompresses the refrigerant and a function as a refrigerant circuit switching unit that switches the refrigerant circuit.

A refrigerant inlet side of the chiller 16 is connected to an outlet of the second expansion valve 14b. The chiller 16 is a heat exchanger that exchanges heat between the low-pressure refrigerant decompressed by the second expansion valve 14b and a low-temperature side heat medium circulating in the low-temperature side heat medium circuit 30.

The chiller 16 has a refrigerant passage 16a through which the low-pressure refrigerant decompressed by the second expansion valve 14b flows, and a heat medium passage 16b through which the low-temperature side heat medium circulating in the low-temperature side heat medium circuit 30 flows. Therefore, the chiller 16 is an evaporator that evaporates the low-pressure refrigerant by heat exchange between the low-pressure refrigerant flowing through the refrigerant passage 16a and the low-temperature side heat medium flowing through the heat medium passage 16b and absorbs heat from the low-temperature side heat medium. That is, the chiller 16 corresponds to an example of an evaporator, and the second expansion valve 14b corresponds to an example of a decompression unit.

As illustrated in FIG. 1, an inlet side of an evaporating pressure adjusting valve 17 is connected to a refrigerant outlet of the interior evaporator 15. The evaporating pressure adjusting valve 17 is an evaporating pressure adjustment unit that maintains a refrigerant evaporating pressure in the interior evaporator 15 at a predetermined reference pressure or higher. The evaporating pressure adjusting valve 17 includes a mechanical variable throttle mechanism that increases a valve opening degree along with an increase in refrigerant pressure on an outlet side of the interior evaporator 15.

The evaporating pressure adjusting valve 17 is configured to maintain a refrigerant evaporation temperature in the interior evaporator 15 to be equal to or higher than a reference temperature (in the present embodiment, 1° C.) at which frosting at the interior evaporator 15 can be suppressed.

One refrigerant inlet side of a refrigerant merging part is connected to an outlet of the evaporating pressure adjusting valve 17. The other refrigerant inlet side of the refrigerant merging part is connected to the refrigerant outlet side of the chiller 16. Here, the refrigerant merging part has a three-way joint structure similar to that of the refrigerant branch part, and two of three inflow-outflow ports serve as refrigerant inlets and the remaining one serves as a refrigerant outlet.

The refrigerant merging part merges the flow of the refrigerant flowing out of the evaporating pressure adjusting valve 17 and the flow of the refrigerant flowing out of the chiller 16. A suction port side of the compressor 11 is connected to the refrigerant outlet of the refrigerant merging part.

Next, the heating unit 20 in the air conditioner 1 will be described. The heating unit 20 is configured to heat the blown air W supplied to the air conditioning target space using the high-pressure refrigerant in the heat pump cycle 10 as a heat source.

The heating unit 20 according to the first embodiment is formed by the high-temperature side heat medium circuit 21. The high-temperature side heat medium circuit 21 is a heat medium circuit that circulates the high-temperature side heat medium, and a solution containing ethylene glycol, an antifreezing fluid, or the like can be employed as the high-temperature side heat medium.

In the high-temperature side heat medium circuit 21 of the heating unit 20, the heat medium passage 12b of the heat medium refrigerant heat exchanger 12, a radiator 22, a heater core 23, an electric heater 24, a high-temperature side flow rate control valve 25, a high-temperature side pump 26, and the like are disposed.

As described above, in the heat medium passage 12b of the heat medium refrigerant heat exchanger 12, the high-temperature side heat medium is heated by heat exchange with the high-pressure refrigerant flowing through the refrigerant passage 12a. That is, the high-temperature side heat medium is heated using heat pumped up by the heat pump cycle 10.

The radiator 22 is a heat exchanger that exchanges heat between the high-temperature side heat medium heated by the heat medium refrigerant heat exchanger 12 and the like and outside air OA blown from an outside air fan that is not illustrated to dissipate heat of the high-temperature side heat medium to the outside air OA. The radiator 22 corresponds to an example of an outside air radiator.

Then, the radiator 22 is disposed on the front side in the vehicle hood. Along with operation of the outside air fan described above, the outside air OA flows from the front side to the rear side of the vehicle and passes through the heat exchange unit of the radiator 22. During traveling of the vehicle, traveling wind can be applied to the radiator 22 from the vehicle front side toward the rear side.

The heater core 23 is a heat exchanger that exchanges heat between the high-temperature side heat medium heated by the heat medium refrigerant heat exchanger 12 and the like and the blown air W having passed through the interior evaporator 15 to heat the blown air W. Accordingly, the heater core 23 corresponds to an example of a heating heat exchanger. As illustrated in FIGS. 1 and 2, the heater core 23 is disposed in the casing 41 of the interior air conditioning unit 40.

The electric heater 24 is connected to an inflow-outflow port on one side of the heat medium passage 12b of the heat medium refrigerant heat exchanger 12. The electric heater 24 is a heating device that generates heat by being supplied with electric power and heats the high-temperature side heat medium flowing through a heat medium passage of the electric heater 24.

As the electric heater 24, for example, a PTC heater having a PTC element (that is, a positive characteristic thermistor) can be used. The electric heater 24 can arbitrarily adjust the amount of heat for heating the high-temperature side heat medium by the control voltage output from the control device 50.

One of inflow-outflow ports of the high-temperature side flow rate control valve 25 is connected to an outlet side of the heat medium passage in the electric heater 24. The high-temperature side flow rate control valve 25 is formed by an electric three-way flow rate adjusting valve having three inflow-outflow ports. Another one of the inflow-outflow ports of the high-temperature side flow rate control valve 25 is connected to an inflow port of the heater core 23. An inflow port of the radiator 22 is connected to the remaining inflow-outflow port of the high-temperature side flow rate control valve 25.

Therefore, in the high-temperature side heat medium circuit 21, the radiator 22 and the heater core 23 are connected in parallel with respect to the flow of the high-temperature side heat medium passing through the heat medium passage 12*b* of the heat medium refrigerant heat exchanger 12. The high-temperature side flow rate control valve 25 can continuously adjust a flow rate ratio between the flow rate of the high-temperature side heat medium flowing into the heater core 23 and the flow rate of the high-temperature side heat medium flowing into the radiator 22 in the high-temperature side heat medium circuit 21.

A merging part having a three-way joint structure is connected to an outflow port of the radiator 22 and an outflow port of the heater core 23. In the merging part, one of three inflow-outflow ports in the three-way joint structure is an outflow port, and the remaining two inflow ports are inflow ports. Therefore, the merging part can merge the flow of the high-temperature side heat medium having passed through the radiator 22 and the flow of the high-temperature side heat medium having passed through the heater core 23.

Then, a suction port of the high-temperature side pump 26 is connected to the outflow port of the merging part. The high-temperature side pump 26 is a heat medium pump that pressure-feeds the high-temperature side heat medium in the high-temperature side heat medium circuit 21 in order to circulate the high-temperature side heat medium. The high-temperature side pump 26 is an electric pump whose rotation speed (that is, pressure feeding capability) is controlled by a control voltage output from the control device 50. A discharge port of the high-temperature side pump 26 is connected to an inflow-outflow port on the other side of the heat medium passage 12*b* of the heat medium refrigerant heat exchanger 12.

As illustrated in FIG. 1, in the high-temperature side heat medium circuit 21, the flow rate of the high-temperature side heat medium flowing to the radiator 22 side and the flow rate of the high-temperature side heat medium flowing to the heater core 23 side can be continuously adjusted by the high-temperature side flow rate control valve 25 disposed in the branch part.

That is, by controlling operation of the high-temperature side flow rate control valve 25, the amount of heat of the high-temperature side heat medium dissipated to the outside air OA at the radiator 22 and the amount of heat of the high-temperature side heat medium dissipated to the blown air W at the heater core 23 can be adjusted. That is, the high-temperature side flow rate control valve 25 corresponds to an example of a heat dissipation amount adjustment unit.

Next, the low-temperature side heat medium circuit 30 in the air conditioner 1 will be described. The low-temperature side heat medium circuit 30 is a heat medium circuit that circulates the low-temperature side heat medium. As the low-temperature side heat medium, a fluid similar to the high-temperature side heat medium in the high-temperature side heat medium circuit 21 can be employed.

In the low-temperature side heat medium circuit 30, the heat medium passage 16*b* of the chiller 16, the battery 31, an outside air heat exchanger 32, a low-temperature side flow rate control valve 33, a low-temperature side pump 34, and the like are disposed. A suction port side of the low-temperature side pump 34 is connected to an outflow port of the heat medium passage 16*b* in the chiller 16.

The low-temperature side pump 34 is a heat medium pump that pressure-feeds the low-temperature side heat medium having passed through the heat medium passage 16*b* of the chiller 16 in the low-temperature side heat medium circuit 30. The low-temperature side pump 34 has a basic configuration similar to that of the high-temperature side pump 26.

A branch part having a three-way joint structure is connected to a discharge port side of the low-temperature side pump 34. In the branch part, one of three inflow-outflow ports in the three-way joint structure is an inflow port, and the remaining two are outflow ports. Therefore, the branch part can branch the flow of the low-temperature side heat medium pressure-fed from the low-temperature side pump 34 into two flows.

An inlet side of a heat medium passage in the battery 31 is connected to one outflow port of the branch part of the low-temperature side heat medium circuit 30. The battery 31 supplies electric power to various electric devices of the vehicle, and for example, a chargeable-dischargeable secondary battery (in the present embodiment, a lithium ion battery) is employed. The battery 31 generates heat during charging and discharging, and thus corresponds to an example of a heat generation device.

The battery 31 is what is called an assembled battery formed by stacking and arranging a plurality of battery cells and electrically connecting these battery cells in series or in parallel. This type of battery 31 is likely to decrease in output at a low temperature, and is likely to deteriorate at a high temperature. Therefore, the temperature of the battery 31 needs to be maintained within an appropriate temperature range (for example, 15° C. or higher and 55° C. or lower) in which the charge-discharge capacity of the battery 31 can be sufficiently used.

Here, in the air conditioner 1, the low-temperature side heat medium is passed through the heat medium passage of the battery 31 to exchange heat, so that the heat generated in the battery 31 can be absorbed by the low-temperature side heat medium to adjust the temperature of the battery 31. That is, the battery 31 is connected to the low-temperature side heat medium circuit 30 to be coolable by the low-temperature side heat medium, and the temperature of the battery 31 can be maintained within a predetermined temperature range.

An inlet side of the outside air heat exchanger 32 is connected to the other outflow port of the branch part of the low-temperature side heat medium circuit 30. The outside air heat exchanger 32 is a heat exchanger that exchanges heat between the low-temperature side heat medium discharged from the low-temperature side pump 34 and the outside air OA blown by an outside air fan that is not illustrated.

The outside air heat exchanger 32 is disposed on the front side in a drive unit chamber. Thus, when the vehicle travels, the traveling wind can be applied to the outside air heat exchanger 32. Therefore, the outside air heat exchanger 32 may be integrally formed with the radiator 22 and the like.

As illustrated in FIG. 1, the low-temperature side flow rate control valve 33 is connected to an outlet side of the heat medium passage of the battery 31 and an outflow port side of the outside air heat exchanger 32. The low-temperature side flow rate control valve 33 is formed by an electric three-way flow rate adjusting valve having three inflow-outflow ports.

That is, the outlet side of the heat medium passage of the battery 31 is connected to one of inflow-outflow ports of the low-temperature side flow rate control valve 33, and the outflow port side of the outside air heat exchanger 32 is connected to another inflow-outflow port of the low-temperature side flow rate control valve 33. An inflow port side of the heat medium passage 16b in the chiller 16 is connected to still another inflow-outflow port of the low-temperature side flow rate control valve 33.

Therefore, the low-temperature side heat medium circuit 30 can switch the flow of the low-temperature side heat medium in the low-temperature side heat medium circuit 30 by controlling the operation of the low-temperature side flow rate control valve 33. For example, with respect to the flow of the low-temperature side heat medium passing through the heat medium passage 16b of the chiller 16, the low-temperature side flow rate control valve 33 can continuously adjust a flow rate ratio between the flow rate of the low-temperature side heat medium passing through the outside air heat exchanger 32 and the flow rate of the low-temperature side heat medium passing through the heat medium passage of the battery 31. That is, the low-temperature side pump 34 corresponds to an example of a heat exchange amount adjustment unit.

For example, in the low-temperature side heat medium circuit 30, the low-temperature side flow rate control valve 33 can be controlled such that the inflow-outflow port on the chiller 16 side communicates with the inflow-outflow port on the battery 31 side, and the inflow-outflow port on the outside air heat exchanger 32 side is closed. In this case, the flow of the low-temperature side heat medium is switched so that the entire amount of the low-temperature side heat medium having passed through the chiller 16 passes through the heat medium passage of the battery 31.

According to this aspect, the low-temperature side heat medium cooled by the chiller 16 can be supplied to the battery 31, and thus the battery 31 can be cooled. In other words, the waste heat of the battery 31 absorbed along with cooling of the battery 31 can be absorbed by the low-pressure refrigerant in the heat pump cycle 10 through heat exchange in the chiller 16.

In the low-temperature side heat medium circuit 30, the low-temperature side flow rate control valve 33 can be controlled such that the inflow-outflow port on the chiller 16 side communicates with the inflow-outflow port on the outside air heat exchanger 32 side, and the inflow-outflow port on the battery 31 side is closed. In this case, the flow of the low-temperature side heat medium is switched so that the entire amount of the low-temperature side heat medium having passed through the chiller 16 passes through the outside air heat exchanger 32.

According to this aspect, since the low-temperature side heat medium cooled by the chiller 16 can be supplied to the outside air heat exchanger 32, when the temperature of the low-temperature side heat medium is lower than the outside air temperature, heat can be absorbed from the outside air OA. Thus, the outside air OA can be used as a heat source.

That is, the air conditioner 1 can cool the battery 31 and adjust the temperature by using the low-temperature side heat medium circuit 30. The air conditioner 1 can use the outside air OA as a heat source by using the outside air heat exchanger 32.

Next, the interior air conditioning unit 40 constituting the air conditioner 1 will be described with reference to FIG. 2. The interior air conditioning unit 40 is a unit for blowing the blown air W whose temperature has been adjusted by the heat pump cycle 10 in the air conditioner 1 to an appropriate location in the vehicle interior. The interior air conditioning unit 40 is disposed inside a dashboard panel (that is, an instrument panel) at a foremost part of the vehicle interior.

The interior air conditioning unit 40 is configured such that a blower 42, an interior evaporator 15, a heater core 23, and the like are accommodated in an air passage formed inside a casing 41 forming an outer shell thereof. The casing 41 forms the air passage for the blown air W blown into the vehicle interior. The casing 41 is made of resin (specifically, polypropylene) having a certain degree of elasticity and excellent strength.

As illustrated in FIG. 2, an inside-outside air switching device 43 is disposed on a blown air flow most upstream side of the casing 41. The inside-outside air switching device 43 switches between inside air (vehicle inside air) and outside air (vehicle outside air) to be introduced into the casing 41.

The inside-outside air switching device 43 continuously adjusts opening areas of an inside air introduction port for introducing inside air into the casing 41 and an outside air introduction port for introducing outside air by an inside-outside air switching door to change an introduction ratio between an introduction air volume of the inside air and an introduction air volume of the outside air. The inside-outside air switching door is driven by an electric actuator for the inside-outside air switching door. Operation of the electric actuator is controlled by a control signal output from the control device 50.

The blower 42 is disposed on a blown air flow downstream side of the inside-outside air switching device 43. The blower 42 is formed by an electric blower with a centrifugal multi-blade fan driven by an electric motor. The blower 42 blows air sucked through the inside-outside air switching device 43 toward the vehicle interior. A rotation speed (that is, air blowing capacity) of the blower 42 is controlled by a control voltage output from the control device 50.

The interior evaporator 15 and the heater core 23 are disposed in this order with respect to the flow of the blown air on a blown air flow downstream side of the blower 42. That is, the interior evaporator 15 is disposed on a blown air flow upstream side of the heater core 23.

A cold air bypass passage 45 is formed in the casing 41. The cold air bypass passage 45 is an air passage that allows the blown air W having passed through the interior evaporator 15 to bypass the heater core 23 and flow downstream.

An air mix door 44 is disposed on a blown air flow downstream side of the interior evaporator 15 and on the blown air flow upstream side of the heater core 23. The air mix door 44 adjusts an air volume ratio between an air volume passing through the heater core 23 and an air volume passing through the cold air bypass passage 45 in the blown air W having passed through the interior evaporator 15.

The air mix door 44 is driven by an electric actuator for driving the air mix door. Operation of the electric actuator is controlled by a control signal output from the control device 50.

A mixing space 46 is provided on a blown air flow downstream side of the heater core 23. In the mixing space 46, the blown air W heated by the heater core 23 and the blown air W having passed through the cold air bypass passage 45 and not heated by the heater core 23 are mixed.

Further, opening holes through which the blown air (conditioned air) mixed in the mixing space 46 is blown into the vehicle interior are disposed in a blown air flow most downstream portion of the casing 41. As the opening holes, a face opening hole, a foot opening hole, and a defroster opening hole (all not illustrated) are provided.

The face opening hole is an opening hole for blowing the conditioned air toward the upper body of an occupant in the vehicle interior. The foot opening hole is an open hole for blowing the conditioned air toward the feet of the occupant. The defroster opening hole is an opening through which the conditioned air is blown toward an inner surface of a window glass on a front face of the vehicle.

The face opening hole, the foot opening hole, and the defroster opening hole are connected to a face blow-out port, a foot blow-out port, and a defroster blow-out port (all not illustrated), respectively, provided in the vehicle interior via ducts forming air passages.

Therefore, the temperature of the conditioned air mixed in the mixing space 46 is adjusted by the air mix door 44 adjusting the air volume ratio between the air volume passing through the heater core 23 and the air volume passing through the cold air bypass passage 45. Thus, the temperature of the blown air (conditioned air) blown into the vehicle interior from each of the blow-out ports is also adjusted.

A face door, a foot door, and a defroster door (all not illustrated) are disposed on a blown air flow upstream side of the face opening hole, the foot opening hole, and the defroster opening hole, respectively. The face door adjusts an opening area of the face opening hole. The foot door adjusts an opening area of the foot opening hole. The defroster door adjusts an opening area of the defroster opening hole.

The face door, the foot door, and the defroster door constitute a blow-out mode switching device that switches the blow-out port through which the conditioned air is blown out. The face door, the foot door, and the defroster door are connected to an electric actuator for driving the blow-out port mode door via a link mechanism or the like and operated to rotate in conjunction therewith. Operation of the electric actuator is controlled by a control signal output from the control device 50.

Next, a control system of the air conditioner 1 according to the first embodiment will be described with reference to FIG. 3. The control device 50 includes a known microcomputer including a CPU, a ROM, a RAM, and the like, and peripheral circuits thereof.

Then, the control device 50 performs various calculations and processes on the basis of a control program stored in the ROM, and controls the operation of various control target devices connected to an output side thereof. The control target devices include the compressor 11, the first expansion valve 14a, the second expansion valve 14b, the electric heater 24, the high-temperature side flow rate control valve 25, the high-temperature side pump 26, the low-temperature side flow rate control valve 33, the low-temperature side pump 34, the blower 42, and the like.

Figure 3:
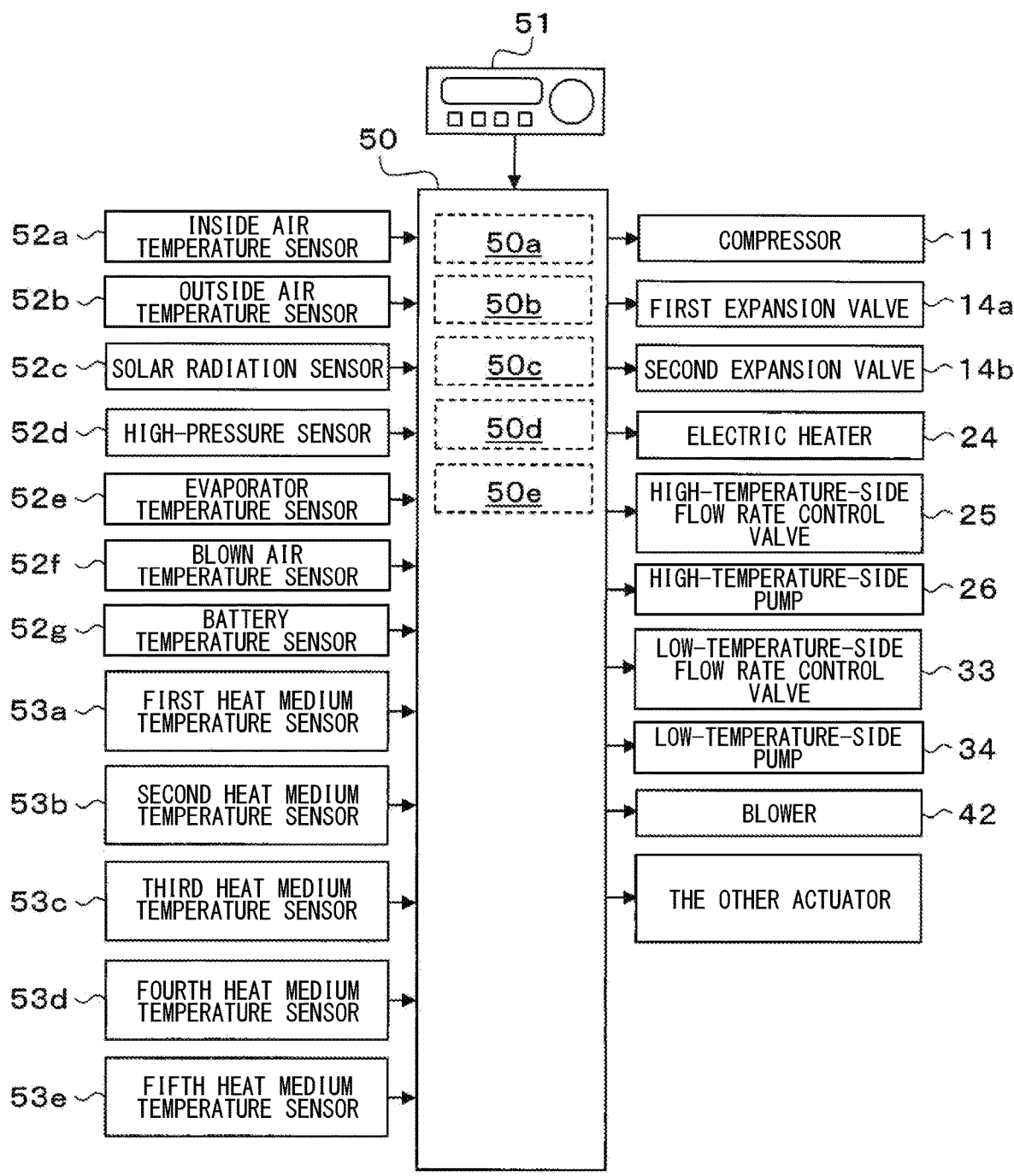
FIG. 3 is a block diagram illustrating a control system of the air conditioner according to the first embodiment.

As illustrated in FIG. 3, a group of sensors for air conditioning control is connected to an input side of the control device 50. The group of sensors for air conditioning control includes an inside air temperature sensor 52a, an outside air temperature sensor 52b, a solar radiation sensor 52c, a high pressure sensor 52d, an evaporator temperature sensor 52e, a blown air temperature sensor 52f, and a battery temperature sensor 52g. Detection signals of the group of sensors for air conditioning control are input to the control device 50.

The inside air temperature sensor 52a is an inside air temperature detection unit that detects a vehicle inside temperature (inside air temperature) Tr. The outside air temperature sensor 52b is an outside air temperature detection unit that detects a vehicle outside temperature (outside air temperature) Tam. The solar radiation sensor 52c is a solar radiation amount detection unit that detects a solar radiation amount As with which the vehicle interior is irradiated. The high pressure sensor 52d is a refrigerant pressure detection unit that detects a high-pressure refrigerant pressure Pd in a refrigerant flow path from a discharge port side of the compressor 11 to an inlet side of the first expansion valve 14a or the second expansion valve 14b.

The evaporator temperature sensor 52e is an evaporator temperature detection unit that detects a refrigerant evaporation temperature (evaporator temperature) Tefin in the interior evaporator 15. The blown air temperature sensor 52f is a blown air temperature detection unit that detects a blown air temperature TAV blown into the vehicle interior. The battery temperature sensor 52g is a battery temperature detection unit that detects a battery temperature TBA that is a temperature of the battery 31.

The battery temperature sensor 52g includes a plurality of temperature detection units, and detects temperatures at a plurality of locations of the battery 31. Therefore, the control device 50 can also detect a temperature difference of each unit of the battery 31. Furthermore, as the battery temperature TBA, an average value of detection values in a plurality of temperature detection units is employed.

A plurality of heat medium temperature sensors is connected to the input side of the control device 50 in order to detect a temperature of a heat medium in each heat medium circuit of the high-temperature side heat medium circuit 21 and the low-temperature side heat medium circuit 30. The plurality of heat medium temperature sensors includes a first heat medium temperature sensor 53a to a fifth heat medium temperature sensor 53e.

The first heat medium temperature sensor 53a is disposed at an outlet portion of the heat medium passage of the electric heater 24, and detects the temperature of the high-temperature side heat medium flowing out of the electric heater 24. The second heat medium temperature sensor 53b is disposed at an outlet portion of the radiator 22, and detects the temperature of the high-temperature side heat medium that has passed through the radiator 22. The third heat medium temperature sensor 53c is disposed at an inlet portion of the heater core 23, and detects the temperature of the high-temperature side heat medium flowing into the heater core 23.

The fourth heat medium temperature sensor 53d is disposed at an outlet portion of the heat medium passage 16b of the chiller 16, and detects the temperature of the low-temperature side heat medium flowing out of the chiller 16. The fifth heat medium temperature sensor 53e is disposed at an outlet portion of the heat medium passage of the battery 31, and detects the temperature of the low-temperature side heat medium flowing out of the heat medium passage of the battery 31.

The air conditioner 1 refers to detection results of the first heat medium temperature sensor 53a to the fifth heat medium temperature sensor 53e to switch the flow of the heat medium in the high-temperature side heat medium circuit 21 and the low-temperature side heat medium circuit 30 of the heating unit 20. Thus, the air conditioner 1 can manage heat in the vehicle using the high-temperature side heat medium and the low-temperature side heat medium.

Further, an operation panel 51 disposed near the dashboard panel in a front portion of the vehicle interior is connected to the input side of the control device 50. A plurality of operation switches is disposed on the operation panel 51. Therefore, operation signals from the plurality of operation switches are input to the control device 50. Examples of the various operation switches on the operation panel 51 include an auto switch, a cooling switch, an air volume setting switch, a temperature setting switch, and the like.

The auto switch is operated when automatic control operation of the air conditioner 1 is set or cancelled. The cooling switch is operated when cooling of the vehicle interior is requested. The air volume setting switch is operated when the air volume of the blower 42 is manually set. Then, the temperature setting switch is operated when the target temperature Tset in the vehicle interior is set.

Note that, in the control device 50, a control unit that controls various control target devices connected to the output side thereof is integrally configured, and a configuration (hardware and software) that controls the operation of each control target device constitutes a control unit that controls the operation of each control target device. For example, in the control device 50, a configuration that controls the operation of the high-temperature side flow rate control valve 25 that is the heat dissipation amount adjustment unit of the heating unit 20 is a heat dissipation amount adjustment control unit 50a.

The control device 50 has an electric heater control unit 50b that controls the heat generation amount of the electric heater 24 that heats the high-temperature side heat medium. The electric heater control unit 50b corresponds to a heating device control unit. In the control device 50, a configuration that controls the operation of the low-temperature side flow rate control valve 33 that is the heat exchange amount adjustment unit of the low-temperature side heat medium circuit 30 is a heat exchange amount adjustment control unit 50c.

In the control device 50, a configuration that adjusts and sets a target blown air temperature TAO of the blown air to be blown into the vehicle interior in accordance with the battery temperature TBA of the battery 31 is a target temperature setting unit 50d. In the control device 50, a configuration that controls the operation of the low-temperature side pump 34 and the like when starting cooling of the battery 31 is a device cooling control unit 50e.

Next, operation of the air conditioner 1 in the first embodiment will be described. As described above, the air conditioner 1 according to the first embodiment can appropriately switch the operation mode from the plurality of operation modes. Switching among these operation modes is performed by executing the control program stored in advance in the control device 50.

More specifically, in the control program, the target blown air temperature TAO of blown air to be blown into the vehicle interior is calculated on the basis of detection signals detected by the group of sensors for air-conditioning control and the operation signal output from the operation panel 51.

Specifically, the target blown air temperature TAO is calculated by following Equation F1.

$$TAO = Kset \times Tset - Kr \times Tr - Kam \times Tam - Ks \times As + C \quad (F1)$$

Tset is a target temperature (vehicle interior set temperature) in the vehicle interior set by the temperature setting switch, Tr is an inside air temperature detected by the inside air temperature sensor 52a, Tam is an outside air temperature detected by the outside air temperature sensor 52b, and As is a solar radiation amount detected by the solar radiation sensor 52c. Kset, Kr, Kam, and Ks are control gains, and C is a correction constant.

In the control program, when the target blown air temperature TAO is lower than a predetermined cooling reference temperature a in a state where an air conditioner switch of the operation panel 51 is turned on, the air conditioning operation mode is switched to the air-cooling mode.

In the control program, when the target blown air temperature TAO is equal to or higher than the cooling reference temperature a in a state where the air conditioner switch of the operation panel 51 is turned on, the air conditioning operation mode is switched to the dehumidifying and heating mode. Further, when the target blown air temperature TAO is equal to or higher than the cooling reference temperature a in a state where the air conditioner switch is not turned on, the air conditioning operation mode is switched to the heating mode.

In the control program, the presence or absence of cooling of the battery 31 is switched according to the battery temperature TBA. Specifically, when the battery temperature TBA becomes equal to or higher than a reference battery temperature KTBA, the operation mode is switched to an operation mode for cooling the battery 31.

Thus, the operation mode in the air conditioner 1 is determined by a combination of the air conditioning operation mode and the operation mode indicating the presence or absence of cooling of the battery 31. For example, when the battery temperature TBA becomes equal to or higher than the reference battery temperature KTBA in a state where air conditioning of the vehicle interior is not performed, the operation mode of the air conditioner 1 is switched to the independent cooling mode for cooling the battery 31 without performing the air conditioning of the vehicle interior.

Thus, the operation mode of the air conditioner 1 includes the air-cooling mode, the heating mode, the dehumidifying and heating mode, the independent cooling mode, the cooling and air-cooling mode, the cooling and heating mode, and the cooling, dehumidifying, and heating mode. Each operation mode will be described below.

(a) Air-Cooling Mode

The air-cooling mode is an operation mode in which the blown air W is cooled by the interior evaporator 15 and blown into the vehicle interior without cooling the battery 31. In this air-cooling mode, the control device 50 opens the first expansion valve 14a at a predetermined throttle opening degree and fully closes the second expansion valve 14b.

Therefore, in the heat pump cycle 10 in the air-cooling mode, a circulation circuit of the refrigerant flowing through the compressor 11, the heat medium refrigerant heat exchanger 12, the first expansion valve 14a, the interior evaporator 15, the evaporating pressure adjusting valve 17, and the compressor 11 in this order is formed. That is, in the air-cooling mode, it is switched to the refrigerant circuit in which the blown air W blown by the blower 42 is cooled by the interior evaporator 15.

In this cycle configuration, the control device 50 controls the operation of various control target devices connected to the output side. For example, the control device 50 controls the operation of the compressor 11 such that the refrigerant evaporation temperature Tefin detected by the evaporator temperature sensor 52e becomes a target evaporation temperature TEO. The target evaporation temperature TEO is determined on the basis of the target blown air temperature TAO with reference to a control map for the air-cooling mode stored in advance in the control device 50.

Specifically, in this control map, the target evaporation temperature TEO is increased along with an increase in the target blown air temperature TAO such that the blown air temperature TAV detected by the blown air temperature sensor 52f approaches the target blown air temperature TAO. Further, the target evaporation temperature TEO is set to a value in a range (specifically, 1° C. or higher) in which frosting on the interior evaporator 15 can be suppressed.

Then, the control device 50 determines a control voltage (air blowing capacity) of the blower 42 with reference to a control map stored in advance in the control device 50 on the basis of the target blown air temperature TAO. Specifically, in this control map, an air blowing volume of the blower 42 is maximized in an extremely low temperature range (maximum cooling range) and an extremely high temperature range (maximum heating range) of the target blown air temperature TAO, and the air blowing volume is decreased as the temperature approaches the intermediate temperature range.

With respect to the heating unit 20 in the air-cooling mode, the control device 50 controls the operation of the high-temperature side pump 26 so as to exhibit a predetermined hydraulic pressure feeding capability in the air-cooling mode. The control device 50 controls the high-temperature side flow rate control valve 25 so as to communicate the inflow-outflow port on the radiator 22 side with the inflow-outflow port on the electric heater 24 side and close the inflow-outflow port on the heater core 23 side.

Thus, in the high-temperature side heat medium circuit 21 in the air-cooling mode, a circulation circuit of the high-temperature side heat medium circulating through the high-temperature side pump 26, the heat medium refrigerant heat exchanger 12, the electric heater 24, the high-temperature side flow rate control valve 25, the radiator 22, and the high-temperature side pump 26 in this order is formed.

For the low-temperature side heat medium circuit 30 in the air-cooling mode, the control device 50 keeps the stopped state without operating the constituent devices of the low-temperature side heat medium circuit 30.

As described above, in the heat pump cycle 10 in the air-cooling mode, the high-pressure refrigerant discharged from the compressor 11 flows into the heat medium refrigerant heat exchanger 12. In the heat medium refrigerant heat exchanger 12, since the high-temperature side pump 26 is in operation, the high-pressure refrigerant exchanges heat with the high-temperature side heat medium of the high-temperature side heat medium circuit 21, and the high-pressure refrigerant is cooled and condensed to heat the high-temperature side heat medium.

In the high-temperature side heat medium circuit 21, the high-temperature side heat medium heated by the heat medium refrigerant heat exchanger 12 flows into the radiator 22 via the electric heater 24 and the high-temperature side flow rate control valve 25. The high-temperature side heat medium having flowed into the radiator 22 exchanges heat with the outside air OA to dissipate heat. The high-temperature side heat medium cooled by the radiator 22 is sucked into the high-temperature side pump 26 and pressure-fed again to the heat medium passage 12b of the heat medium refrigerant heat exchanger 12.

On the other hand, the high-pressure refrigerant having passed through the refrigerant passage 12a of the heat medium refrigerant heat exchanger 12 flows into the first expansion valve 14a via the refrigerant branch part and is decompressed. The throttle opening degree of the first expansion valve 14a is adjusted such that the degree of superheating of the refrigerant on the outlet side of the interior evaporator 15 is approximately 3° C.

The low-pressure refrigerant decompressed by the first expansion valve 14a flows into the interior evaporator 15. The refrigerant having flowed into the interior evaporator 15 absorbs heat from the blown air W blown from the blower 42 and evaporates to cool the blown air W. The refrigerant flowing out of the interior evaporator 15 is sucked into the compressor 11 via the evaporating pressure adjusting valve 17 and the refrigerant merging part and compressed again.

Thus, the air conditioner 1 in the air-cooling mode can cool the vehicle interior by blowing the blown air W cooled by the interior evaporator 15 into the vehicle interior.

In this air-cooling mode, the electric heater 24 is not operated because it is a configuration in which the high-temperature side heat medium circuit 21 dissipates the heat of the high-temperature side heat medium to the outside air OA. It goes without saying that the electric heater 24 may be operated as necessary.

(b) Heating Mode

The heating mode is an operation mode in which the blown air W is heated by the heater core 23 and blown into the vehicle interior without cooling the battery 31. In this heating mode, the control device 50 opens the second expansion valve 14b at a predetermined throttle opening degree and causes the first expansion valve 14a to be in a fully closed state.

Thus, in the heat pump cycle 10 in the heating mode, a heat pump cycle in which the refrigerant circulates through the compressor 11, the heat medium refrigerant heat exchanger 12, the second expansion valve 14b, the chiller 16, and the compressor 11 in this order is formed.

That is, in the heating mode, it is switched to the refrigerant circuit in which the refrigerant is caused to flow into the chiller 16, and the heat absorbed from the low-temperature side heat medium of the low-temperature side heat medium circuit 30 can be pumped up and used for heating the blown air W.

In this cycle configuration, the control device 50 controls the operation of various control target devices connected to the output side. For example, the control device 50 controls the operation of the compressor 11 so that the high-pressure refrigerant pressure Pd detected by the high pressure sensor 52d becomes equal to a target high pressure PCO.

The target high pressure PCO is determined on the basis of the target blown air temperature TAO with reference to a control map for the heating mode stored in advance in the control device 50. Specifically, in this control map, the target high pressure PCO is increased along with the increase in the target blown air temperature TAO such that the blown air temperature TAV approaches the target blown air temperature TAO.

As in the air-cooling mode, the control device 50 determines the control voltage (air blowing capacity) of the blower 42. The control device 50 controls the operation of the air mix door 44 so as to fully open the air passage on the heater core 23 side and close the cold air bypass passage 45.

With respect to heating unit 20 in the heating mode, the control device 50 causes the high-temperature side pump 26 to operate so as to exhibit a predetermined hydraulic pressure feeding capability in the heating mode. The control device 50 controls the high-temperature side flow rate control valve 25 so as to communicate the inflow-outflow port on the heater core 23 side with the inflow-outflow port on the electric heater 24 side and close the inflow-outflow port on the radiator 22 side.

Thus, in the high-temperature side heat medium circuit 21 in the heating mode, a circulation circuit of the high-temperature side heat medium circulating through the high-temperature side pump 26, the heat medium refrigerant heat exchanger 12, the electric heater 24, the high-temperature side flow rate control valve 25, the heater core 23, and the high-temperature side pump 26 in this order is formed.

For the low-temperature side heat medium circuit 30 in the heating mode, the control device 50 controls the operation of the low-temperature side pump 34 so as to exhibit the hydraulic pressure feeding capability in the heating mode. Then, the control device 50 controls the operation of the low-temperature side flow rate control valve 33 so as to communicate the inflow-outflow port on the chiller 16 side with the inflow-outflow port on the outside air heat exchanger 32 side and close the inflow-outflow port on the battery 31 side.

Thus, in the low-temperature side heat medium circuit 30 in the heating mode, a circulation circuit of the low-temperature side heat medium circulating through the low-temperature side pump 34, the outside air heat exchanger 32, the low-temperature side flow rate control valve 33, the chiller 16, and the low-temperature side pump 34 in this order is formed.

Here, the low-temperature side heat medium of the low-temperature side heat medium circuit 30 exchanges heat with the outside air OA when passing through the outside air heat exchanger 32. Since the low-temperature side heat medium is cooled by the chiller 16, the low-temperature side heat medium absorbs heat from the outside air OA according to a temperature difference from the outside air OA. That is, the air conditioner 1 can use the outside air OA as a heat source for heating in the heating mode.

In the heat pump cycle 10 in the heating mode, the high-pressure refrigerant flowing out of the refrigerant passage 12a of the heat medium refrigerant heat exchanger 12 flows into the second expansion valve 14b and is decompressed. The throttle opening degree of the second expansion valve 14b is adjusted such that the refrigerant on the outlet side of the chiller 16 is in a gas-liquid two-phase state. The low-pressure refrigerant evaporates by heat exchange with the low-temperature side heat medium at the chiller 16, and can absorb heat from the low-temperature side heat medium.

The refrigerant having absorbed heat from the low-temperature side heat medium is compressed by the compressor 11 and discharged as the high-pressure refrigerant to the heat medium refrigerant heat exchanger 12. In the heat medium refrigerant heat exchanger 12, since the high-temperature side pump 26 is in operation, the high-pressure refrigerant exchanges heat with the high-temperature side heat medium of the high-temperature side heat medium circuit 21, and the high-pressure refrigerant is cooled and condensed. Thus, the high-temperature side heat medium is heated by the heat of the high-pressure refrigerant.

In the high-temperature side heat medium circuit 21, the high-temperature side heat medium heated by the heat medium refrigerant heat exchanger 12 flows into the heater core 23 via the high-temperature side flow rate control valve 25. Since the air mix door 44 has fully opened the air passage on the heater core 23 side, the high-temperature side heat medium having flowed into the heater core 23 exchanges heat with the blown air W having passed through the interior evaporator 15 to dissipate heat.

Thus, in the heating mode, the blown air W is heated, and the temperature of the blown air W approaches the target blown air temperature TAO. The high-temperature side heat medium flowing out of the heater core 23 is sucked into the high-temperature side pump 26 and pressure-fed again to the heat medium passage 12b of the heat medium refrigerant heat exchanger 12.

That is, the air conditioner 1 in the heating mode can pump up the heat absorbed from the outside air OA in the low-temperature side heat medium circuit 30 by the heat pump cycle 10 and used for heating the blown air W via the high-temperature side heat medium circuit 21.

(c) Dehumidifying and Heating Mode

The dehumidifying and heating mode is an operation mode in which the blown air W cooled by the interior evaporator 15 is heated by the heater core 23 and blown into the vehicle interior without cooling the battery 31. In the dehumidifying and heating mode, the control device 50 opens the first expansion valve 14a and the second expansion valve 14b at respective predetermined throttle opening degrees.

Accordingly, in the heat pump cycle 10 in the dehumidifying and heating mode, the refrigerant circulates through the compressor 11, the heat medium refrigerant heat exchanger 12, the first expansion valve 14a, the interior evaporator 15, the evaporating pressure adjusting valve 17, and the compressor 11 in this order. At the same time, the refrigerant circulates through the compressor 11, the heat medium refrigerant heat exchanger 12, the second expansion valve 14b, the chiller 16, and the compressor 11 in this order.

That is, in the heat pump cycle 10 in the dehumidifying and heating mode, a heat pump cycle is formed in which the interior evaporator 15 and the chiller 16 are connected in parallel with the flow of the refrigerant flowing out of the heat medium refrigerant heat exchanger 12.

In this cycle configuration, the control device 50 controls the operation of various control target devices connected to the output side. For example, as in the heating mode, the control device 50 controls the operation of the compressor 11 so that the high-pressure refrigerant pressure Pd becomes equal to the target high pressure PCO.

With respect to the heating unit 20 in the dehumidifying and heating mode, the control device 50 causes the high-temperature side pump 26 to operate so as to exhibit a predetermined hydraulic pressure feeding capability in the dehumidifying and heating mode. The control device 50 controls the high-temperature side flow rate control valve 25 so as to communicate the inflow-outflow port on the heater core 23 side with the inflow-outflow port on the electric heater 24 side and close the inflow-outflow port on the radiator 22 side.

Thus, in the high-temperature side heat medium circuit 21 in the dehumidifying and heating mode, a circulation circuit of the high-temperature side heat medium circulating through the high-temperature side pump 26, the heat medium refrigerant heat exchanger 12, the electric heater 24, the high-temperature side flow rate control valve 25, the heater core 23, and the high-temperature side pump 26 in this order is formed.

For the low-temperature side heat medium circuit 30 in the dehumidifying and heating mode, the control device 50 controls the operation of the low-temperature side pump 34 so as to exhibit the hydraulic pressure feeding capability in the dehumidifying and heating mode. Then, the control device 50 controls the operation of the low-temperature side flow rate control valve 33 so as to communicate the inflow-outflow port on the chiller 16 side with the inflow-outflow port on the outside air heat exchanger 32 side and close the inflow-outflow port on the battery 31 side.

Thus, in the low-temperature side heat medium circuit 30 in the dehumidifying and heating mode, a circulation circuit of the low-temperature side heat medium circulating through the low-temperature side pump 34, the outside air heat exchanger 32, the low-temperature side flow rate control valve 33, the chiller 16, and the low-temperature side pump 34 in this order is formed.

In the heat pump cycle 10 in the dehumidifying and heating mode, the high-pressure refrigerant flowing out of the refrigerant passage 12a of the heat medium refrigerant heat exchanger 12 is branched at the refrigerant branch part. One of the high-pressure refrigerant branched at the refrigerant branch part flows into the first expansion valve 14a and is decompressed. The low-pressure refrigerant decompressed by the first expansion valve 14a flows into the interior evaporator 15.

The refrigerant having flowed into the interior evaporator 15 absorbs heat from the blown air W blown from the blower 42 and evaporates to cool the blown air W. The refrigerant flowing out of the interior evaporator 15 is sucked into the compressor 11 via the evaporating pressure adjusting valve 17 and the refrigerant merging part and compressed again.

On the other hand, the other of the high-pressure refrigerant branched at the refrigerant branch part flows into the second expansion valve 14b and is decompressed. The low-pressure refrigerant decompressed by the second expansion valve 14b flows into the chiller 16 and exchanges heat with the low-temperature side heat medium flowing through the heat medium passage 16b. Thus, the low-pressure refrigerant evaporates by heat exchange with the low-temperature side heat medium, and can absorb heat from the low-temperature side heat medium. The refrigerant having absorbed heat from the low-temperature side heat medium is sucked into the compressor 11 and compressed again.

The high-pressure refrigerant discharged from the compressor 11 exchanges heat with the high-temperature side heat medium of the high-temperature side heat medium circuit 21 and condenses in the heat medium refrigerant heat exchanger 12. Thus, the high-temperature side heat medium is heated by the heat of the high-pressure refrigerant.

In the high-temperature side heat medium circuit 21, the high-temperature side heat medium heated by the heat medium refrigerant heat exchanger 12 flows into the heater core 23 via the high-temperature side flow rate control valve 25. The high-temperature side heat medium having flowed into the heater core 23 exchanges heat with the blown air W cooled by the interior evaporator 15 to dissipate heat.

Thus, in the dehumidifying and heating mode, the blown air W cooled by the interior evaporator 15 can be heated, and the dehumidifying and heating of the vehicle interior can be achieved. The high-temperature side heat medium flowing out of the heater core 23 is sucked into the high-temperature side pump 26 and pressure-fed again to the heat medium passage 12b of the heat medium refrigerant heat exchanger 12.

That is, the air conditioner 1 in the dehumidifying and heating mode can pump up the heat absorbed from the outside air OA in the low-temperature side heat medium circuit 30 by the heat pump cycle 10 and used as a heat source when the cooled blown air W is heated through the high-temperature side heat medium circuit 21.

(d) Independent Cooling Mode

The independent cooling mode is an operation mode in which the battery 31 is cooled without performing the air-conditioning operation in the vehicle interior. In the independent cooling mode, the control device 50 opens the second expansion valve 14b at a predetermined throttle opening degree and causes the first expansion valve 14a to be in a fully closed state.

Therefore, in the heat pump cycle 10 in the independent cooling mode, a heat pump cycle in which the refrigerant circulates through the compressor 11, the heat medium refrigerant heat exchanger 12, the second expansion valve 14b, the chiller 16, and the compressor 11 in this order is formed.

That is, in the independent cooling mode, it is switched to a refrigerant circuit in which the refrigerant is caused to flow into the chiller 16, and the heat absorbed from the low-temperature side heat medium of the low-temperature side heat medium circuit 30 can be pumped up to the high-temperature side heat medium of the heating unit 20.

In this cycle configuration, the control device 50 controls the operation of various control target devices connected to the output side. For example, the control device 50 controls the operation of the compressor 11 so as to exhibit the refrigerant discharge capacity determined in the independent cooling mode.

With respect to the heating unit 20 in the independent cooling mode, the control device 50 controls the operation of the high-temperature side pump 26 so as to exhibit a predetermined hydraulic pressure feeding capability in the independent cooling mode. The control device 50 controls the high-temperature side flow rate control valve 25 so as to communicate the inflow-outflow port on the radiator 22 side with the inflow-outflow port on the electric heater 24 side and close the inflow-outflow port on the heater core 23 side.

Thus, in the high-temperature side heat medium circuit 21 in the independent cooling mode, a circulation circuit of the high-temperature side heat medium circulating through the high-temperature side pump 26, the heat medium refrigerant heat exchanger 12, the electric heater 24, the high-temperature side flow rate control valve 25, the radiator 22, and the high-temperature side pump 26 in this order is formed.

For the low-temperature side heat medium circuit 30 in the independent cooling mode, the control device 50 controls the operation of the low-temperature side pump 34 so as to exhibit a hydraulic pressure feeding capability in the independent cooling mode. The control device 50 controls the operation of the low-temperature side flow rate control valve 33 so as to communicate the inflow-outflow port on the chiller 16 side with the inflow-outflow port on the battery 31 side and close the inflow-outflow port on the outside air heat exchanger 32 side.

Thus, in the low-temperature side heat medium circuit 30 in the independent cooling mode, a circulation circuit of the low-temperature side heat medium circulating through the low-temperature side pump 34, the battery 31, the low-temperature side flow rate control valve 33, the chiller 16, and the low-temperature side pump 34 in this order is formed.

Here, in the low-temperature side heat medium circuit 30, the low-temperature side heat medium cooled by the chiller 16 flows into the battery 31 via the low-temperature side flow rate control valve 33. In the heat medium passage of the battery 31, the low-temperature side heat medium cools the battery 31 by absorbing heat from the battery 31. The low-temperature side heat medium flowing out of the battery 31 is sucked into the low-temperature side pump 34 and pressure-fed to the heat medium passage 16b of the chiller 16 again.

That is, in the air conditioner 1 in the independent cooling mode, the heat absorbed while cooling the battery 31 can be absorbed, through the chiller 16, by the low-pressure refrigerant in the heat pump cycle 10 from the low-temperature side heat medium of the low-temperature side heat medium circuit 30.

The air conditioner 1 can pump the heat absorbed by the chiller 16 in the heat pump cycle 10 and dissipate the heat to the high-temperature side heat medium of the high-temperature side heat medium circuit 21 in the heat medium refrigerant heat exchanger 12. Further, the air conditioner 1 can dissipate the heat of the high-temperature side heat medium to the outside air OA by the radiator 22.

(e) Cooling and Air-Cooling Mode

The cooling and air-cooling mode is an operation mode in which the blown air W is cooled by the interior evaporator 15 and blown into the vehicle interior in parallel with cooling of the battery 31. In the cooling and air-cooling mode, the control device 50 opens the first expansion valve 14a and the second expansion valve 14b at respective predetermined throttle opening degrees.

Accordingly, in the heat pump cycle 10 in the cooling and air-cooling mode, the refrigerant circulates through the compressor 11, the heat medium refrigerant heat exchanger 12, the first expansion valve 14a, the interior evaporator 15, the evaporating pressure adjusting valve 17, and the compressor 11 in this order. At the same time, the refrigerant circulates through the compressor 11, the heat medium refrigerant heat exchanger 12, the second expansion valve 14b, the chiller 16, and the compressor 11 in this order.

That is, in the heat pump cycle 10 in the cooling and air-cooling mode, a heat pump cycle is formed in which the interior evaporator 15 and the chiller 16 are connected in parallel with the flow of the refrigerant flowing out of the heat medium refrigerant heat exchanger 12.

In this cycle configuration, the control device 50 controls the operation of various control target devices connected to the output side. For example, the control device 50 controls the operation of the compressor 11 so as to exhibit the refrigerant discharge capacity determined in the cooling and air-cooling mode.

With respect to the heating unit 20 in the cooling and air-cooling mode, the control device 50 controls the operation of the high-temperature side pump 26 so as to exhibit a predetermined hydraulic pressure feeding capability in the cooling and air-cooling mode. The control device 50 controls the high-temperature side flow rate control valve 25 so as to communicate the inflow-outflow port on the radiator 22 side with the inflow-outflow port on the electric heater 24 side and close the inflow-outflow port on the heater core 23 side.

Thus, in the high-temperature side heat medium circuit 21 in the cooling and air-cooling mode, a circulation circuit of the high-temperature side heat medium circulating through the high-temperature side pump 26, the heat medium refrigerant heat exchanger 12, the electric heater 24, the high-temperature side flow rate control valve 25, the radiator 22, and the high-temperature side pump 26 in this order is formed.

For the low-temperature side heat medium circuit 30 in the cooling and air-cooling mode, the control device 50 controls the operation of the low-temperature side pump 34 so as to exhibit the hydraulic pressure feeding capability in the cooling and air-cooling mode. The control device 50 controls the operation of the low-temperature side flow rate control valve 33 so as to communicate the inflow-outflow port on the chiller 16 side with the inflow-outflow port on the battery 31 side and close the inflow-outflow port on the outside air heat exchanger 32 side.

Thus, in the low-temperature side heat medium circuit 30 in the cooling and air-cooling mode, a circulation circuit of the low-temperature side heat medium circulating through the low-temperature side pump 34, the battery 31, the low-temperature side flow rate control valve 33, the chiller 16, and the low-temperature side pump 34 in this order is formed.

Therefore, in the low-temperature side heat medium circuit 30 in the cooling and air-cooling mode, the cooling water cooled by the chiller 16 flows into the battery 31 via the low-temperature side flow rate control valve 33. In the heat medium passage of the battery 31, the low-temperature side heat medium cools the battery 31 by absorbing heat from the battery 31. The low-temperature side heat medium flowing out of the battery 31 is sucked into the low-temperature side pump 34 and pressure-fed to the heat medium passage 16b of the chiller 16 again.

That is, in the air conditioner 1 in the cooling and air-cooling mode, the heat absorbed while cooling the battery 31 can be absorbed, through the chiller 16, by the low-pressure refrigerant in the heat pump cycle 10 from the low-temperature side heat medium of the low-temperature side heat medium circuit 30.

In the cooling and air-cooling mode, the low-pressure refrigerant can be evaporated by heat exchange with the blown air W to be blown into the vehicle interior to cool the blown air W in the interior evaporator 15. Thus, the air conditioner 1 in the cooling and air-cooling mode can achieve cooling of the vehicle interior.

In the cooling and air-cooling mode, the heat absorbed by the refrigerant while cooling the battery 31 or cooling the blown air W is dissipated to the high-temperature side heat medium in the heat medium refrigerant heat exchanger 12. In the high-temperature side heat medium circuit 21, the high-temperature side heat medium dissipates heat to the outside air OA by the radiator 22. Accordingly, the air conditioner 1 in the cooling and air-cooling mode can improve comfort by cooling the vehicle interior together with cooling of the battery 31.

(f) Cooling and Heating Mode

The cooling and heating mode is an operation mode in which the blown air W is heated by the heater core 23 and blown into the vehicle interior in parallel with cooling of the battery 31. In the cooling and heating mode, the control device 50 opens the second expansion valve 14b at a predetermined throttle opening degree and causes the first expansion valve 14a to be in a fully closed state.

Therefore, in the heat pump cycle 10 in the cooling and heating mode, a heat pump cycle in which the refrigerant circulates through the compressor 11, the heat medium refrigerant heat exchanger 12, the second expansion valve 14b, the chiller 16, and the compressor 11 in this order is formed.

That is, in the cooling and heating mode, it is switched to the refrigerant circuit in which the refrigerant is caused to flow into the chiller 16, and the heat absorbed from the low-temperature side heat medium of the low-temperature side heat medium circuit 30 can be pumped up and used for heating the blown air W.

In this cycle configuration, the control device 50 controls the operation of various control target devices connected to the output side. For example, the control device 50 controls the operation of the compressor 11 so as to exhibit the refrigerant discharge capacity determined in the cooling and heating mode.

With respect to the heating unit 20 in the cooling and heating mode, the control device 50 controls the operation of the high-temperature side pump 26 so as to exhibit a predetermined hydraulic pressure feeding capability in the cooling and heating mode. The control device 50 controls the operation of the high-temperature side flow rate control valve 25 to adjust a flow rate ratio between the flow rate of the high-temperature side heat medium with respect to the radiator 22 and the flow rate of the high-temperature side heat medium with respect to the heater core 23. The control content of the high-temperature side flow rate control valve 25 in this case will be described later with reference to the drawings.

Then, the control device 50 controls the operation of the electric heater 24 to adjust the amount of heat generated by the electric heater 24. The control content of the electric heater 24 in this case will also be described later with reference to the drawings.

Thus, in the high-temperature side heat medium circuit 21 in the cooling and heating mode, a circulation circuit of the high-temperature side heat medium circulating through the high-temperature side pump 26, the heat medium refrigerant heat exchanger 12, the electric heater 24, the high-temperature side flow rate control valve 25, the heater core 23, and the high-temperature side pump 26 in this order is formed. At the same time, a circulation circuit of the high-temperature side heat medium circulating through the high-temperature side pump 26, the heat medium refrigerant heat exchanger 12, the electric heater 24, the high-temperature side flow rate control valve 25, the radiator 22, and the high-temperature side pump 26 in this order is formed.

That is, in the high-temperature side heat medium circuit 21 in the cooling and heating mode, a heat medium circuit in which the radiator 22 and the heater core 23 are connected in parallel with the flow of the high-temperature side heat medium flowing out of the heat medium refrigerant heat exchanger 12 is formed.

For the low-temperature side heat medium circuit 30 in the cooling and heating mode, the control device 50 controls the operation of the low-temperature side pump 34 so as to exhibit the hydraulic pressure feeding capability in the cooling and heating mode. The control device 50 controls the operation of the low-temperature side flow rate control valve 33 so as to communicate the inflow-outflow port on the chiller 16 side with the inflow-outflow port on the battery 31 side and close the inflow-outflow port on the outside air heat exchanger 32 side.

Thus, in the low-temperature side heat medium circuit 30 in the cooling and heating mode, a circulation circuit of the low-temperature side heat medium circulating through the low-temperature side pump 34, the battery 31, the low-temperature side flow rate control valve 33, the chiller 16, and the low-temperature side pump 34 in this order is formed.

As illustrated in FIG. 1, in the low-temperature side heat medium circuit 30, the battery 31 and the outside air heat exchanger 32 are connected in parallel with respect to the flow of the low-temperature side heat medium passing through the chiller 16. Therefore, by controlling the operation of the low-temperature side flow rate control valve 33, it is also possible to adjust a flow rate ratio between the flow rate of the low-temperature side heat medium with respect to the battery 31 and the flow rate of the low-temperature side heat medium with respect to the outside air heat exchanger 32. In this case, in addition to the circulation circuit described above, a circulation circuit that circulates through the low-temperature side pump 34, the outside air heat exchanger 32, the low-temperature side flow rate control valve 33, the chiller 16, and the low-temperature side pump 34 in this order is simultaneously formed in the low-temperature side heat medium circuit 30.

In the air conditioner 1 in the cooling and heating mode, the amount of heat absorbed while cooling the battery 31 in the low-temperature side heat medium circuit 30 can be absorbed by the low-pressure refrigerant of the heat pump cycle 10 in the chiller 16. In the air conditioner 1 in the cooling and heating mode, the heat absorbed from the low-temperature side heat medium in the heat pump cycle 10 can be dissipated to the high-temperature side heat medium by the heat medium refrigerant heat exchanger 12.

By controlling the operation of the high-temperature side flow rate control valve 25 in the high-temperature side heat medium circuit 21, the heat dissipation amount of the high-temperature side heat medium in the heater core 23 and the heat dissipation amount of the high-temperature side heat medium in the radiator 22 can be adjusted. In other words, the air conditioner 1 can dissipate the heat of the high-temperature side heat medium that is excessive for heating of the blown air W to the outside air OA at the radiator 22.

Further, in the cooling and heating mode, the high-temperature side heat medium can be heated by the electric heater 24 in the high-temperature side heat medium circuit 21. Therefore, the air conditioner 1 can appropriately heat the blown air W by the heater core 23 and heat the vehicle interior by appropriately adjusting the amount of heat generated by the electric heater 24.

(g) Cooling, Dehumidifying, and Heating Mode

The cooling, dehumidifying, and heating mode is an operation mode in which the blown air W cooled by the interior evaporator 15 is heated by the heater core 23 and blown into the vehicle interior in parallel with cooling of the battery 31. In this cooling, dehumidifying, and heating mode, the control device 50 opens the first expansion valve 14a and the second expansion valve 14b at respective predetermined throttle opening degrees.

Accordingly, in the heat pump cycle 10 in the cooling, dehumidifying, and heating mode, the refrigerant circulates through the compressor 11, the heat medium refrigerant heat exchanger 12, the first expansion valve 14a, the interior evaporator 15, the evaporating pressure adjusting valve 17, and the compressor 11 in this order. At the same time, the refrigerant circulates through the compressor 11, the heat medium refrigerant heat exchanger 12, the second expansion valve 14b, the chiller 16, and the compressor 11 in this order.

That is, in the heat pump cycle 10 in the cooling, dehumidifying, and heating mode, a heat pump cycle is formed in which the interior evaporator 15 and the chiller 16 are connected in parallel with the flow of the refrigerant flowing out of the heat medium refrigerant heat exchanger 12.

In this cycle configuration, the control device 50 controls the operation of various control target devices connected to the output side. For example, the control device 50 controls the operation of the compressor 11 so as to exhibit the refrigerant discharge capacity determined in the cooling, dehumidifying, and heating mode.

With respect to the heating unit 20 in the cooling, dehumidifying, and heating mode, the control device 50 controls the operation of the high-temperature side pump 26 so as to exhibit a predetermined hydraulic pressure feeding capability in the cooling, dehumidifying, and heating mode. As in the cooling and heating mode, the control device 50 controls the operation of the high-temperature side flow rate control valve 25 to adjust the flow rate ratio between the flow rate of the high-temperature side heat medium with respect to the radiator 22 and the flow rate of the high-temperature side heat medium with respect to the heater core 23.

Then, the control device 50 controls the operation of the electric heater 24 to adjust the amount of heat generated by the electric heater 24. The control content of the electric heater 24 in this case will also be described later with reference to the drawings.

Thus, in the high-temperature side heat medium circuit 21 in the cooling, dehumidifying, and heating mode, a circulation circuit of the high-temperature side heat medium circulating through the high-temperature side pump 26, the heat medium refrigerant heat exchanger 12, the electric heater 24, the high-temperature side flow rate control valve 25, the heater core 23, and the high-temperature side pump 26 in this order is formed. At the same time, a circulation circuit of the high-temperature side heat medium circulating through the high-temperature side pump 26, the heat medium refrigerant heat exchanger 12, the electric heater 24, the high-temperature side flow rate control valve 25, the radiator 22, and the high-temperature side pump 26 in this order is formed.

That is, in the high-temperature side heat medium circuit 21 in the cooling, dehumidifying, and heating mode, a heat medium circuit in which the radiator 22 and the heater core 23 are connected in parallel with the flow of the high-temperature side heat medium flowing out of the heat medium refrigerant heat exchanger 12 is formed.

For the low-temperature side heat medium circuit 30 in the cooling, dehumidifying, and heating mode, the control device 50 controls the operation of the low-temperature side pump 34 so as to exhibit the hydraulic pressure feeding capability in the cooling, dehumidifying, and heating mode. The control device 50 controls the operation of the low-temperature side flow rate control valve 33 so as to communicate the inflow-outflow port on the chiller 16 side with the inflow-outflow port on the battery 31 side and close the inflow-outflow port on the outside air heat exchanger 32 side.

Thus, in the low-temperature side heat medium circuit 30 in the cooling, dehumidifying, and heating mode, a circulation circuit for circulating through the low-temperature side pump 34, the battery 31, the low-temperature side flow rate control valve 33, the chiller 16, and the low-temperature side pump 34 in this order is formed.

In the air conditioner 1 in the cooling, dehumidifying, and heating mode, the amount of heat absorbed while cooling the battery 31 in the low-temperature side heat medium circuit 30 can be absorbed by the low-pressure refrigerant of the heat pump cycle 10 in the chiller 16. In the air conditioner 1 in the cooling, dehumidifying, and heating mode, in the heat pump cycle 10, the heat absorbed from the low-temperature side heat medium and the heat absorbed while dehumidifying the blown air W can be dissipated to the high-temperature side heat medium by the heat medium refrigerant heat exchanger 12.

By controlling the operation of the high-temperature side flow rate control valve 25 in the high-temperature side heat medium circuit 21, the heat dissipation amount of the high-temperature side heat medium in the heater core 23 and the heat dissipation amount of the high-temperature side heat medium in the radiator 22 can be adjusted. In other words, the air conditioner 1 can dissipate the heat of the high-temperature side heat medium that is excessive for heating of the dehumidified blown air W to the outside air OA at the radiator 22.

Further, in the cooling, dehumidifying, and heating mode, the high-temperature side heat medium can be heated by the electric heater 24 in the high-temperature side heat medium circuit 21. Thus, the air conditioner 1 can appropriately adjust the amount of heat generated by the electric heater 24 so as to appropriately heat the dehumidified blown air W to dehumidify and heat the vehicle interior.

Here, in the cooling and heating mode and the cooling, dehumidifying, and heating mode, the amount of heat that can be dissipated to the high-temperature side heat medium by the heat medium refrigerant heat exchanger 12 corresponds to the sum of the amount of heat absorbed from the blown air W by the interior evaporator 15, the amount of heat absorbed from the low-temperature side heat medium by the chiller 16, and a compression workload in the compressor 11.

The battery 31 in the air conditioner 1 tends to decrease in output at a low temperature, and tends to deteriorate at a high temperature. Thus, when the low-temperature side heat medium is circulated in order to maintain the battery 31 in an appropriate temperature range, the amount of heat absorbed from the low-temperature side heat medium by the chiller 16 fluctuates according to the magnitude of the waste heat generated in the battery 31.

Accordingly, the amount of heat dissipated to the high-temperature side heat medium by the heat medium refrigerant heat exchanger 12 fluctuates according to the magnitude of the waste heat generated in the battery 31. Consequently, when all the amount of heat dissipated to the high-temperature side heat medium by the heat medium refrigerant heat exchanger 12 is used for heating the blown air W by the heater core 23, the temperature of the blown air W fluctuates, and it is assumed that the comfort in the vehicle interior is affected.

In the air conditioner 1 according to the first embodiment, the operation control of the high-temperature side flow rate control valve 25 and the control of the heat generation amount by the electric heater 24 are performed to suppress the temperature fluctuation of the blown air W in the cooling and heating mode and the cooling, dehumidifying, and heating mode, thereby increasing the comfort in the vehicle interior.

Next, content of adjustment control of the heat dissipation amount by the high-temperature side flow rate control valve 25 and adjustment control of the amount of heat generated by the electric heater 24 in the air conditioner 1 according to the first embodiment will be described with reference to FIGS. 4 to 6.

Figure 4:
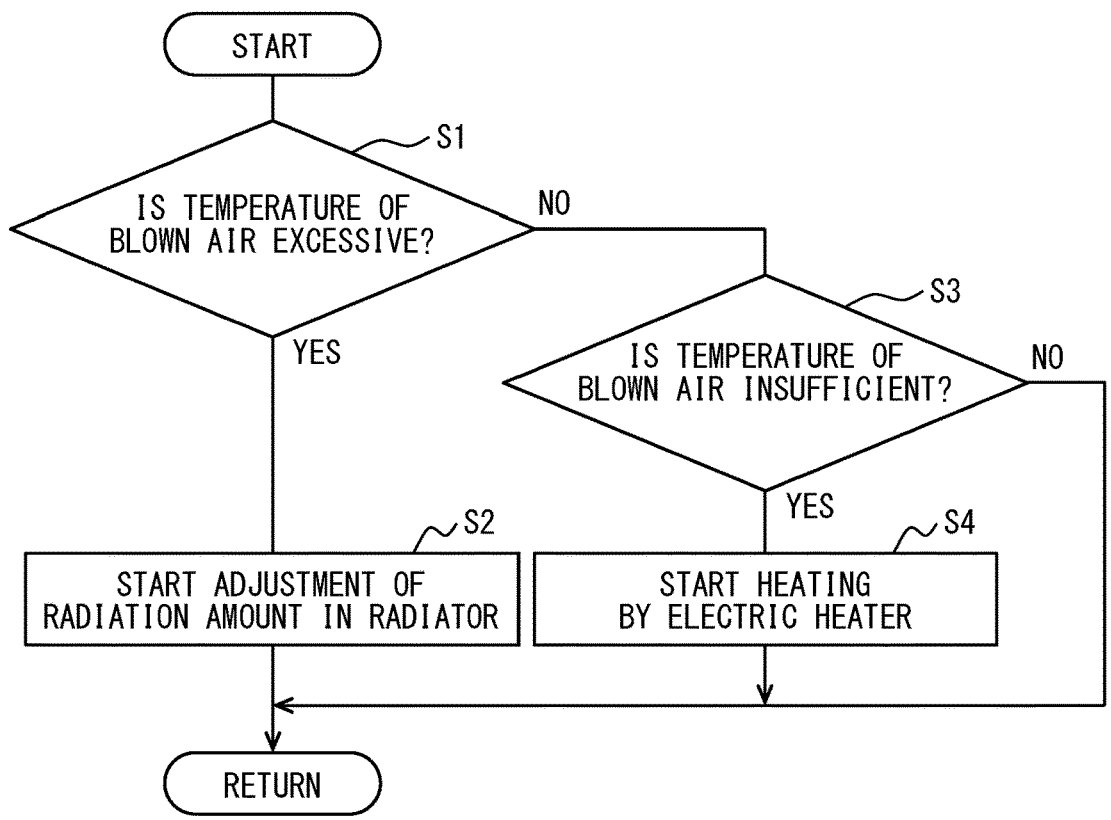
FIG. 4 is a flowchart of control processing related to adjustment of a heat dissipation amount and start of heating according to the first embodiment.

FIG. 4 illustrates control content related to start of heat dissipation amount adjustment by the high-temperature side flow rate control valve 25 and start of heat generation amount adjustment of the electric heater 24. A control program according to FIG. 4 is executed by the control device 50 at a time point when the operation mode has switched to either the cooling and heating mode or the cooling, dehumidifying, and heating mode.

In step S1, it is determined whether or not the blown air temperature detected by the blown air temperature sensor 52f is excessive. Here, a state where the blown air temperature is excessive means a state where the blown air temperature is higher than an upper limit value of a predetermined temperature range determined on the basis of the target blown air temperature TAO as the target temperature. When it is determined that the blown air temperature is excessive, the processing proceeds to step S2. On the other hand, when it is determined that the blown air temperature is not excessive, the processing proceeds to step S3.

In step S2, in order to cause the blown air temperature to be equal to the target blown air temperature TAO, since the heat of the high-temperature side heat medium is excessive, adjustment of the heat dissipation amount in the radiator 22 of the high-temperature side heat medium circuit 21 is started.

That is, adjustment of balance between the heat dissipation amount dissipated from the high-temperature side heat medium to the outside air OA at the radiator 22 and the heat dissipation amount used for heating the blown air W from the high-temperature side heat medium at the heater core 23 is started. Thereafter, the control program of FIG. 4 is terminated.

When the blown air temperature is excessive with respect to the target blown air temperature TAO, by adjusting the heat dissipation amount in the radiator 22 by the high-temperature side heat medium circuit 21, excessive heat can be dissipated from the high-temperature side heat medium to the outside air OA, thereby making it possible to bring the blown air temperature close to the target blown air temperature TAO.

Then, in step S3, it is determined whether or not the blown air temperature detected by the blown air temperature sensor 52$f$ is insufficient. Here, a state where the blown air temperature is insufficient means a state where the blown air temperature is lower than a lower limit value of the predetermined temperature range determined on the basis of the target blown air temperature TAO as the target temperature.

When it is determined that the blown air temperature is insufficient, the processing proceeds to step S4. When it is determined that the blown air temperature is not insufficient, the control program of FIG. 4 is terminated. Therefore, when the blown air temperature is within the temperature range determined on the basis of the target blown air temperature TAO, the control program ends as it is.

When the processing proceeds to step S4, in order to cause the blown air temperature to be equal to the target blown air temperature TAO, since the heat of the high-temperature side heat medium is insufficient, heating by the electric heater 24 of the high-temperature side heat medium circuit 21 is started. Thereafter, the control program of FIG. 4 is terminated.

When the blown air temperature is insufficient with respect to the target blown air temperature TAO, by heating the high-temperature side heat medium by the electric heater 24 in the high-temperature side heat medium circuit 21, the insufficient amount of heat can be compensated, thereby making it possible to bring the blown air temperature close to the target blown air temperature TAO.

Next, control content of heat dissipation amount adjustment by the high-temperature side flow rate control valve 25 in the first embodiment will be described with reference to the drawings. A control program illustrated in FIG. 5 is executed by the control device 50 at the same time as the adjustment of the heat dissipation amount by the high-temperature side flow rate control valve 25 is started in step S2 described above.

Figure 5:
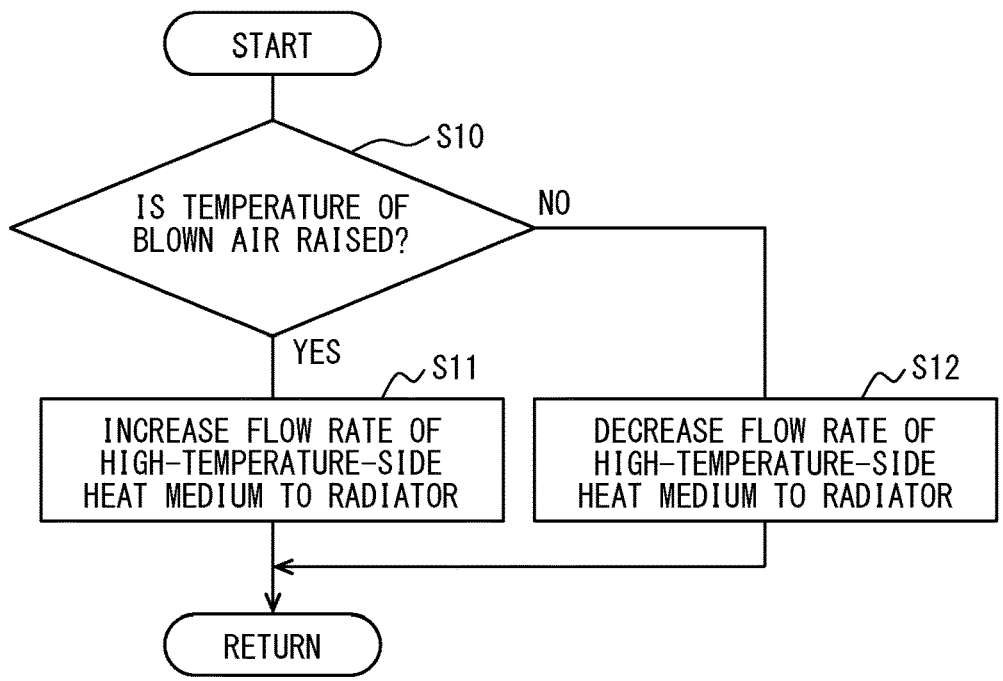
FIG. 5 is a flowchart of control processing related to adjustment of the heat dissipation amount in the air conditioner.

As illustrated in FIG. 5, in step S10, it is determined whether or not the blown air temperature detected by the blown air temperature sensor 52$f$ has increased. When it is determined that the blown air temperature has increased, the processing proceeds to step S11. On the other hand, when it is determined that the blown air temperature has not increased, the processing proceeds to step S12.

In step S11, it is a state where, since the heat dissipation amount in the heat medium refrigerant heat exchanger 12 is larger than the sum of the heat dissipation amounts in the heater core 23 and the radiator 22, the temperature of the high-temperature side heat medium in the high-temperature side heat medium circuit 21 has increased, and consequently, it is determined that the blown air temperature has increased. Therefore, the high-temperature side flow rate control valve 25 is controlled such that the flow rate of the high-temperature side heat medium with respect to the radiator 22 increases.

Thus, the heat dissipation amount in the radiator 22 increases, and thus the heat dissipation amount in the heat medium refrigerant heat exchanger 12 approaches the sum of the heat dissipation amounts in the heater core 23 and the radiator 22. Therefore, by performing the operation of the high-temperature side flow rate control valve 25 in step S11, a temperature rise of the high-temperature side heat medium in the high-temperature side heat medium circuit 21 can be suppressed, and a rise in the blown air temperature can also be suppressed. Consequently, the blown air temperature approaches the target blown air temperature TAO. Thereafter, the control program illustrated in FIG. 5 is terminated.

In step S12, it is a state where, since the heat dissipation amount in the heat medium refrigerant heat exchanger 12 is smaller than the sum of the heat dissipation amounts in the heater core 23 and the radiator 22, the temperature of the high-temperature side heat medium in the high-temperature side heat medium circuit 21 has decreased, and consequently, it is determined that the blown air temperature has decreased. Therefore, the high-temperature side flow rate control valve 25 is controlled such that the flow rate of the high-temperature side heat medium decreases.

Thus, since the heat dissipation amount in the radiator 22 decreases, the sum of the heat dissipation amounts in the heater core 23 and the radiator 22 approaches the heat dissipation amount in the heat medium refrigerant heat exchanger 12. Therefore, by operating the high-temperature side flow rate control valve 25 in step S12, it is possible to suppress a decrease in the temperature of the high-temperature side heat medium in the high-temperature side heat medium circuit 21 and to suppress a decrease in the blown air temperature. Consequently, the blown air temperature approaches the target blown air temperature TAO. Thereafter, the control program illustrated in FIG. 5 is terminated.

The control program illustrated in FIG. 5 is repeatedly executed after the heat dissipation amount adjustment by the high-temperature side flow rate control valve 25 is started in step S2 unless the operation mode of the air conditioner 1 is switched from the cooling and air-cooling mode and the cooling, dehumidifying, and heating mode.

Then, by controlling the operation of the high-temperature side flow rate control valve 25 according to the control program illustrated in FIG. 5, it is possible to adjust a ratio of an excessive amount of heat to be dissipated to the outside air OA at the radiator 22 from the heat of the high-temperature side heat medium including the waste heat accompanying the cooling of the battery 31.

Therefore, in the cooling and heating mode and the cooling, dehumidifying, and heating mode, the air conditioner 1 can bring the blown air temperature close to the target blown air temperature TAO while suppressing the influence of the magnitude of the waste heat of the battery 31 by controlling the operation of the high-temperature side flow rate control valve 25.

In the radiator 22 and the heater core 23, the radiator has a larger heat exchange capacity. Specifically, the radiator 22 is configured to be larger than the heater core 23 in both the heat transfer area on the heat medium side and the heat transfer area on the air side. Thus, the amount of heat dissipation performance adjustment of the radiator 22 by the high-temperature side flow rate control valve 25 becomes relatively larger than the amount of heat dissipation performance adjustment of the heater core 23. Therefore, the blown air temperature can be brought close to the target blown air temperature TAO while suppressing the influence of the waste heat of the larger battery 31.

Next, control content of heat generation amount adjustment of the electric heater 24 in the first embodiment will be described with reference to the drawings. A control program illustrated in FIG. 6 is executed by the control device 50 at the same time as the heating of the high-temperature side heat medium by the electric heater 24 is started in step S4 described above.

Figure 6:
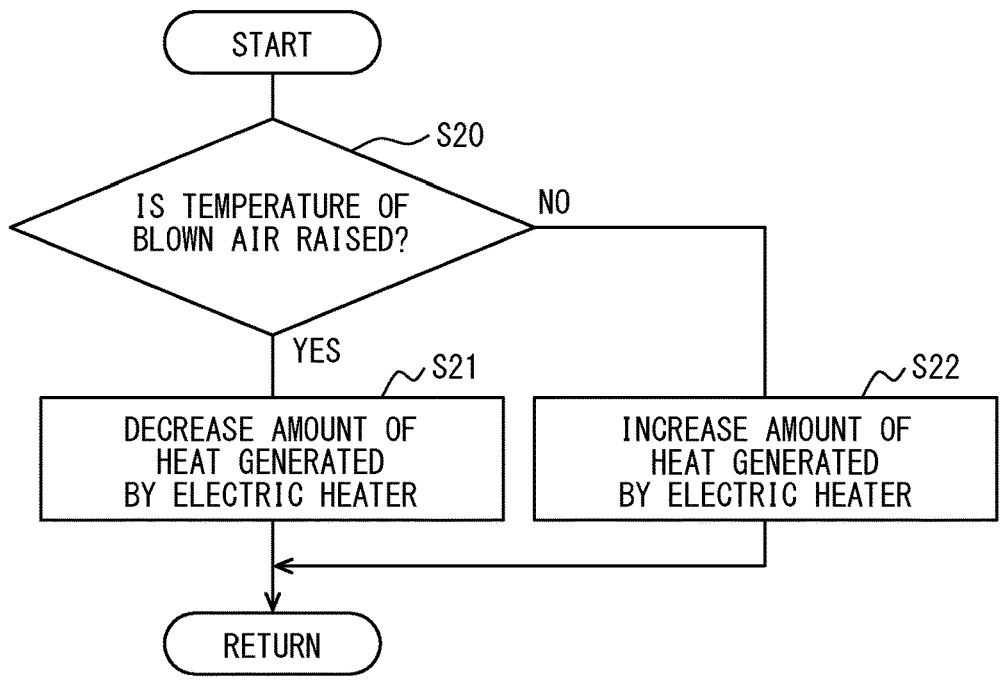
FIG. 6 is a flowchart of control processing related to adjustment of a heat generation amount of an electric heater in the air conditioner.

As illustrated in FIG. 6, first, in step S20, it is determined whether or not the blown air temperature detected by the blown air temperature sensor 52f has increased. When it is determined that the blown air temperature has increased, the processing proceeds to step S21. On the other hand, when it is determined that the blown air temperature has not increased, the processing proceeds to step S22.

In step S21, it is a state where, since the sum of the heat dissipation amount in the heat medium refrigerant heat exchanger 12 and the amount of heat generated by the electric heater 24 is larger than the heat dissipation amount of the heater core 23, the temperature of the high-temperature side heat medium in the high-temperature side heat medium circuit 21 has increased, and it is determined that the blown air temperature has increased. Therefore, the electric heater 24 is controlled so as to reduce the amount of heat generated by the electric heater 24.

Thus, the sum of the heat dissipation amount in the heat medium refrigerant heat exchanger 12 and the amount of heat generated by the electric heater 24 approaches the heat dissipation amount of the heater core 23. Therefore, by suppressing a temperature rise of the high-temperature side heat medium in the high-temperature side heat medium circuit 21, a rise in the blown air temperature can also be suppressed. Thus, the blown air temperature approaches the target blown air temperature TAO. Thereafter, the control program illustrated in FIG. 6 is terminated.

In step S21, it is a state where, since the sum of the heat dissipation amount in the heat medium refrigerant heat exchanger 12 and the amount of heat generated by the electric heater 24 is larger than the heat dissipation amount of the heater core 23, the temperature of the heat medium in the high-temperature side heat medium circuit 21 has increased, and consequently, it is determined that the blown air temperature has increased. Therefore, the electric heater 24 is controlled so as to reduce the amount of heat generated by the electric heater 24.

Thus, the sum of the heat dissipation amount in the heat medium refrigerant heat exchanger 12 and the amount of heat generated by the electric heater 24 approaches the heat dissipation amount of the heater core 23. Therefore, by suppressing a temperature rise of the high-temperature side heat medium in the high-temperature side heat medium circuit 21, a rise in the blown air temperature can also be suppressed. Consequently, the blown air temperature approaches the target blown air temperature TAO. Thereafter, the control program illustrated in FIG. 6 is terminated.

In step S22, it is a state where, since the sum of the heat dissipation amount in the heat medium refrigerant heat exchanger 12 and the amount of heat generated by the electric heater 24 is smaller than the heater core 23 heat dissipation amount, the temperature of the high-temperature side heat medium in the high-temperature side heat medium circuit 21 has decreased, and it is determined that the blown air temperature has decreased. Therefore, the electric heater 24 is controlled so as to increase the amount of heat generated by the electric heater 24.

Thus, the sum of the heat dissipation amount in the heat medium refrigerant heat exchanger 12 and the amount of heat generated by the electric heater 24 approaches the heat dissipation amount of the heater core 23. Therefore, by suppressing a decrease in the temperature of the high-temperature side heat medium in the high-temperature side heat medium circuit 21, a rise in the blown air temperature can also be suppressed. Thus, the blown air temperature approaches the target blown air temperature TAO. Thereafter, the control program illustrated in FIG. 6 is terminated.

After the heating of the high-temperature heat medium by the electric heater 24 is started in step S4, the control program illustrated in FIG. 6 is repeatedly executed unless the operation mode of the air conditioner 1 is switched from the cooling and air-cooling mode and the cooling, dehumidifying, and heating mode.

Then, by controlling the operation of the electric heater 24 according to the control program illustrated in FIG. 6, it is possible to compensate for insufficiency by adding the amount of heat insufficient for achieving the target blown air temperature TAO to the high-temperature side heat medium including the waste heat accompanying the cooling of the battery 31.

As described above, in the air conditioner 1 according to the first embodiment, in the cooling and heating mode and the cooling, dehumidifying, and heating mode, the waste heat absorbed along with the cooling of the battery 31 can be pumped up by the heat pump cycle 10 and used for heating the blown air W.

In the cooling and heating mode and the cooling, dehumidifying, and heating mode, the air conditioner 1 can adjust the heat dissipation amount in the radiator 22 and the amount of heat generated by the electric heater 24 by the high-temperature side flow rate control valve 25 according to the relationship between the blown air temperature and the target blown air temperature TAO.

That is, the air conditioner 1 can control the operation of the high-temperature side flow rate control valve 25 so as to dissipate an appropriate amount of excessive heat from the high-temperature side heat medium to the outside air OA at the radiator 22. The air conditioner 1 can control the amount of heat generated by the electric heater 24 so as to compensate for the amount of heat required to cause the blown air temperature to be equal to the target blown air temperature TAO by heating of the high-temperature side heat medium by the electric heater 24.

Therefore, the air conditioner 1 according to the first embodiment can bring the blown air temperature close to the target blown air temperature TAO while suppressing the influence of fluctuation in the amount of heat of the waste heat of the battery 31 by adjusting the amount of heat of the high-temperature side heat medium.

In the air conditioner 1 according to the first embodiment, the operation mode is switched by executing the control program stored in advance in the control device 50. The switching of the operation mode of the air conditioner 1 includes a case of switching from the cooling and heating mode to the cooling, dehumidifying, and heating mode and a case of switching from the cooling, dehumidifying, and heating mode to the cooling and heating mode.

Here, the case of switching from the cooling and heating mode to the cooling, dehumidifying, and heating mode corresponds to a case of starting cooling of the blown air W by the interior evaporator 15 from a state where the cooling of the blown air W is stopped while the battery 31 is being cooled. The case of switching from the cooling, dehumidifying, and heating mode to the cooling and heating mode corresponds to a case of terminating the cooling of the blown air W from a state where the blown air W is cooled by the interior evaporator 15 in a state where the battery 31 is cooled.

In the case of switching from the cooling and heating mode to the cooling, dehumidifying, and heating mode, the control device 50 decreases the opening degree of the second expansion valve 14b as compared with that in the cooling and heating mode. Thus, an opening area of the refrigerant in the second expansion valve 14b decreases, and the refrigerant flow rate in the chiller 16 decreases, so that a heat absorption amount from the low-temperature side heat medium in the chiller 16 can be decreased. That is, in the air conditioner 1, the performance is not excessively taken for cooling the battery 31, and thus it is possible to restrict a decrease in heat absorbing capability in the interior evaporator 15.

Further, in the case of switching from the cooling and heating mode to the cooling, dehumidifying, and heating mode, the control device 50 increases the opening degree of the first expansion valve 14a as compared with that in the cooling and heating mode. Thus, an opening area in the first expansion valve 14a increases, and the refrigerant flow rate in the interior evaporator 15 increases, so that a heat absorption amount from the blown air W in the interior evaporator 15 can be increased. That is, in the air conditioner 1, the heat absorbing capability in the interior evaporator 15 can be exhibited while the cooling performance of the battery 31 is maintained.

As described above, in a case where the ratio of the opening area in the second expansion valve 14b to the sum of the opening area in the first expansion valve 14a and the opening area in the second expansion valve 14b is assumed as an opening area ratio, the control of the case can be expressed as follows.

In the case of switching from the cooling and heating mode to the cooling, dehumidifying, and heating mode, the air conditioner 1 according to the first embodiment controls the opening area ratio to be smaller after start of cooling of the blown air than it is before the start of cooling of the blown air. As long as this condition is satisfied, the first expansion valve 14a described above may be controlled alone, or the second expansion valve 14b may be controlled alone. By performing these controls in the case of switching from the cooling and heating mode to the cooling, dehumidifying, and heating mode, the air conditioner 1 can exhibit the heat absorbing capability in the interior evaporator 15 while maintaining the cooling performance of the battery 31.

In the case of switching from the cooling, dehumidifying, and heating mode to the cooling and heating mode, the control device 50 increases the opening degree of the second expansion valve 14b as compared with that in the cooling, dehumidifying, and heating mode. Thus, the opening area of the second expansion valve 14b increases, and the refrigerant flow rate in the chiller 16 can be increased, so that the heat absorption amount from the low-temperature side heat medium in the chiller 16 can be increased. That is, in the air conditioner 1, the low-temperature side heat medium having a low temperature can be supplied to the heat medium passage of the battery 31, and thus the cooling performance of the battery 31 can be improved.

Further, in the case of switching from the cooling, dehumidifying, and heating mode to the cooling and heating mode, the control device 50 decreases the opening degree of the first expansion valve 14a as compared with that in the cooling and heating mode. Thus, the opening area of the first expansion valve 14a decreases, and the refrigerant flow rate in the interior evaporator 15 decreases, so that the heat absorption amount from the blown air W in the interior evaporator 15 can be decreased. That is, in the air conditioner 1, the capability used for cooling the blown air W in the cooling, dehumidifying, and heating mode can be used for cooling the battery 31, and thus the cooling performance of the battery 31 can be improved.

In the case of switching from the cooling, dehumidifying, and heating mode to the cooling and heating mode, the air conditioner 1 according to the first embodiment controls the opening area ratio to be larger after start of cooling of the blown air than it is before the start of cooling of the blown air. As long as this condition is satisfied, the first expansion valve 14a described above may be controlled alone, or the second expansion valve 14b may be controlled alone. By performing these controls in the case of switching from the cooling, dehumidifying, and heating mode to the cooling and heating mode, the air conditioner 1 can exhibit the heat absorbing capability in the interior evaporator 15 while maintaining the cooling performance of the battery 31.

As described above, in the air conditioner 1 according to the first embodiment, a plurality of operation modes including the cooling and heating mode and the cooling, dehumidifying, and heating mode can be achieved by causing the heat pump cycle 10, the heating unit 20, and the low-temperature side heat medium circuit 30 to cooperate with each other.

In the cooling and heating mode and the cooling, dehumidifying, and heating mode, the air conditioner 1 can cool the battery 31 via the low-temperature side heat medium, and also pump up the waste heat of the battery 31 by the heat pump cycle 10 to use the waste heat for heating the blown air W. That is, the air conditioner 1 can achieve the air conditioning of the air conditioning target space using the waste heat of the battery 31 while cooling the battery 31.

As illustrated in FIG. 5, the air conditioner 1 can adjust the amount of heat dissipated to the blown air W by the heater core 23 by adjusting the heat dissipation amount in the radiator 22 by the high-temperature side flow rate control valve 25. Therefore, by adjusting the operation of the high-temperature side flow rate control valve 25 such that the blown air temperature approaches the predetermined target blown air temperature TAO, the influence of the heat generation amount of the battery 31 on the blown air temperature supplied into the vehicle interior can be adjusted.

That is, the air conditioner 1 can improve the comfort of the air conditioning target space regardless of the heat generation amount of the battery 31 upon air-conditioning the air conditioning target space using the waste heat of the battery 31 in the cooling and heating mode and the cooling, dehumidifying, and heating mode.

As illustrated in FIG. 4, when the blown air temperature is excessive with respect to the target blown air temperature TAO, the air conditioner 1 starts adjustment of the heat dissipation amount of the radiator 22 by the high-temperature side flow rate control valve 25.

Thus, the air conditioner 1 can appropriately dissipate the excessive heat, which is excessive to cause the blown air temperature to be equal to the target blown air temperature TAO, from the radiator 22 to the outside air OA, and thus it is possible to ensure the comfort in the vehicle interior even when the heat generation amount of the battery 31 increases.

In the air conditioner 1, the heat exchange capacity of the radiator 22 is higher than the heat exchange capacity of the heater core 23. Therefore, in the air conditioner 1, the amount of heat dissipation performance adjustment of the radiator 22 by the high-temperature side flow rate control valve 25 is relatively larger than the amount of heat dissipation performance adjustment of the heater core 23. Therefore, the blown air temperature can be brought close to the target blown air temperature TAO while suppressing the influence of the waste heat of the larger battery 31.

As illustrated in FIG. 1, the heating unit 20 includes the high-temperature side heat medium circuit 21, and the high-temperature side heat medium circuit 21 is formed by connecting the radiator 22 and the heater core 23 in parallel with the heat medium refrigerant heat exchanger 12.

In the air conditioner 1, by forming the heating unit 20 by the high-temperature side heat medium circuit 21 including the radiator 22 and the heater core 23, the heat dissipation amount to the outside air OA in the radiator 22 and the heat dissipation amount to the blown air W in the heater core 23 can be adjusted by adjusting the flow rate of the high-temperature side heat medium.

Further, the high-temperature side flow rate control valve 25 in the air conditioner 1 continuously adjusts the flow rate ratio of the flow rate of the high-temperature side heat medium with respect to the heater core 23 and the high-temperature side heat medium with respect to the radiator 22 in the high-temperature side heat medium circuit 21.

Thus, the air conditioner 1 can adjust the heat dissipation amount in the heater core 23 along with adjustment of the heat dissipation amount by the radiator 22, and can ensure the comfort in the vehicle interior with a simpler configuration and with higher accuracy.

The air conditioner 1 includes the electric heater 24 capable of heating the high-temperature side heat medium with an arbitrary amount of heat in the high-temperature side heat medium circuit 21, and adjusts the amount of heat generated by the electric heater 24 such that the blown air temperature approaches the target blown air temperature TAO as illustrated in FIG. 6.

Therefore, the air conditioner 1 can adjust the amount of heat of the high-temperature side heat medium by adjusting the amount of heat generated by the electric heater 24, and consequently can adjust the amount of heat dissipated to the blown air W by the heater core 23.

That is, the air conditioner 1 can improve the comfort of the air conditioning target space regardless of the heat generation amount of the battery 31 upon air-conditioning the air conditioning target space using the waste heat of the battery 31 in the cooling and heating mode and the cooling, dehumidifying, and heating mode.

As illustrated in FIG. 4, the air conditioner 1 starts heating the high-temperature side heat medium by the electric heater 24 when the blown air temperature is insufficient with respect to the target blown air temperature TAO.

Thus, the air conditioner 1 can compensate for the amount of heat, which is insufficient to cause the blown air temperature to reach the target blown air temperature TAO, by heating by the electric heater 24, and thus it is possible to ensure the comfort in the vehicle interior even when the heat generation amount of the battery 31 decreases.

As illustrated in FIG. 1, in the heat pump cycle 10 of the air conditioner 1, the first expansion valve 14a and the interior evaporator 15 are connected in parallel with the second expansion valve 14b and the chiller 16.

Therefore, in the air conditioner 1, the blown air W blown into the vehicle interior can be cooled by the interior evaporator 15 in parallel with cooling of the battery 31 using the chiller 16. That is, the air conditioner 1 can further improve the comfort in the vehicle interior at the same time as the cooling of the battery 31.

When the air conditioner 1 starts cooling the blown air W from a state where the cooling of the blown air W is stopped in a state where the battery 31 is cooled, the opening area ratio determined by the opening areas of the first expansion valve 14a and the second expansion valve 14b is controlled. The opening area ratio in this case is controlled to be smaller after the start of cooling of the blown air W than it is before the start of cooling of the blown air W.

Thus, the air conditioner 1 can appropriately adjust the heat absorption amounts in the interior evaporator 15 and the chiller 16 when cooling of the blown air W is started from a state where the cooling of the blown air W is stopped in a state where the battery 31 is cooled. Accordingly, the air conditioner 1 can exhibit the heat absorbing capability in the interior evaporator 15 while maintaining the cooling performance of the battery 31.

When the air conditioner 1 ends cooling the blown air W from a state where the blown air W is cooled in a state where the battery 31 is cooled, the opening area ratio determined by the opening areas of the first expansion valve 14a and the second expansion valve 14b is controlled. The opening area ratio in this case is controlled to be larger after the end of cooling of the blown air W than it is before the end of cooling of the blown air W.

Thus, the air conditioner 1 can appropriately adjust the heat absorption amounts in the interior evaporator 15 and the chiller 16 also when the cooling of the blown air W is ended from a state where the blown air W is cooled in a state where the battery 31 is cooled. Accordingly, the air conditioner 1 can exhibit the heat absorbing capability in the interior evaporator 15 while maintaining the cooling performance of the battery 31.

Second Embodiment

Next, a second embodiment different from the first embodiment will be described with reference to FIGS. 7 to 9. In the second embodiment, in the cooling and heating mode and the cooling, dehumidifying, and heating mode, control in the heating unit 20 is performed as in the first embodiment described above, and control in the low-temperature side heat medium circuit 30 is performed.

Specifically, in the second embodiment, by controlling the low-temperature side flow rate control valve 33, temperature fluctuation of the blown air W accompanying fluctuation of the waste heat of the battery 31 is suppressed in a state where the cooling capacity for the battery 31 is maintained, and the comfort in the vehicle interior is enhanced. The air conditioner 1 according to the second embodiment is different from the first embodiment in control of the low-temperature side heat medium circuit 30, and the basic configuration and the like of the air conditioner 1 are similar to those of the first embodiment.

Also in the second embodiment, in the cooling and heating mode and the cooling, dehumidifying, and heating mode, the amount of heat that can be dissipated to the high-temperature side heat medium by the heat medium refrigerant heat exchanger 12 includes the amount of heat absorbed from the low-temperature side heat medium by the chiller 16.

In the cooling and heating mode and the cooling, dehumidifying, and heating mode according to the second embodiment, the control device 50 controls the operation of the low-temperature side flow rate control valve 33 to adjust the flow rate ratio between the flow rate of the low-temperature side heat medium with respect to the battery 31 and the flow rate of the low-temperature side heat medium with respect to the outside air heat exchanger 32.

Thus, the amount of heat absorbed from the low-temperature side heat medium by the chiller 16 includes the amount of heat absorbed by the low-temperature side heat medium from the battery 31 while cooling the battery 31 and the amount of heat exchanged between the low-temperature side heat medium and the outside air OA in the outside air heat exchanger 32.

Therefore, the amount of heat that can be dissipated to the high-temperature side heat medium by the heat medium refrigerant heat exchanger 12 can be adjusted by the amount of heat absorbed by the low-temperature side heat medium from the battery 31 while cooling the battery 31 and the amount of heat exchanged between the low-temperature side heat medium and the outside air OA in the outside air heat exchanger 32 in the low-temperature side heat medium circuit 30.

In the air conditioner 1 of the second embodiment, by controlling the low-temperature side flow rate control valve 33 in the cooling and heating mode and the cooling, dehumidifying, and heating mode, the temperature fluctuation of the blown air W accompanying the fluctuation of the waste heat of the battery 31 is suppressed in a state where the cooling capacity for the battery 31 is maintained, and the comfort in the vehicle interior is enhanced.

Operation control of the low-temperature side flow rate control valve 33 of the air conditioner 1 according to the second embodiment will be described with reference to FIGS. 7 to 9. First, control content related to adjustment of the heat dissipation amount in the low-temperature side heat medium circuit 30 according to the second embodiment will be described with reference to the drawings.

Figure 7:
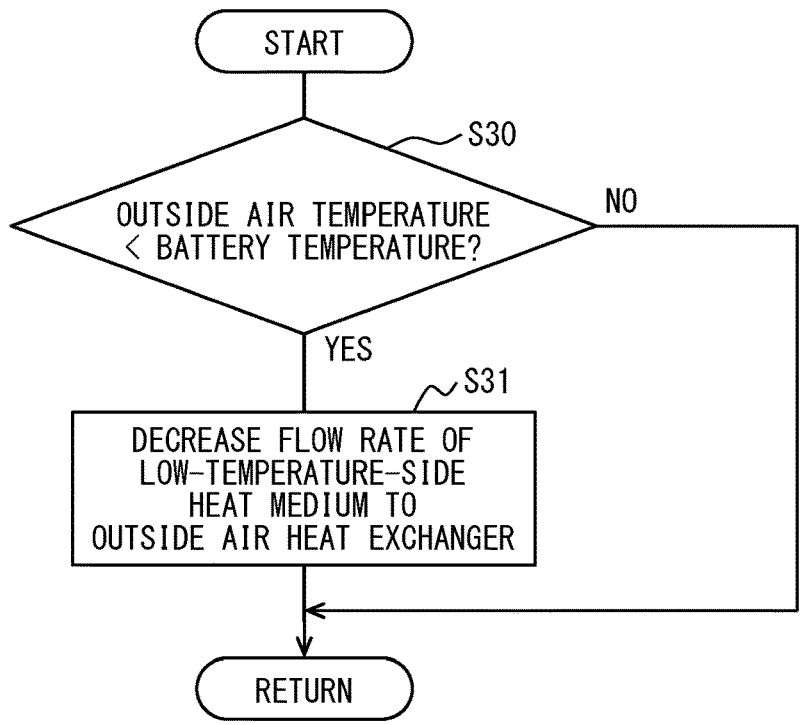
FIG. 7 is a flowchart of control processing related to adjustment of a heat dissipation amount in a low-temperature side heat medium circuit in an air conditioner 1 of a second embodiment.

A control program illustrated in FIG. 7 is executed by the control device 50 at a time point when having switched to either the cooling and heating mode or the cooling, dehumidifying, and heating mode. The control program is repeatedly executed until it is switched from the cooling and heating mode and the cooling, dehumidifying, and heating mode to another operation mode.

In step S30, it is determined whether or not the outside air temperature detected by the outside air temperature sensor 52b is lower than the battery temperature detected by the battery temperature sensor 52g. When it is determined that the outside air temperature is lower than the battery temperature, the processing proceeds to step S31. When it is determined that the outside air temperature is not lower than the battery temperature, the control program illustrated in FIG. 7 is terminated.

In step S31, the operation of the low-temperature side flow rate control valve 33 is controlled to decrease the flow rate of the low-temperature side heat medium with respect to the outside air heat exchanger 32. After the flow rate of the low-temperature side heat medium with respect to the outside air heat exchanger 32 is reduced, the control program illustrated in FIG. 7 is terminated.

As described above, in the cooling and heating mode and the cooling, dehumidifying, and heating mode, the low-temperature side heat medium absorbs the waste heat of the battery 31 while cooling the battery 31. Therefore, when the outside air temperature is lower than the battery temperature, the heat of the low-temperature side heat medium that has absorbed the waste heat of the battery 31 is dissipated to the outside air OA at the outside air heat exchanger 32.

Accordingly, the amount of heat absorbed from the low-temperature side heat medium by the chiller 16 is reduced by the amount of heat dissipated to the outside air OA at the outside air heat exchanger 32, and finally, the amount of heat that can be dissipated from the high-temperature side heat medium to the blown air W is reduced in the heater core 23.

In order to suppress wasteful heat dissipation at the outside air heat exchanger 32 of the low-temperature side heat medium circuit 30, when the outside air temperature is lower than the battery temperature, the flow rate of the low-temperature side heat medium is adjusted to lower the heat exchange capacity in the outside air heat exchanger 32.

Thus, in the air conditioner 1, even when the outside air temperature is lower than the battery temperature, wasteful heat dissipation to the outside air OA by the outside air heat exchanger 32 can be suppressed, and the waste heat absorbed from the battery 31 can be efficiently used for heating the blown air W.

Next, heat absorption amount control in the low-temperature side heat medium circuit 30 when the outside air temperature is lower than the battery temperature will be described with reference to the drawings. A control program illustrated in FIG. 8 is executed by the control device 50 at a time point when having switched to either the cooling and heating mode or the cooling, dehumidifying, and heating mode. The control program is repeatedly executed until it is switched from the cooling and heating mode and the cooling, dehumidifying, and heating mode to another operation mode.

Here, when the outside air temperature is lower than the battery temperature, in the low-temperature side heat medium circuit 30, heat can be efficiently absorbed by absorbing heat from the battery 31 rather than by absorbing heat from the outside air OA as a heat absorption source for the low-temperature side heat medium to absorb heat. That is, in the low-temperature side heat medium circuit 30 under this condition, the battery 31 is a more efficient heat absorption source than the outside air heat exchanger 32.

Figure 8:
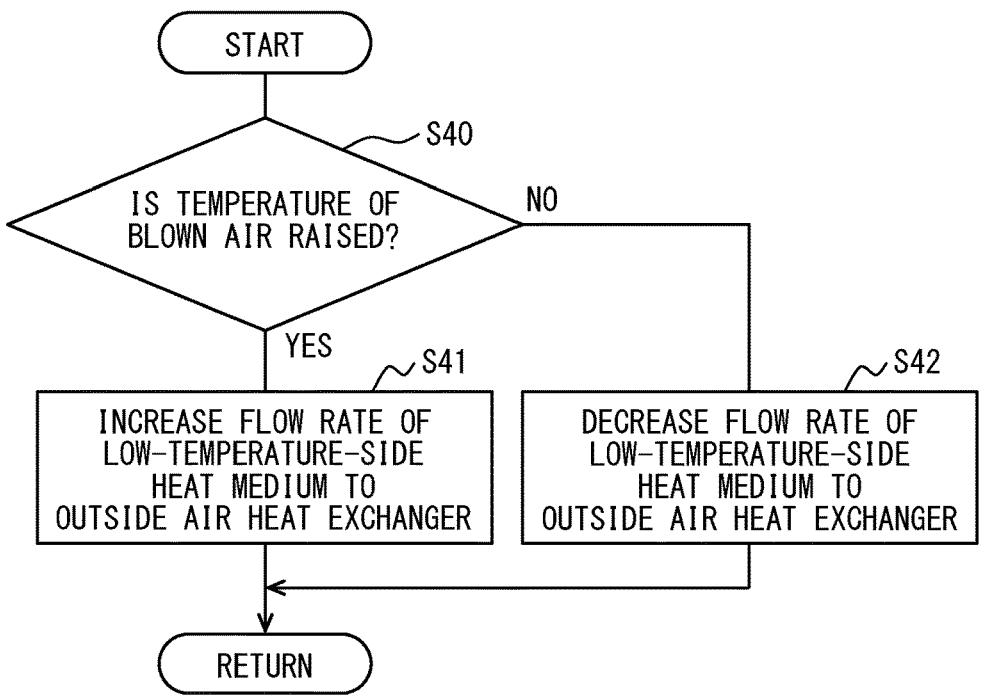
FIG. 8 is a flowchart of control processing related to adjustment of a heat exchange amount when an outside air temperature is lower than a battery temperature in the second embodiment.

As illustrated in FIG. 8, first, in step S40, it is determined whether or not the blown air temperature detected by the blown air temperature sensor 52f has increased. When it is determined that the blown air temperature has increased, the processing proceeds to step S41. On the other hand, when it is determined that the blown air temperature has not increased, the processing proceeds to step S42.

When the processing proceeds to step S41, it is a state where the heat dissipation amount in the heat medium refrigerant heat exchanger 12 is larger than the heat dissipation amount of the heater core 23. When the radiator 22 also dissipates heat, it is a state where the heat dissipation amount in the heat medium refrigerant heat exchanger 12 is larger than the sum of the heat dissipation amounts of the radiator 22 and the heater core 23. Therefore, it is a state where the temperature of the high-temperature side heat medium in the high-temperature side heat medium circuit 21 has increased, and it is determined that the blown air temperature has increased.

Therefore, the low-temperature side flow rate control valve 33 is controlled such that the flow rate of the low-temperature side heat medium with respect to the outside air heat exchanger 32 increases. Thus, in the low-temperature side heat medium circuit 30, the flow rate of the low-temperature side heat medium passing through the outside air heat exchanger 32 increases, and the flow rate of the low-temperature side heat medium passing through the heat medium passage of the battery 31 decreases.

That is, by increasing a heat absorption amount in the outside air heat exchanger 32 in a situation where the outside air temperature is lower than the battery temperature, it is possible to suppress the amount of heat of the low-temperature side heat medium to be low while maintaining the cooling performance of the battery 31.

In step S41, the heat dissipation amount in the heat medium refrigerant heat exchanger 12 is reduced by suppressing the amount of heat of the low-temperature side heat medium to be low. Consequently, the temperature of the high-temperature side heat medium in the high-temperature side heat medium circuit 21 decreases, and the amount of heat used for heating the blown air W by the heater core 23 can be reduced. That is, the blown air temperature can be gradually lowered, and can be brought close to the target blown air temperature TAO. Thereafter, the control program illustrated in FIG. 8 is terminated.

On the other hand, when the processing proceeds to step S42, it is a state where the heat dissipation amount in the heat medium refrigerant heat exchanger 12 is smaller than the heat dissipation amount of the heater core 23. When the radiator 22 also dissipates heat, it is a state where the heat dissipation amount in the heat medium refrigerant heat exchanger 12 is smaller than the sum of the heat dissipation amounts of the radiator 22 and the heater core 23. Therefore, it is a state where the temperature of the heat medium in the high-temperature side heat medium circuit 21 has decreased, and consequently, it is determined that the blown air temperature has decreased.

Accordingly, the low-temperature side flow rate control valve 33 is controlled such that the flow rate of the low-temperature side heat medium with respect to the outside air heat exchanger 32 decreases. Thus, in the low-temperature side heat medium circuit 30, the flow rate of the low-temperature side heat medium passing through the outside air heat exchanger 32 decreases, and the flow rate of the low-temperature side heat medium passing through the heat medium passage of the battery 31 increases.

That is, in a situation where the outside air temperature is lower than the battery temperature, by decreasing the heat absorption amount in the outside air heat exchanger 32, the cooling performance of the battery 31 is maintained, and simultaneously, the battery is actively used as a heat absorption source. Thus, the amount of heat of the low-temperature side heat medium can be increased as much as possible.

In step S42, the heat dissipation amount in the heat medium refrigerant heat exchanger 12 is increased by increasing the amount of heat of the low-temperature side heat medium. Consequently, the temperature of the high-temperature side heat medium in the high-temperature side heat medium circuit 21 increases, and the amount of heat used for heating the blown air W by the heater core 23 can be increased. That is, the blown air temperature can be gradually increased, and can be brought close to the target blown air temperature TAO. Thereafter, the control program illustrated in FIG. 8 is terminated.

As described above, in the air conditioner 1 according to the second embodiment, the blown air temperature can be efficiently brought close to the target blown air temperature TAO by appropriately using the outside air OA and the battery 31 as the heat absorption sources of the low-temperature side heat medium circuit 30 in a situation where the outside air temperature is lower than the battery temperature.

Next, heat absorption amount control in the low-temperature side heat medium circuit 30 when the outside air temperature is higher than the battery temperature will be described with reference to the drawings. A control program illustrated in FIG. 9 is executed by the control device 50 at a time point when having switched to either the cooling and heating mode or the cooling, dehumidifying, and heating mode. The control program is repeatedly executed until it is switched from the cooling and heating mode and the cooling, dehumidifying, and heating mode to another operation mode.

Here, when the outside air temperature is higher than the battery temperature, in the low-temperature side heat medium circuit 30, heat can be efficiently absorbed by absorbing heat from the outside air OA rather than absorbing heat from the battery 31 as a heat absorption source for the low-temperature side heat medium to absorb heat. That is, in the low-temperature side heat medium circuit 30 under this condition, the outside air heat exchanger 32 is a more efficient heat absorption source than the battery 31.

Figure 9:
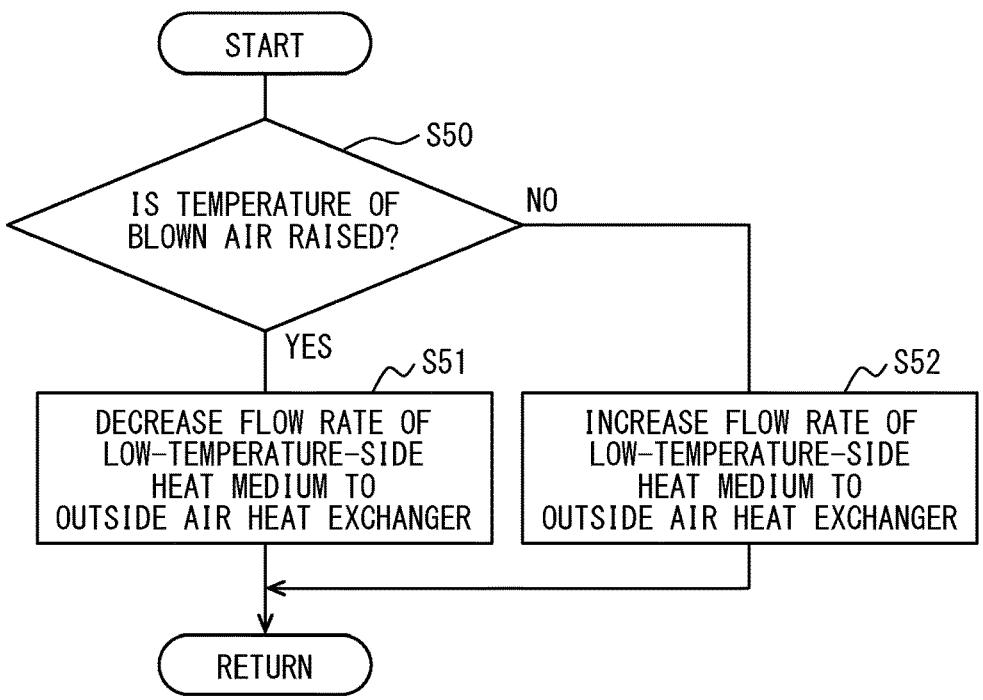
FIG. 9 is a flowchart of the control processing related to adjustment of the heat exchange amount when the outside air temperature is higher than a battery temperature in the second embodiment.

As illustrated in FIG. 9, first, in step S50, it is determined whether or not the blown air temperature detected by the blown air temperature sensor 52*f* has increased. When it is determined that the blown air temperature has increased, the processing proceeds to step S51. On the other hand, when it is determined that the blown air temperature has not increased, the processing proceeds to step S52.

When the processing proceeds to step S51, it is a state where the heat dissipation amount in the heat medium refrigerant heat exchanger 12 is larger than the heat dissipation amount of the heater core 23. When the radiator 22 also dissipates heat, it is a state where the heat dissipation amount in the heat medium refrigerant heat exchanger 12 is larger than the sum of the heat dissipation amounts of the radiator 22 and the heater core 23. Therefore, it is a state where the temperature of the high-temperature side heat medium in the high-temperature side heat medium circuit 21 has increased, and consequently, it is determined that the blown air temperature has increased.

Accordingly, the low-temperature side flow rate control valve 33 is controlled such that the flow rate of the low-temperature side heat medium with respect to the outside air heat exchanger 32 decreases. Thus, in the low-temperature side heat medium circuit 30, the flow rate of the low-temperature side heat medium passing through the outside air heat exchanger 32 decreases, and the flow rate of the low-temperature side heat medium passing through the heat medium passage of the battery 31 increases.

That is, by increasing a heat absorption amount in the battery 31 in a situation where the outside air temperature is higher than the battery temperature, it is possible to suppress the amount of heat of the low-temperature side heat medium to be low while maintaining the cooling performance of the battery 31.

In step S51, the heat dissipation amount in the heat medium refrigerant heat exchanger 12 is reduced by suppressing the amount of heat of the low-temperature side heat medium to be low. Consequently, the temperature of the high-temperature side heat medium in the high-temperature side heat medium circuit 21 decreases, and the amount of heat used for heating the blown air W by the heater core 23 can be reduced. That is, the blown air temperature can be gradually lowered, and can be brought close to the target blown air temperature TAO. Thereafter, the control program illustrated in FIG. 9 is terminated.

On the other hand, when the processing proceeds to step S52, it is a state where the heat dissipation amount in the heat medium refrigerant heat exchanger 12 is smaller than the heat dissipation amount of the heater core 23. When the radiator 22 also dissipates heat, it is a state where the heat dissipation amount in the heat medium refrigerant heat exchanger 12 is smaller than the sum of the heat dissipation amounts of the radiator 22 and the heater core 23. Therefore, it is a state where the temperature of the high-temperature side heat medium in the high-temperature side heat medium circuit 21 has decreased, and consequently, it is determined that the blown air temperature has decreased.

Accordingly, the low-temperature side flow rate control valve 33 is controlled so as to increase the flow rate of the low-temperature side heat medium with respect to the outside air heat exchanger 32. Thus, in the low-temperature side heat medium circuit 30, the flow rate of the low-temperature side heat medium passing through the outside air heat exchanger 32 increases, and the flow rate of the low-temperature side heat medium passing through the heat medium passage of the battery 31 decreases.

That is, by increasing the heat absorption amount in the outside air heat exchanger 32 in a situation where the outside air temperature is higher than the battery temperature, it is possible to increase the amount of heat of the low-temperature side heat medium as much as possible while maintaining the cooling performance of the battery 31.

In step S52, the heat dissipation amount in the heat medium refrigerant heat exchanger 12 is increased by increasing the amount of heat of the low-temperature side heat medium. Consequently, the temperature of the high-temperature side heat medium in the high-temperature side heat medium circuit 21 increases, and consequently, the amount of heat used for heating the blown air W by the heater core 23 can be increased. That is, the blown air temperature can be gradually increased, and can be brought close to the target blown air temperature TAO. Thereafter, the control program illustrated in FIG. 9 is terminated.

As described above, in the air conditioner 1 according to the second embodiment, the blown air temperature can be efficiently brought close to the target blown air temperature TAO by appropriately using the outside air OA and the battery 31 as the heat absorption sources of the low-temperature side heat medium circuit 30 in a situation where the outside air temperature is higher than the battery temperature.

As described above, the air conditioner 1 according to the second embodiment includes the outside air heat exchanger 32 and the low-temperature side flow rate control valve 33 in addition to the battery 31 in the low-temperature side heat medium circuit 30. As illustrated in FIGS. 7 to 9, the air conditioner 1 adjusts the heat exchange amount in the outside air heat exchanger 32 by the low-temperature side flow rate control valve 33 such that the blown air temperature approaches the target blown air temperature TAO in a state where the cooling capacity by heat exchange between the battery 31 and the low-temperature side heat medium is maintained.

Thus, the air conditioner 1 can adjust the amount of heat of the low-temperature side heat medium including the waste heat of the battery 31 in the low-temperature side heat medium circuit 30 while maintaining the cooling capacity for the battery 31, and consequently can adjust the amount of heat used for heating the blown air W in the heater core 23.

That is, the air conditioner 1 adjusts the amount of heat of the low-temperature side heat medium to improve the comfort of the air conditioning target space regardless of the heat generation amount of the battery 31 upon air-conditioning the air conditioning target space using the waste heat of the battery 31 in the cooling and heating mode and the cooling, dehumidifying, and heating mode.

Third Embodiment

Next, a third embodiment different from the above-described first embodiment will be described with reference to FIGS. 10 and 11. The third embodiment is different from the first embodiment in control content related to start of adjustment operation of the high-temperature side flow rate control valve 25 and control content related to start of heat generation of the electric heater 24. The basic configuration and the like of the air conditioner 1 are similar to those of the first embodiment, and thus the description thereof will be omitted again.

First, control content related to start of heat generation by the electric heater 24 according to the third embodiment will be described with reference to FIG. 10. A control program according to FIG. 10 is executed by the control device 50 at a time point when the operation mode has switched to the cooling and heating mode or the cooling, dehumidifying, and heating mode.

Figure 10:
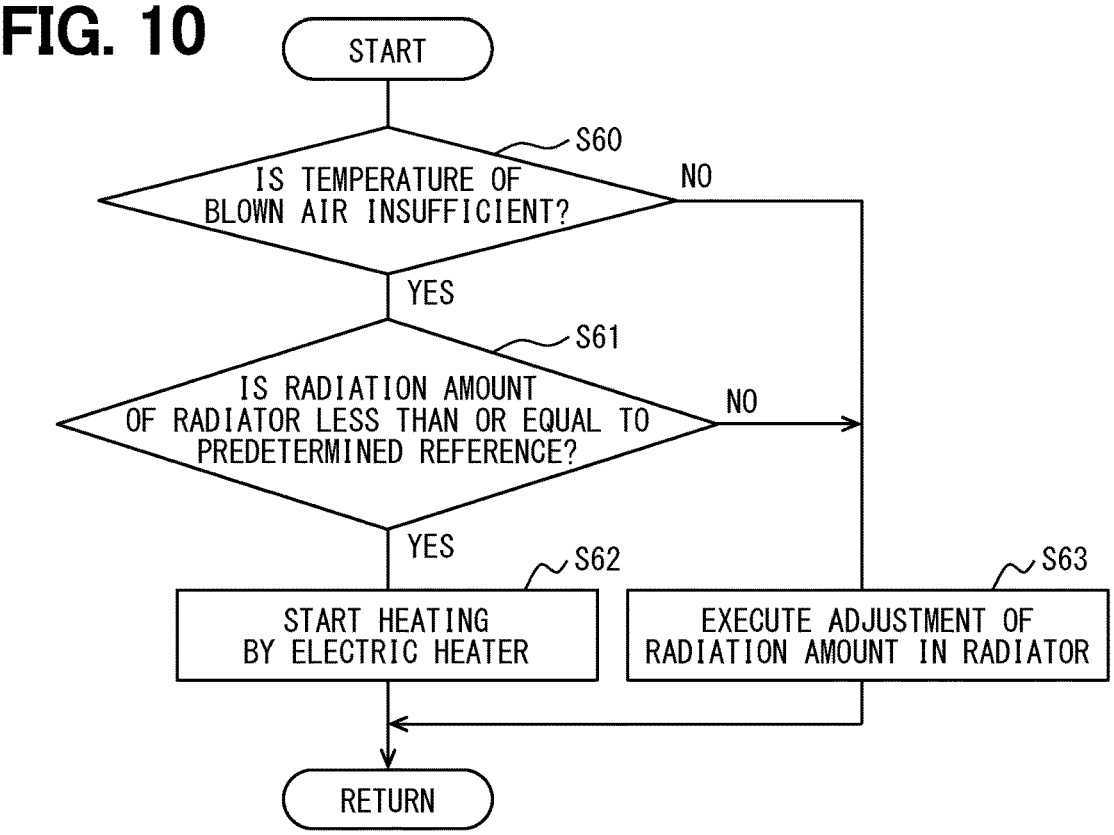
FIG. 10 is a flowchart of control processing related to start of adjustment of a heat dissipation amount in an air conditioner according to a third embodiment.

As illustrated in FIG. 10, in step S60, it is determined whether or not the blown air temperature is insufficient. Determination processing in step S60 has control content similar to that in step S3 in the first embodiment. When the blown air temperature is insufficient, the processing proceeds to step S61. On the other hand, when the blown air temperature is not insufficient, the processing proceeds to step S63.

In step S61, it is determined whether or not the heat dissipation amount to the outside air OA in the radiator 22 is equal to or less than a predetermined reference. This reference is determined to indicate, for example, a state where the heat dissipation amount of the radiator 22 is lowest in a state where controllability of flow rate control of the high-temperature side heat medium by the high-temperature side flow rate control valve 25 is secured.

Specifically, the determination can be made by whether or not the high-temperature side flow rate control valve 25 is in a state where the flow rate of the high-temperature side heat medium with respect to the radiator 22 is equal to or less than the reference. When the heat dissipation amount in the radiator 22 is equal to or less than the reference, the processing proceeds to step S62. On the other hand, when the heat dissipation amount in the radiator 22 is not equal to or less than the reference, the processing proceeds to step S63.

The state where the heat dissipation amount in the outside air radiator is equal to or less than the predetermined reference may be a state where the flow rate of the high-temperature side heat medium in the radiator 22 is zero. Alternatively, it may be a state where the flow rate is equal to a minimum flow rate in a flow rate distribution that can be achieved by the high-temperature side flow rate control valve 25.

In step S62, similarly to step S4 of the first embodiment, heating by the electric heater 24 of the high-temperature side heat medium circuit 21 is started. Here, a state of proceeding to step S62 is a state in which the blown air temperature is insufficient in a state where heat pumped from the low-temperature side heat medium circuit 30 is used for heating the blown air W as much as possible.

That is, the heating by the electric heater 24 is started when the blown air temperature is insufficient even if the waste heat absorbed along with cooling of the battery 31 is used up. At this time, the amount of heat generated by the electric heater 24 is determined so as to compensate for the insufficiency, and thus is a minimum necessary amount of heat.

That is, in the air conditioner 1, when the blown air W is heated, the waste heat of the battery 31 can be preferentially used, and the use of the electric heater 24 can be minimized, which contributes to energy saving. After the heating by the electric heater 24 is started, the control program is terminated.

On the other hand, when the processing proceeds to step S63, it is a state where since the heat dissipation amount of the radiator 22 is not equal to or less than the reference, the amount of heat dissipated to the outside air OA at the radiator 22 can be used for heating the blown air W in the heater core 23. Therefore, in step S63, adjustment of the heat dissipation amount by the radiator 22 is executed. Thereafter, the control program is terminated.

As described above, the adjustment of the heat dissipation amount in the radiator 22 is executed according to the control program illustrated in FIG. 5. Therefore, the amount of heat dissipated to the outside air OA at the radiator 22 is used for heating the blown air W, and the waste heat of the battery 31 pumped up from the low-temperature side heat medium circuit 30 is maximally used for heating the blown air W.

Next, control content related to start of adjustment operation of the high-temperature side flow rate control valve 25 according to the third embodiment will be described with reference to FIG. 11. A control program according to FIG. 11 is executed by the control device 50 at a time point when the operation mode has switched to the cooling and heating mode or the cooling, dehumidifying, and heating mode.

Figure 11:
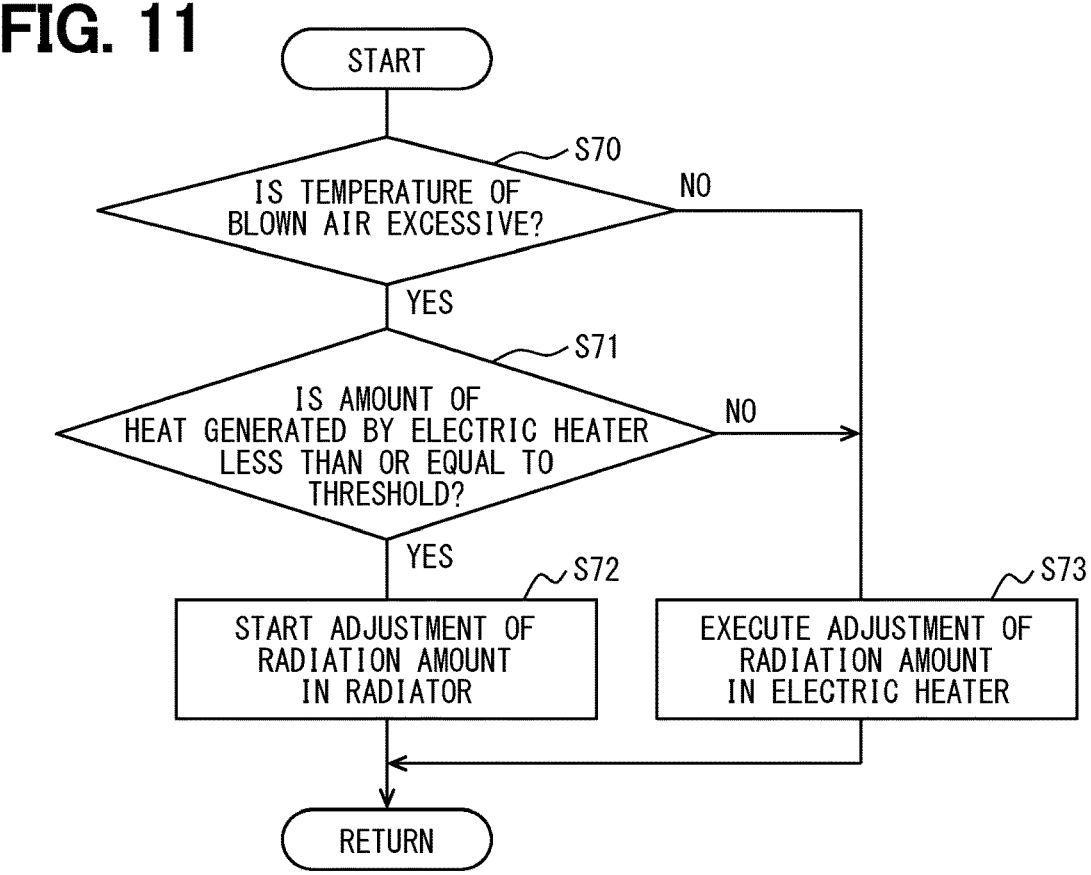
FIG. 11 is a flowchart of control processing related to start of heating by an electric heater in the air conditioner according to the third embodiment.

As illustrated in FIG. 11, in step S70, it is determined whether or not the blown air temperature is excessive. The determination processing in step S70 has control content similar to that in step S1 in the first embodiment. When the blown air temperature is excessive, the processing proceeds to step S71. On the other hand, when the blown air temperature is not excessive, the processing proceeds to step S73.

In step S71, it is determined whether or not the amount of heat generated by the electric heater 24 is equal to or less than a predetermined threshold. This threshold is determined to indicate, for example, a state where the heat generation amount of the heater core 23 is lowest in a state where controllability of the heat generation amount control in the heater core 23 is secured.

Specifically, the determination can be made by whether or not a control current for the electric heater 24 is zero or whether or not the control current for the electric heater 24 is equal to or less than a predetermined current value. When the amount of heat generated by the electric heater 24 is equal to or less than the threshold, the processing proceeds to step S72. On the other hand, when the amount of heat generated by the electric heater 24 is not equal to or less than the threshold, the processing proceeds to step S73.

In step S72, as in step S2 of the first embodiment, the adjustment of the heat dissipation amount in the radiator 22 by the high-temperature side flow rate control valve 25 is started. Here, a state of proceeding to step S72 is a state where the blown air temperature is excessive in a state where the heat pumped up from the low-temperature side heat medium circuit 30 is used for heating the blown air W without heating by the electric heater 24.

That is, it is a state where, when the blown air W is heated, the blown air temperature can be sufficiently adjusted to the target blown air temperature TAO by the waste heat of the battery 31 or the like without using the amount of heat generated by the electric heater 24. Therefore, in the air conditioner 1, since the use of the electric heater 24 is preferentially and minimally adjusted, it is possible to contribute to energy saving regarding the heating of the blown air W. Thereafter, the control program is terminated.

On the other hand, when the processing proceeds to step S73, since the amount of heat generated by the electric heater 24 is not equal to or less than the threshold, the adjustment of the amount of heat generated by the electric heater 24 is executed. Thereafter, the control program is terminated. As described above, the adjustment of the heat generation amount in the electric heater 24 is executed according to the control program illustrated in FIG. 6. Therefore, when the blown air temperature is excessive, the amount of heat generated by the electric heater 24 gradually decreases and becomes close to the threshold.

As described above, in the air conditioner 1 of the third embodiment, even when the conditions of start of the adjustment of the heat dissipation amount in the heating unit 20 and start of the heating of the electric heater 24 are changed, it is possible to obtain the operation and effect exhibited from the configuration and operation common to the first embodiment as in the first embodiment.

As illustrated in FIG. 10, the air conditioner 1 according to the third embodiment starts heating the high-temperature side heat medium by the electric heater 24 in a state where the heat dissipation amount in the radiator 22 is reduced to be equal to or less than the reference value and in a case where the blown air temperature is insufficient.

Thus, upon heating the blown air W, the air conditioner 1 performs heating by the electric heater 24 in a state where the waste heat of the battery 31 is used up, so that the energy consumption accompanying the heating of the electric heater 24 can be minimized while preferentially using the waste heat of the battery 31.

As illustrated in FIG. 11, the air conditioner 1 according to the third embodiment starts the adjustment of the heat dissipation amount in the radiator 22 by the high-temperature side flow rate control valve 25 in a state where the amount of heat generated by the electric heater 24 is equal to or less than the threshold and in a case where the blown air temperature is excessive.

In this case, in the air conditioner 1, since the use of the electric heater 24 is preferentially adjusted to be as small as possible, it is possible to improve the comfort of the air conditioning target space while contributing to energy saving regarding heating of the blown air.

Fourth Embodiment

Figure 12:
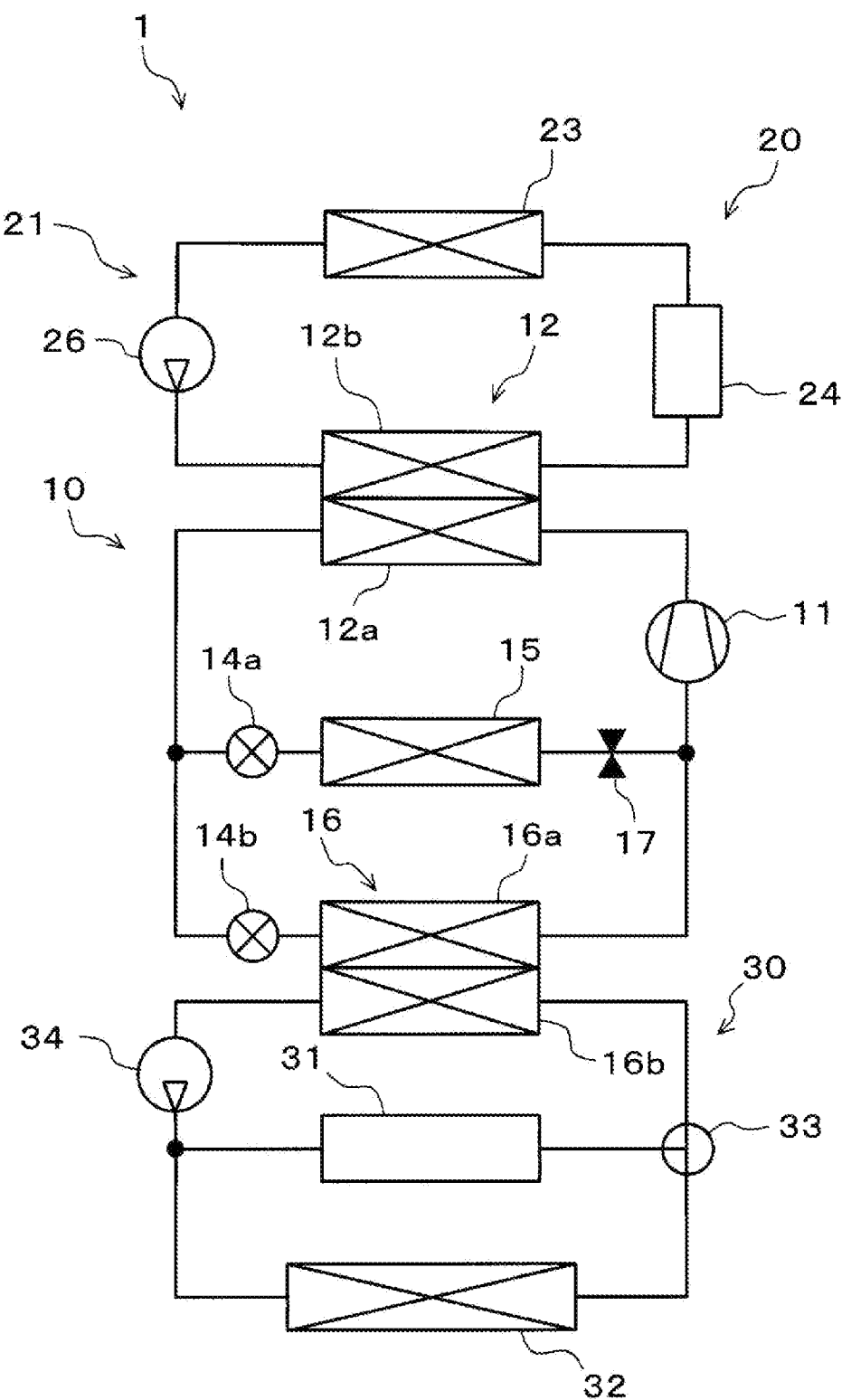
FIG. 12 is an overall configuration diagram of an air conditioner according to a fourth embodiment.

Next, a fourth embodiment different from each of the above-described embodiments will be described with reference to FIG. 12. The fourth embodiment is different from the first embodiment in configuration of the heating unit 20.

A configuration of an air conditioner 1 according to the fourth embodiment will be described with reference to FIG. 12. The air conditioner 1 according to the fourth embodiment includes a heat pump cycle 10, a heating unit 20, a low-temperature side heat medium circuit 30, an interior air conditioning unit 40, and a control device 50 as in the above-described embodiment.

The heat pump cycle 10 according to the fourth embodiment includes a compressor 11, a heat medium refrigerant heat exchanger 12, a first expansion valve 14a, a second expansion valve 14b, an interior evaporator 15, a chiller 16, and an evaporating pressure adjusting valve 17 as in the first embodiment.

The heating unit 20 according to the fourth embodiment is formed by a high-temperature side heat medium circuit 21 through which the high-temperature side heat medium circulates as in the first embodiment. As illustrated in FIG. 12, the high-temperature side heat medium circuit 21 includes a heat medium passage 12b of the heat medium refrigerant heat exchanger 12, a heater core 23, an electric heater 24, and a high-temperature side pump 26. That is, the heating unit 20 according to the fourth embodiment is different from the heating unit 20 in the above-described embodiment in not including the radiator 22 and the high-temperature side flow rate control valve 25.

The low-temperature side heat medium circuit 30 according to the fourth embodiment includes a battery 31, an outside air heat exchanger 32, a low-temperature side flow rate control valve 33, and a low-temperature side pump 34 as in the first embodiment.

Therefore, in the air conditioner 1 according to the fourth embodiment, it is possible to achieve adjustment control of the amount of heat generated by the electric heater 24 in the high-temperature side heat medium circuit 21 illustrated in FIG. 6 and the like and adjustment control of the heat exchange amount in the outside air heat exchanger 32 of the low-temperature side heat medium circuit 30 illustrated in FIGS. 7 to 9.

As described above, in the air conditioner 1 according to the fourth embodiment, the cooling and heating mode and the cooling, dehumidifying, and heating mode can be achieved by causing the heat pump cycle 10, the heating unit 20, and the low-temperature side heat medium circuit 30 to cooperate with each other. That is, the air conditioner 1 can cool the battery 31 via the low-temperature side heat medium and pump up waste heat of the battery 31 by the heat pump cycle 10 to use the waste heat for heating the blown air W.

The air conditioner 1 according to the fourth embodiment adjusts the heat exchange amount in the outside air heat exchanger 32 by the low-temperature side flow rate control valve 33 such that the blown air temperature approaches the target blown air temperature TAO in a state where the cooling capacity by heat exchange between the battery 31 and the low-temperature side heat medium is maintained.

Thus, the air conditioner 1 can adjust the amount of heat of the low-temperature side heat medium including the waste heat of the battery 31 in the low-temperature side heat medium circuit 30 while maintaining the cooling capacity for the battery 31, and consequently can adjust the amount of heat used for heating the blown air W in the heater core 23.

That is, the air conditioner 1 adjusts the amount of heat of the low-temperature side heat medium to improve the comfort of the air conditioning target space regardless of the heat generation amount of the battery 31 upon air-conditioning the air conditioning target space using the waste heat of the battery 31 in the cooling and heating mode and the cooling, dehumidifying, and heating mode.

Fifth Embodiment

Next, a fifth embodiment different from the above-described embodiments will be described with reference to FIG. 13. In the fifth embodiment, specific configurations of the heat pump cycle 10 and the heating unit 20 are different from those in the above-described embodiment. Other configurations are similar to those of the first embodiment, and thus the description thereof will be omitted again.

Configurations of a heat pump cycle 10 and a heating unit 20 according to the fifth embodiment will be described with reference to FIG. 13. The heat pump cycle 10 according to the fifth embodiment includes a compressor 11, a heat medium refrigerant heat exchanger 12, a first expansion valve 14a, a second expansion valve 14b, an interior evaporator 15, a chiller 16, and an evaporating pressure adjusting valve 17 as in the above-described embodiments. The heat pump cycle 10 of the fifth embodiment further includes an interior condenser 13 in addition to similar configurations to those of the first embodiment.

Figure 13:
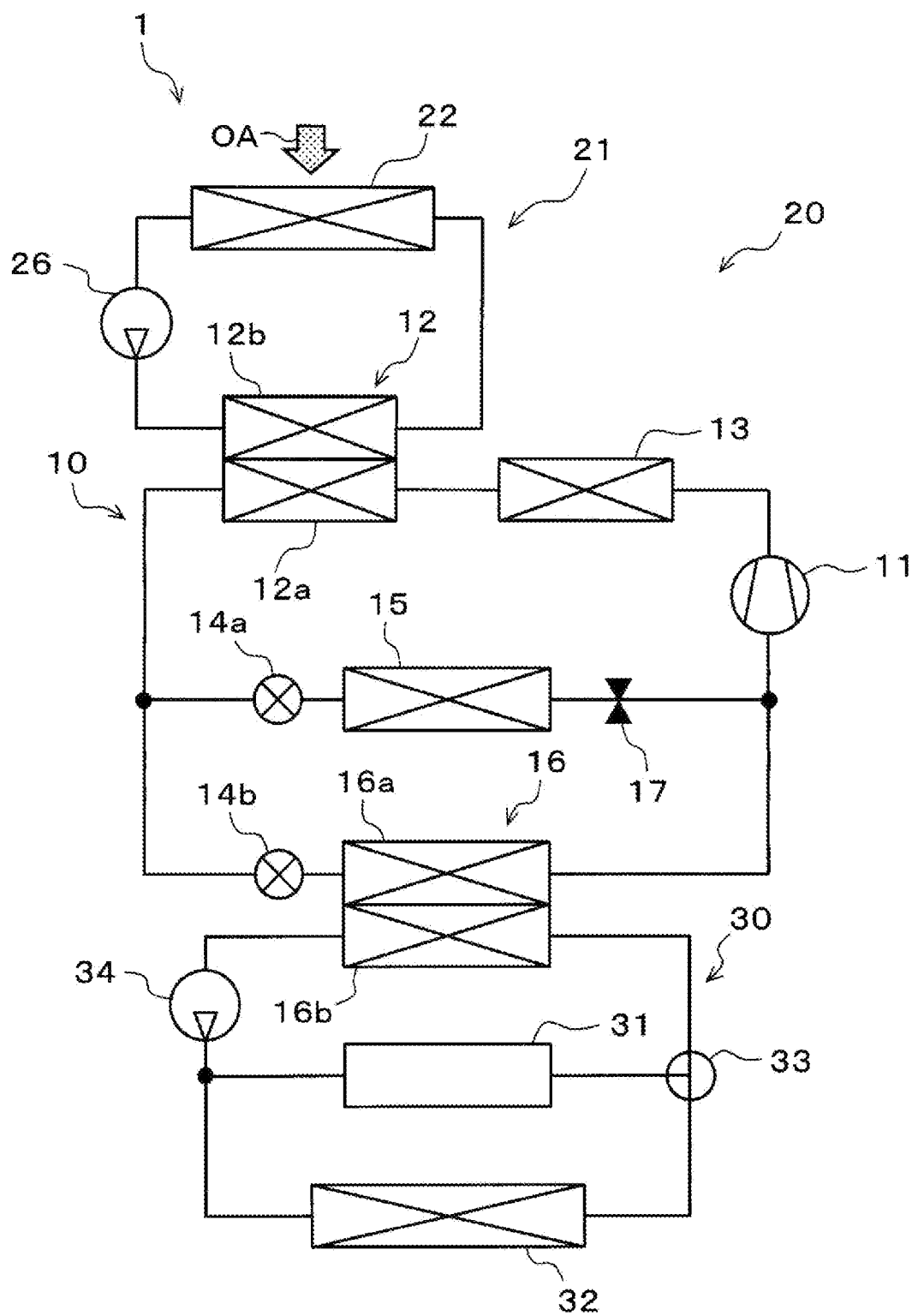
FIG. 13 is an overall configuration diagram of an air conditioner according to a fifth embodiment.

As illustrated in FIG. 13, the interior condenser 13 is disposed between a discharge port side of the compressor 11 and an inlet side of the refrigerant passage 12a in the heat medium refrigerant heat exchanger 12. The interior condenser 13 is accommodated in a casing 41 of an interior air conditioning unit 40, and is disposed at a position of a heater core 23 in the above-described embodiment.

That is, the interior condenser 13 is a heat exchanger for heating that exchanges heat between a high-pressure refrigerant discharged from the compressor 11 and blown air W having passed through the interior evaporator 15 to heat the blown air W. Accordingly, the interior condenser 13 corresponds to an example of a heating heat exchanger.

A high-temperature side heat medium circuit 21 according to the fifth embodiment includes a heat medium passage 12b of the heat medium refrigerant heat exchanger 12, a radiator 22, and a high-temperature side pump 26. That is, the heating unit 20 according to the fifth embodiment is different from the high-temperature side heat medium circuit 21 in the first embodiment in not including the heater core 23, the electric heater 24, and the high-temperature side flow rate control valve 25.

Therefore, in the fifth embodiment, a heat dissipation amount to outside air OA in the radiator 22 can be adjusted by adjusting the pressure feeding capability of the high-temperature side heat medium in the high-temperature side pump 26.

Here, in the fifth embodiment, the radiator has a larger heat exchange capacity between the radiator 22 and the interior condenser 13. Specifically, regarding the air-side heat transfer area, the radiator 22 is configured to be larger than the interior condenser 13. Thus, the amount of heat dissipation performance adjustment of the radiator 22 in the fifth embodiment becomes relatively larger than the amount of heat dissipation performance adjustment of the interior condenser 13. Therefore, the blown air temperature can be brought close to the target blown air temperature TAO while suppressing the influence of the waste heat of the larger battery 31.

Therefore, in the air conditioner 1 according to the fifth embodiment, it is possible to achieve adjustment control of the heat dissipation amount in the radiator 22 illustrated in FIG. 5 and the like and adjustment control of the heat exchange amount in the outside air heat exchanger 32 of the low-temperature side heat medium circuit 30 illustrated in FIGS. 7 to 9.

As described above, in the air conditioner 1 according to the fifth embodiment, even in a case where the configuration of the heating unit 20 is changed, it is possible to obtain the operation and effect exhibited from the configuration and operation common to the above-described embodiment as in the above-described embodiments.

Sixth Embodiment

Next, a sixth embodiment different from the above-described embodiments will be described with reference to FIG. 14. In the sixth embodiment, a first high-temperature side pump 27a and a second high-temperature side pump 27b are employed as the heat dissipation amount adjustment unit of the heating unit 20 instead of the high-temperature side flow rate control valve 25.

In the sixth embodiment, the high-temperature side pump 26 in the above-described embodiment is eliminated along with the employment of the first high-temperature side pump 27a and the second high-temperature side pump 27b.

Figure 14:
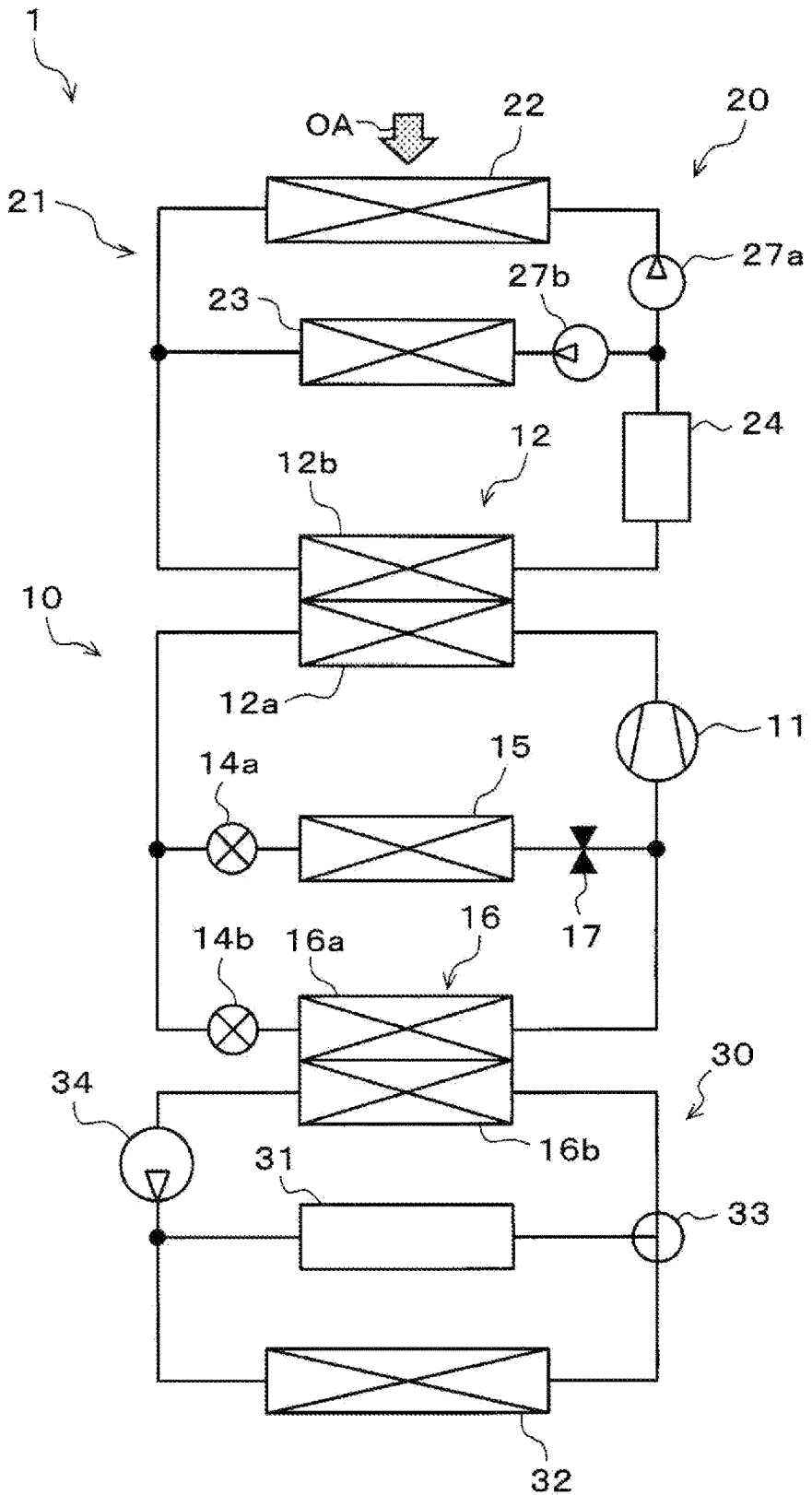
FIG. 14 is an overall configuration diagram of an air conditioner according to a sixth embodiment.

As illustrated in FIG. 14, in the high-temperature side heat medium circuit 21 according to the sixth embodiment, a heat medium branching part having a three-way joint structure is disposed at the position of the high-temperature side flow rate control valve 25 according to the first embodiment. An inflow port side of the heat medium branching part is connected to the outlet of the heat medium passage in the electric heater 24.

The first high-temperature side pump 27a is disposed between one of outflow ports in the heat medium branching part and an inflow port in the radiator 22. The first high-temperature side pump 27a is a heat medium pump that pressure-feeds the high-temperature side heat medium to the radiator 22. The first high-temperature side pump 27a has a basic configuration similar to that of the above-described high-temperature side pump 26.

Further, the second high-temperature side pump 27b is disposed between another one of the outflow ports in the heat medium branching part and an inflow port in the heater core 23. The second high-temperature side pump 27b is a heat medium pump that pressure-feeds the high-temperature side heat medium to the heater core 23. The second high-temperature side pump 27b has a basic configuration similar to that of the above-described high-temperature side pump 26.

Therefore, the air conditioner 1 according to the sixth embodiment can adjust the pressure feeding capability of the high-temperature side heat medium in each of the first high-temperature side pump 27a and the second high-temperature side pump 27b. Accordingly, in the sixth embodiment, by controlling the operations of the first high-temperature side pump 27a and the second high-temperature side pump 27b, the flow rate ratio between the flow rate of the high-temperature side heat medium on the radiator 22 side and the flow rate of the high-temperature side heat medium on the heater core 23 side can be adjusted.

As described above, in the air conditioner 1 according to the sixth embodiment, even in a case where the heat dissipation amount adjustment unit is formed by the first high-temperature side pump 27a and the second high-temperature side pump 27b, it is possible to obtain the operation and effect exhibited from the configuration and operation common to the above-described embodiment as in the above-described embodiments.

Seventh Embodiment

Next, a seventh embodiment different from the above-described embodiments will be described with reference to FIG. 15. In the seventh embodiment, a radiator on-off valve 28 is employed as a heat dissipation amount adjustment unit of the heating unit 20 instead of the high-temperature side flow rate control valve 25.

Figure 15:
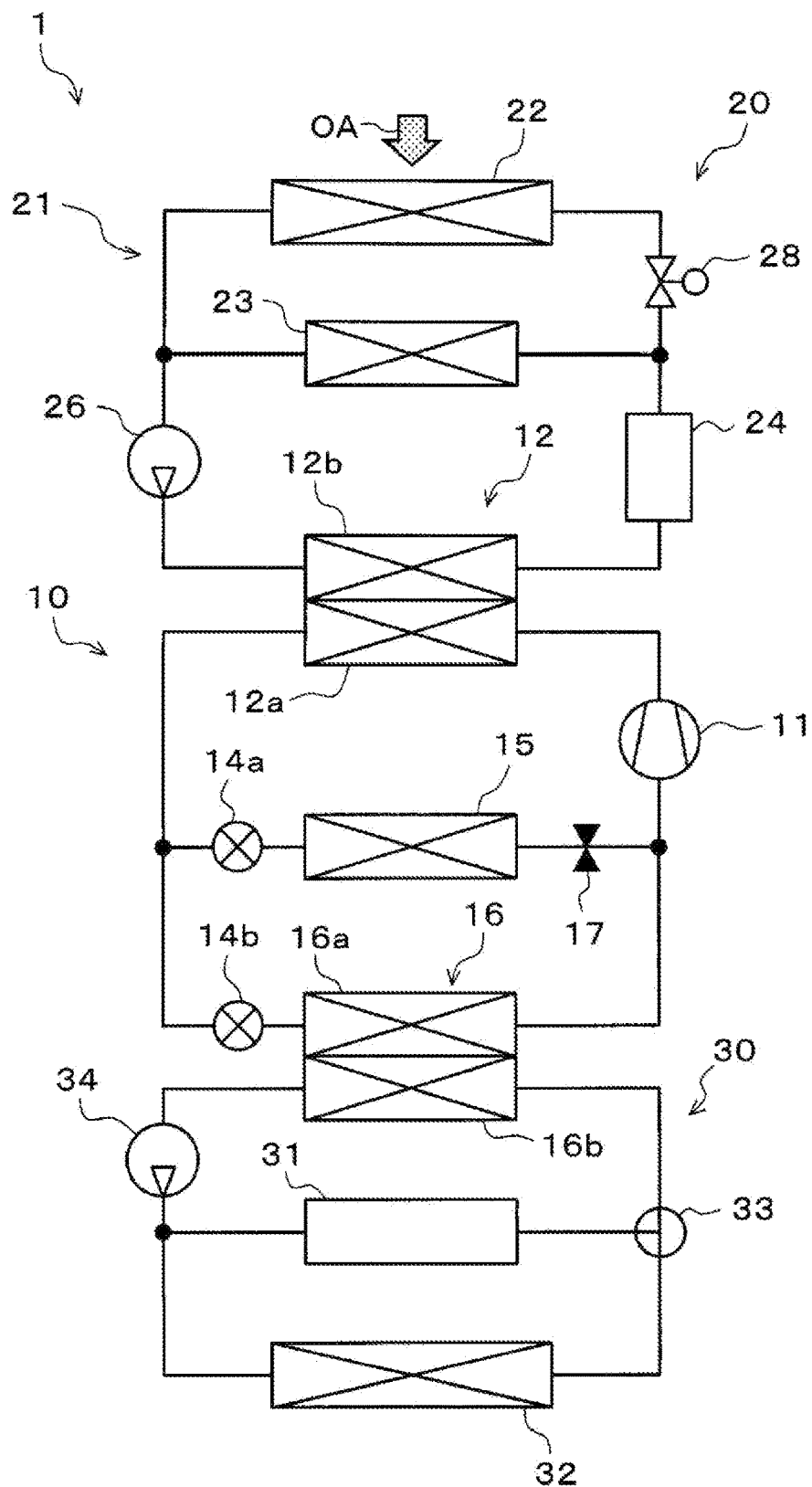
FIG. 15 is an overall configuration diagram of an air conditioner according to a seventh embodiment.

As illustrated in FIG. 15, in the high-temperature side heat medium circuit 21 according to the seventh embodiment, a heat medium branching part having a three-way joint structure is disposed at the position of the high-temperature side flow rate control valve 25 according to the first embodiment. An inflow port side of the heat medium branching part is connected to the outlet of the heat medium passage in the electric heater 24.

The radiator on-off valve 28 is disposed between one of outflow ports in the heat medium branching part and an inflow port in the radiator 22. The radiator on-off valve 28 is an electromagnetic valve that opens and closes a heat medium flow path connecting the heat medium branching part and the radiator 22. The radiator on-off valve 28 continuously changes the opening degree of the heat medium flow path in accordance with a control signal output from the control device 50.

Therefore, in the air conditioner 1 according to the seventh embodiment, the flow rate ratio between the flow rate of the high-temperature side heat medium on the radiator 22 side and the flow rate of the high-temperature side heat medium on the heater core 23 side can be adjusted by adjusting the opening degree of the radiator on-off valve 28.

As described above, in the air conditioner 1 according to the seventh embodiment, even when the radiator on-off valve 28 is employed instead of the high-temperature side flow rate control valve 25, it is possible to obtain the operation and effect exhibited from the configuration and operation common to the above-described embodiment as in the above-described embodiments.

Eighth Embodiment

Next, an eighth embodiment different from the above-described embodiments will be described with reference to FIG. 16. In the eighth embodiment, a shutter device 29 is employed instead of the high-temperature side flow rate control valve 25 as a heat dissipation amount adjustment unit in the heating unit 20.

Figure 16:
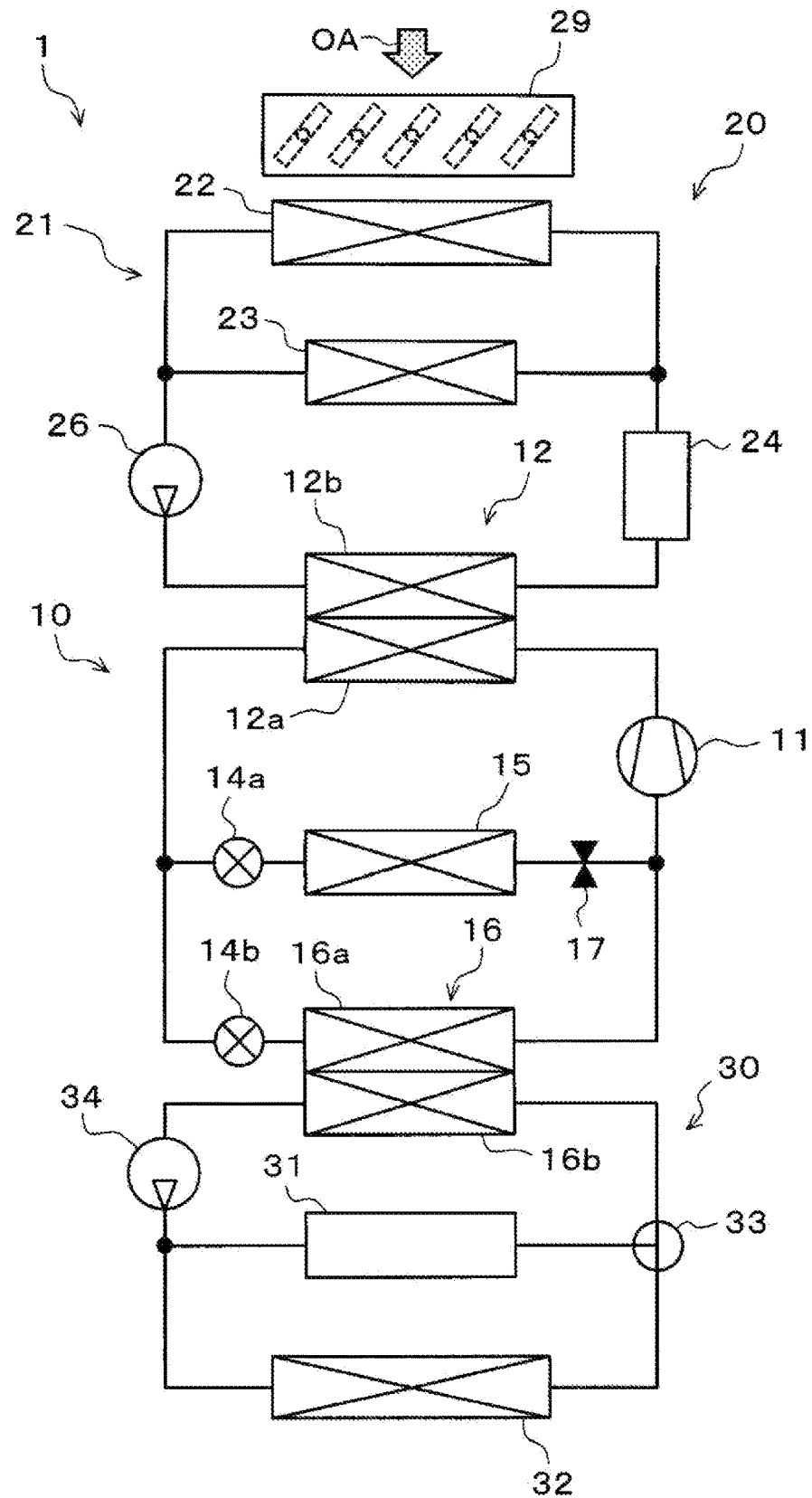
FIG. 16 is an overall configuration diagram of an air conditioner according to an eighth embodiment.

As illustrated in FIG. 16, in the air conditioner 1 according to the eighth embodiment, the shutter device 29 is disposed on the front side of the radiator 22. The shutter device 29 is configured by rotatably arranging a plurality of blades in an opening of a frame-shaped frame. The plurality of blades rotate in conjunction with actuation of an electric actuator (not illustrated) to adjust an opening area in the opening of the frame.

Thus, the shutter device 29 can adjust the flow rate of the outside air OA passing through the heat exchange unit of the radiator 22, so that the heat exchange capacity of the radiator 22 can be adjusted. In other words, the heat dissipation amount adjustment unit in the present disclosure is not limited to the case of adjusting the flow rate of the high-temperature side heat medium, and may be configured to adjust the flow rate of the medium on the side where heat is dissipated at the radiator 22.

As described above, in the air conditioner 1 according to the eighth embodiment, even when the shutter device 29 is employed instead of the high-temperature side flow rate control valve 25, it is possible to obtain the operation and effect exhibited from the configuration and operation common to the above-described embodiment as in the above-described embodiments.

Ninth Embodiment

Figure 17:
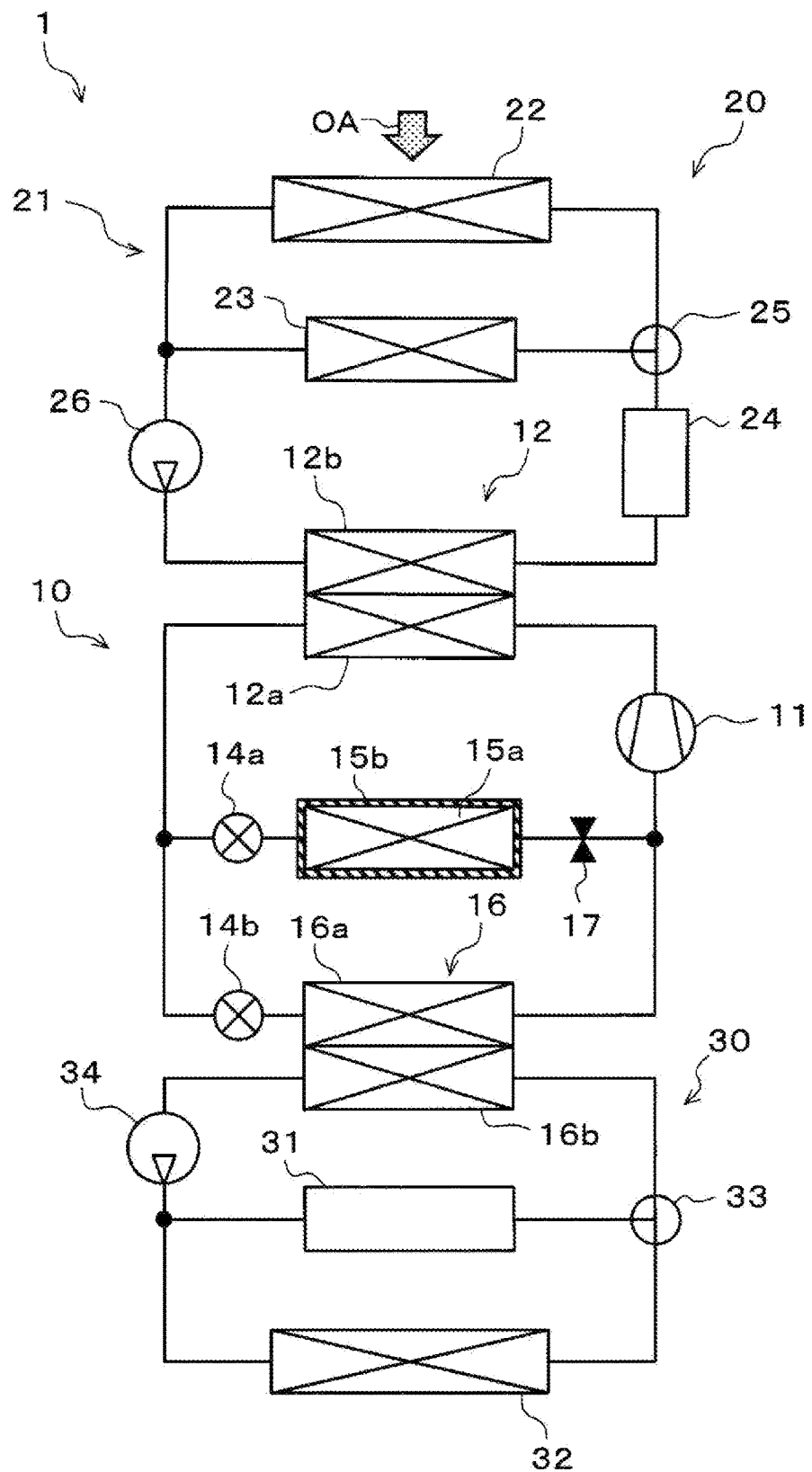
FIG. 17 is an overall configuration diagram of an air conditioner according to a ninth embodiment.

Next, a ninth embodiment different from the above-described embodiments will be described with reference to FIG. 17. The air conditioner 1 according to the ninth embodiment has a basic configuration similar to that of the air conditioner 1 according to the first embodiment, and a cold storage heat exchanger 15a is employed instead of the interior evaporator 15 of the first embodiment.

The cold storage heat exchanger 15a is an evaporator having a cold storage unit 15b that stores cold of the low-pressure refrigerant decompressed by the first expansion valve 14a, and is an example of a cooling evaporator. In FIG. 17, configurations of the cold storage heat exchanger 15a and the cold storage unit 15b are simplified.

The cold storage heat exchanger 15a has what is called a tank-and-tube heat exchanger structure, and includes a plurality of tubes through which the refrigerant flows, a tank for distributing or collecting the refrigerant flowing through the plurality of tubes, and the like.

The cold storage heat exchanger 15a exchanges heat between the refrigerant flowing through the tubes stacked at intervals in a certain direction and air flowing through an air passage formed between adjacent tubes. In the air passage formed between the plurality of tubes in the cold storage heat exchanger 15a, a fin for increasing a contact area with air supplied to the vehicle interior is disposed. The fin is formed by a plurality of corrugated fins, and is joined to two adjacent tubes by a joining material that is excellent in heat transfer.

The cold storage unit 15b is disposed inside an air passage formed between two adjacent tubes. The cold storage unit 15b accommodates, for example, inside a case made of metal such as aluminum or an aluminum alloy, a cold storage material that solidifies cold from the refrigerant to retain the cold, and melts the retained cold to release the cold to the outside. The case of the cold storage unit 15b is thermally joined to each tube between two adjacent tubes.

As the cold storage material, a phase transition material (PCM) whose phase transition temperature is adjusted to 0° C. or lower (specifically, the temperature is about −10° C.) can be employed. Further, as the cold storage material, a material obtained by adding a nonvolatile additive to water or alcohol, or the like may be employed.

According to the cold storage heat exchanger 15a configured as described above, in the air-cooling mode, the dehumidifying and heating mode, and the like, the blown air is cooled by the cold of the low-pressure refrigerant, and at the same time, the cold of the low-pressure refrigerant can be stored in the cold storage material of the cold storage unit 15b. That is, in the air conditioner 1 according to the ninth embodiment, by employing the cold storage heat exchanger 15a instead of the interior evaporator 15, cold stored at a time of cooling the blown air can be effectively used.

Here, the air conditioner 1 in which the normal interior evaporator 15 and the chiller 16 are connected in parallel in the heat pump cycle 10 will be considered. In this configuration, when cooling of the battery 31 using the chiller 16 is started while continuing cooling of the blown air in the interior evaporator 15, the refrigerant flow rate to flow into the interior evaporator 15 may temporarily decrease.

When the refrigerant flow rate with respect to the interior evaporator 15 decreases, the cooling capacity for the blown air also decreases, and thus the blown air temperature TAV detected by the blown air temperature sensor 52f also temporarily increases. Therefore, it is assumed that the comfort in the vehicle interior is impaired or a window is fogged.

In this regard, in the air conditioner 1 according to the ninth embodiment, the cold of the low-pressure refrigerant is stored in the cold storage unit 15b until immediately before the cooling of the battery 31 using the chiller 16 is started while continuing the cooling of the blown air in the cold storage heat exchanger 15a.

When the cooling of the battery 31 using the chiller 16 is started while continuing the cooling of the blown air in the cold storage heat exchanger 15a, the cooling performance for the blown air by the low-pressure refrigerant decreases, but this decrease can be compensated by the cooling of the blown air by the cold stored in the cold storage unit 15b.

In the air conditioner 1 according to the ninth embodiment, when the cooling of the blown air is continued, it is possible to suppress a transient increase in the blown air temperature when the cooling of the battery 31 is started, and to suppress a decrease in comfort in the vehicle interior.

As described above, in the air conditioner 1 according to the ninth embodiment, even when the cold storage heat exchanger 15a is employed as the air-conditioning evaporator that cools the blown air, it is possible to obtain the operation and effect exhibited from the configuration and operation common to the above-described embodiment as in the above-described embodiments.

Further, in the air conditioner 1 according to the ninth embodiment, when the cooling of the battery 31 using the chiller 16 is started while the cooling of the blown air in the interior evaporator 15 is continued, the cold stored in the cold storage unit 15b can be used to suppress a transient decrease in comfort.

Tenth Embodiment

Next, a tenth embodiment different from the above-described embodiments will be described with reference to FIG. 18. An air conditioner 1 according to the tenth embodiment has, for example, the same basic configuration as that of the air conditioner 1 according to the first embodiment, and is different in view of control when cooling the battery 31 using the chiller 16 and heating the blown air using the heat medium refrigerant heat exchanger 12 are performed.

Figure 18:
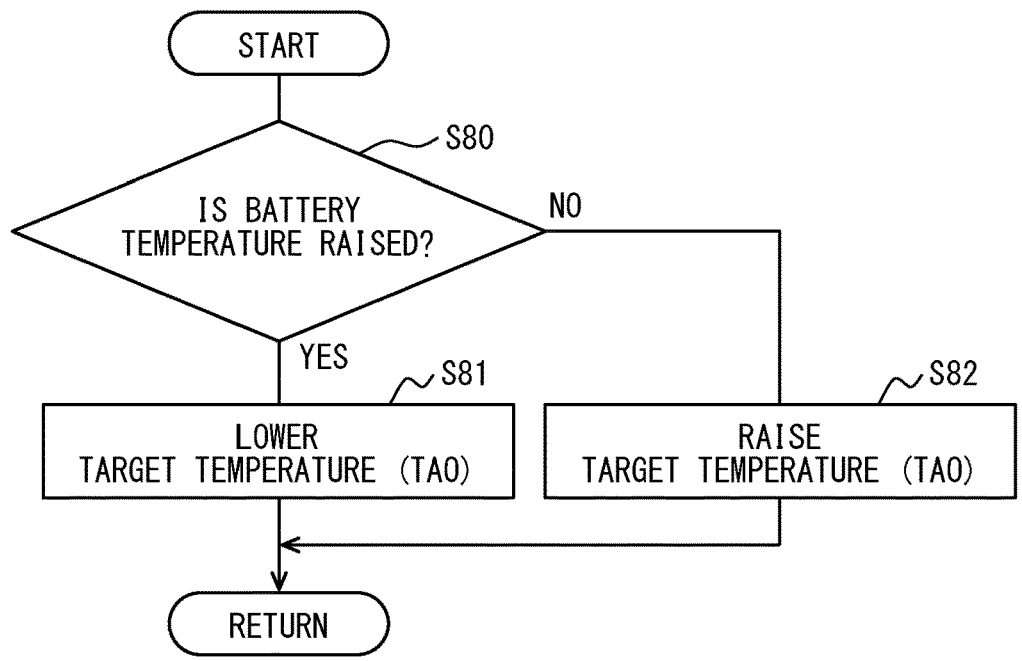
FIG. 18 is a flowchart of control processing related to setting of a target temperature in a cooling and heating mode of an air conditioner according to a tenth embodiment.

Specifically, in the tenth embodiment, when the cooling and heating mode or the cooling, dehumidifying, and heating mode is executed, the control device 50 executes a flowchart illustrated in FIG. 18. The control device 50 that executes the flowchart illustrated in FIG. 18 is an example of the target temperature setting unit 50d.

Here, the cooling and heating mode and the cooling, dehumidifying, and heating mode will be considered. In the cooling and heating mode and the cooling, dehumidifying, and heating mode, cooling of the battery 31 using the chiller 16 and heating of the blown air using the heat medium refrigerant heat exchanger 12 are performed in parallel. Therefore, it is necessary to appropriately adjust the temperature of the low-temperature side heat medium in the low-temperature side heat medium circuit 30, and at the same time, it is also necessary to adjust the temperature of the high-temperature side heat medium so that the blown air temperature TAV becomes an appropriate temperature.

When the temperature of the high-temperature side heat medium is adjusted to satisfy the demand for increasing the blown air temperature, a high pressure in the heat pump cycle 10 also increases. It is considered that when the high pressure is increased in the heat pump cycle 10, an enthalpy difference becomes small from balance of the refrigeration cycle, and the cooling performance for the low-temperature side heat medium tends to be insufficient.

In view of this point, the flowchart illustrated in FIG. 18 is executed by the control device 50 in the cooling and heating mode or the cooling, dehumidifying, and heating mode. When the cooling and heating mode or the cooling, dehumidifying, and heating mode is started, first, in step S80, it is determined whether or not the battery temperature TBA detected by the battery temperature sensor 52g has increased.

That is, in step S80, it is determined whether or not there is an increasing need to cool the battery 31 as the target device. When it is determined that the battery temperature TBA has increased, the processing proceeds to step S81, and when it is determined that the battery temperature TBA has not increased, the processing proceeds to step S82.

In step S81, since there is an increasing need to cool the battery 31 as the battery temperature TBA increases, the target blown air temperature TAO, which is a target value of the blown air temperature TAV, is set by decreasing. The target blown air temperature TAO is an example of the target temperature. By decreasing the target blown air temperature TAO, the high pressure in the heat pump cycle 10 can be lowered to secure the enthalpy difference, and the cooling performance of the battery 31 can be secured. After the target blown air temperature TAO is decreased, the control program in FIG. 18 is terminated.

On the other hand, in step S82, since the battery temperature TBA has not increased, it is considered that the need to cool the battery 31 is not so high. Therefore, the target blown air temperature TAO is set by increasing.

That is, by increasing the high pressure of heat pump cycle 10, the heating performance for the blown air is increased, and the cooling performance of the battery 31 is lowered. After the target blown air temperature TAO is increased, the control program of FIG. 18 is terminated. The control program illustrated in FIG. 18 is repeatedly executed while the cooling and heating mode or the cooling, dehumidifying, and heating mode is continued.

According to the tenth embodiment, by executing the control processing illustrated in FIG. 18 in the cooling and heating mode or the cooling, dehumidifying, and heating mode, the heating capacity for the blown air and the cooling capacity for the battery 31 can be appropriately adjusted according to a need for cooling the battery 31.

As described above, in the air conditioner 1 according to the tenth embodiment, even when the setting mode of the target blown air temperature TAO in the cooling and heating mode or the cooling, dehumidifying, and heating mode is changed, it is possible to similarly obtain the operation and effect exhibited from the configuration and operation common to the above-described embodiment.

Furthermore, in the air conditioner 1 according to the tenth embodiment, when the battery temperature TBA increases in the cooling and heating mode or the cooling, dehumidifying, and heating mode, the cooling performance of the battery 31 can be secured with preference to the comfort in the vehicle interior by lowering the target blown air temperature TAO.

Eleventh Embodiment

Next, an eleventh embodiment different from the above-described embodiments will be described with reference to FIG. 19. In the eleventh embodiment, the control content of the target temperature setting unit 50d in the eighteenth embodiment is changed.

Figure 19:
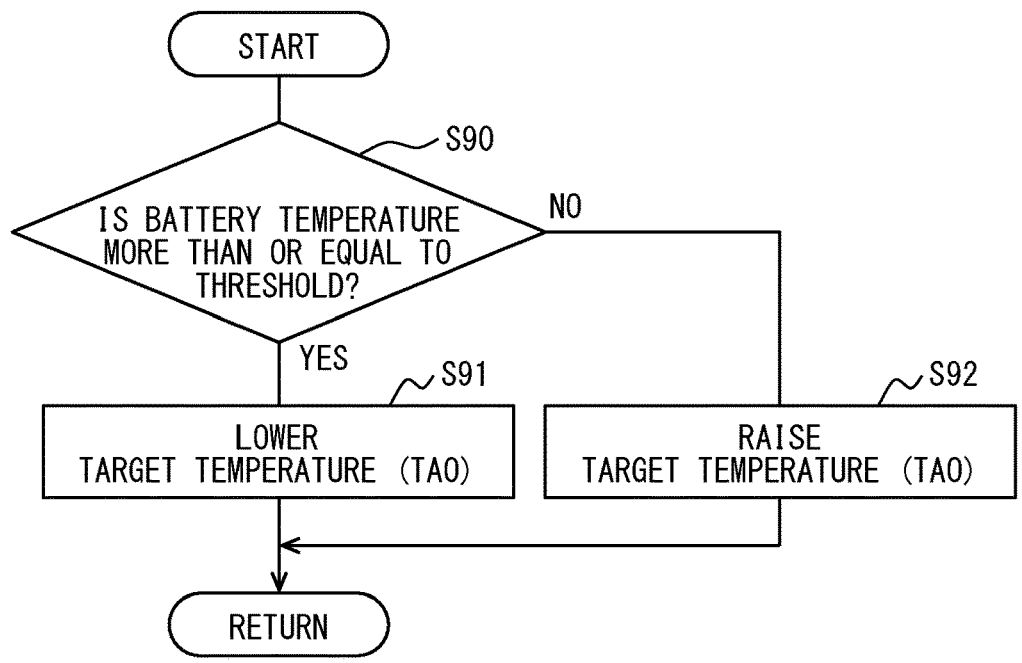
FIG. 19 is a flowchart of control processing related to setting of a target temperature in a cooling and heating mode of an air conditioner according to an eleventh embodiment.

In the eleventh embodiment, when the cooling and heating mode or the cooling, dehumidifying, and heating mode is executed, the control device 50 executes a flowchart illustrated in FIG. 19. The control device 50 that executes the flowchart illustrated in FIG. 19 is an example of the target temperature setting unit 50d.

The flowchart illustrated in FIG. 19 is executed by the control device 50 in the cooling and heating mode or the cooling, dehumidifying, and heating mode as in the tenth embodiment. When the cooling and heating mode or the cooling, dehumidifying, and heating mode is started, first, in step S90, it is determined whether or not the battery temperature TBA detected by the battery temperature sensor 52g is equal to or higher than a predetermined threshold. The threshold is determined so as to cause, for example, the battery temperature TBA to be higher than the reference battery temperature KTBA within the appropriate temperature range of the battery 31, and indicates a state where there is a high need for cooling the battery 31.

That is, in step S90, it is determined whether or not the need for cooling the battery 31, which is the target device, is equal to or higher than a reference. When it is determined that the battery temperature TBA is equal to or higher than the threshold, the processing proceeds to step S91, or when it is determined that the battery temperature TBA is not equal to or higher than the threshold, the processing proceeds to step S92.

In step S91, since the battery temperature TBA is equal to or higher than the threshold and the need for cooling the battery 31 exceeds the reference, the target blown air temperature TAO, which is the target value of the blown air temperature TAV, is set by decreasing. As in the tenth embodiment, by lowering the target blown air temperature TAO, the enthalpy difference in the heat pump cycle 10 can be secured, and the cooling performance of the battery 31 can be secured. After the target blown air temperature TAO is decreased, the control program in FIG. 19 is terminated.

On the other hand, in step S92, since the battery temperature TBA is lower than the threshold and the need for cooling the battery 31 is not so high, the target blown air temperature TAO is set by increasing. That is, by increasing the high pressure of heat pump cycle 10, the heating performance for the blown air is increased, and the cooling performance of the battery 31 is lowered. After the target blown air temperature TAO is increased, the control program of FIG. 19 is terminated. The control program illustrated in FIG. 19 is repeatedly executed while the cooling and heating mode or the cooling, dehumidifying, and heating mode is continued.

According to the eleventh embodiment, by executing the control processing illustrated in FIG. 19 in the cooling and heating mode or the cooling, dehumidifying, and heating mode, the heating capacity of the blown air and the cooling capacity for the battery 31 can be appropriately adjusted according to the necessity of cooling the battery 31.

As described above, in the air conditioner 1 according to the eleventh embodiment, even when the setting mode of the target blown air temperature TAO in the cooling and heating mode or the cooling, dehumidifying, and heating mode is changed, it is possible to similarly obtain the operation and effect exhibited from the configuration and operation common to the above-described embodiments.

Further, in the air conditioner 1 according to the eleventh embodiment, when the battery temperature TBA is equal to or higher than the threshold in the cooling and heating mode or the cooling, dehumidifying, and heating mode, the cooling performance of the battery 31 can be secured with preference to the comfort in the vehicle interior by lowering the target blown air temperature TAO.

Twelfth Embodiment

Figure 20:
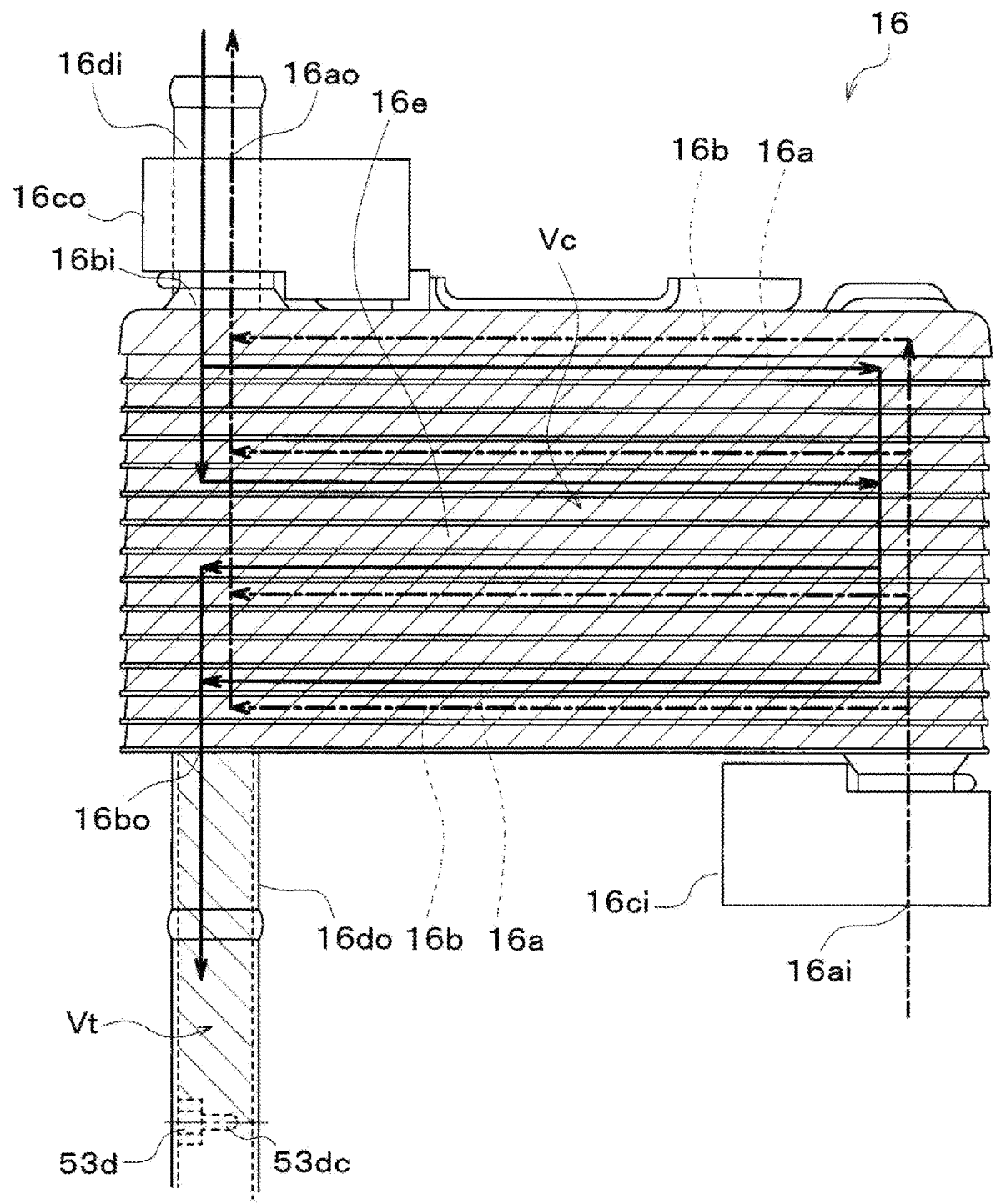
FIG. 20 is an explanatory view illustrating an example of a low-temperature sensor-side internal volume and a low-temperature side device internal volume according to a twelfth embodiment.
Figure 21:
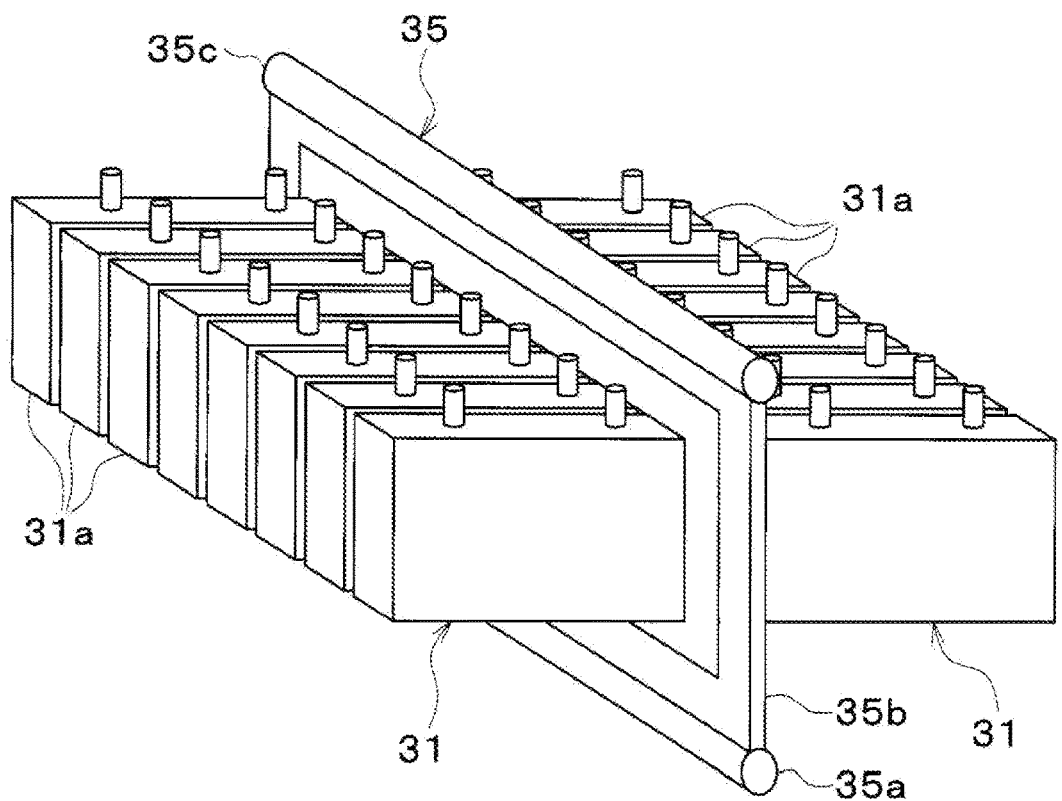
FIG. 21 is a perspective view illustrating a battery and a battery heat exchanger according to the twelfth embodiment.
Figure 22:
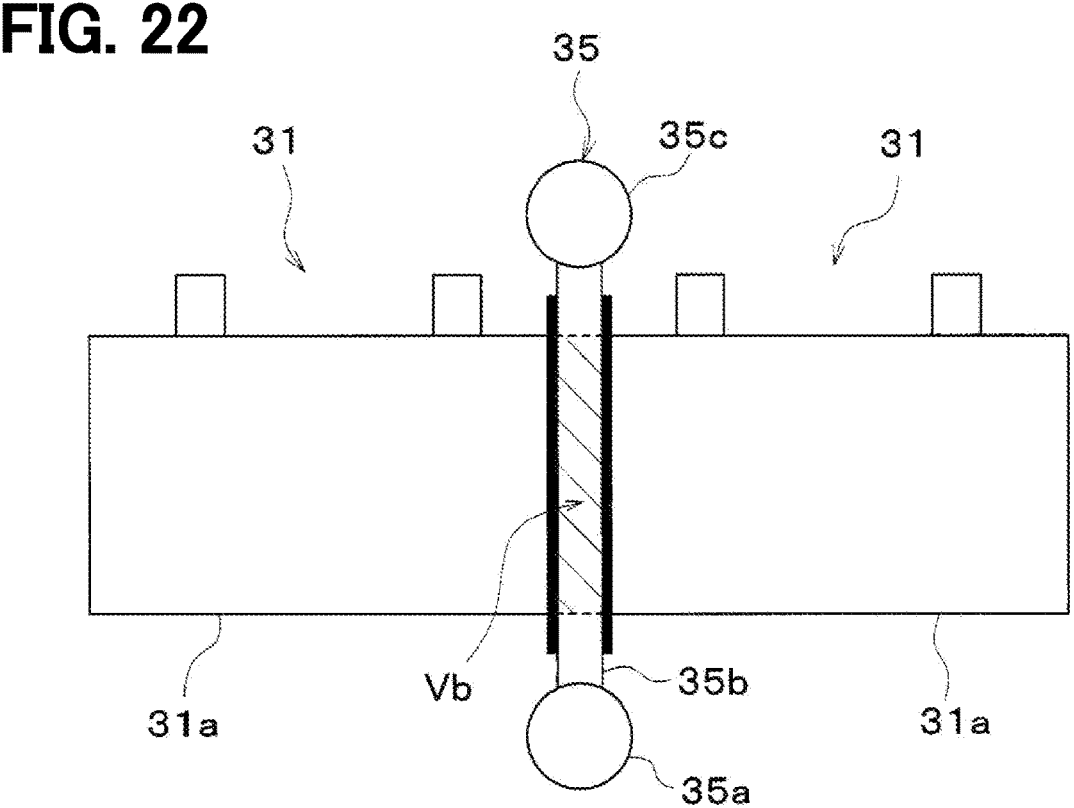
FIG. 22 is an explanatory view illustrating an example of a low-temperature side device internal volume according to the twelfth embodiment.

Next, a twelfth embodiment different from the above-described embodiments will be described with reference to FIGS. 20 to 22. In the twelfth embodiment, the arrangement position of the fourth heat medium temperature sensor 53d is specified from the relationship with an internal volume or the like of the chiller 16.

As described above, the fourth heat medium temperature sensor 53d is disposed at the outlet portion of the heat medium passage 16b of the chiller 16, and detects the temperature of the low-temperature side heat medium flowing out of the chiller 16. Accordingly, the fourth heat medium temperature sensor 53d corresponds to an example of a low-temperature side temperature sensor. The low-temperature side heat medium flowing out of the chiller 16 cools the battery 31 which is a target device of temperature adjustment.

Therefore, the arrangement position of the fourth heat medium temperature sensor 53d can be specified by an evaporator-side internal volume Vc related to the chiller 16, a low-temperature sensor-side internal volume Vt related to the fourth heat medium temperature sensor 53d, and a low-temperature side device internal volume Vb related to the battery 31.

First, the evaporator-side internal volume Vc will be described with reference to FIG. 20. Since the chiller 16 cools the low-temperature side heat medium to be measured by the fourth heat medium temperature sensor 53d, the evaporator-side internal volume Vc is considered to affect measurement accuracy of the fourth heat medium temperature sensor 53d.

The chiller 16 according to the twelfth embodiment is formed by what is called a stacked heat exchanger, and includes a heat exchange unit 16e in which a plurality of substantially flat plate-shaped heat transfer plates is stacked at intervals. In the heat exchange unit 16e of the chiller 16, a refrigerant passage 16a and a heat medium passage 16b are formed as in the above-described embodiments.

The refrigerant passage 16a allows the low-pressure refrigerant decompressed by the second expansion valve 14b to flow. The heat medium passage 16b allows the low-temperature side heat medium, which circulates in the low-temperature side heat medium circuit 30, to flow. Therefore, in the chiller 16, the low-pressure refrigerant can be evaporated by heat exchange between the low-pressure refrigerant flowing through the refrigerant passage 16a and the low-temperature side heat medium flowing through the heat medium passage 16b, and can absorb heat from the low-temperature side heat medium.

A refrigerant outflow port 16ao and a heat medium inflow port 16bi are formed in a surface (in FIG. 20, the upper surface) on one side of the heat exchange unit 16e of the chiller 16. On the other hand, a refrigerant inflow port 16ai and a heat medium outflow port 16bo are formed in a surface (In FIG. 20, an upper surface) on the other side of the heat exchange unit 16e.

The refrigerant inflow port 16ai constitutes one end side of the refrigerant passage 16a, and the refrigerant outflow port 16ao constitutes the other end side of the refrigerant passage 16a. That is, in the heat exchange unit 16e, the refrigerant flows into the refrigerant passage 16a from the refrigerant inflow port 16ai and flows out of the heat exchange unit 16e from the refrigerant outflow port 16ao.

A first joint 16ci is attached to the refrigerant inflow port 16ai. The first joint 16ci is a connection member for connecting a refrigerant pipe extending from an outflow port of the second expansion valve 14b. A second joint 16co is attached to the refrigerant outflow port 16ao. The second joint 16co is a connection member for connecting a refrigerant pipe extending toward a suction port of the compressor 11.

A first connection pipe 16di is attached to the heat medium inflow port 16bi. The first connection pipe 16di is a connection member for connecting a heat medium pipe extending from the discharge port of the low-temperature side pump 34 in the low-temperature side heat medium circuit 30. A second connection pipe 16do is attached to the heat medium outflow port 16bo. The second connection pipe 16do is a connection member for connecting a heat medium pipe extending toward a suction port of the low-temperature side pump 34 in the low-temperature side heat medium circuit 30.

Here, the evaporator-side internal volume Vc in the twelfth embodiment indicates an internal volume on the low-temperature side heat medium side in a region where the low-temperature side heat medium and the refrigerant can exchange heat via a constituent material of the heat exchange unit 16e. That is, the evaporator-side internal volume Vc in FIG. 20 is a region indicated by oblique hatching extending to the lower left, and can also be said to be an internal volume of the heat medium passage 16b formed inside the heat exchange unit 16e.

Next, the low-temperature sensor-side internal volume Vt will be described. Since the fourth heat medium temperature sensor 53d is a sensor that detects the temperature of the low-temperature side heat medium flowing out of the chiller 16, as illustrated in FIG. 20, the fourth heat medium temperature sensor 53d is attached to the second connection pipe 16do or a heat medium pipe connected to the second connection pipe 16do.

The low-temperature sensor-side internal volume Vt indicates an internal volume on a downstream side of the region where the low-temperature side heat medium and the refrigerant can exchange heat via the constituent material of the heat exchange unit 16e until the temperature is measured by the fourth heat medium temperature sensor 53d.

Therefore, the low-temperature sensor-side internal volume Vt in the twelfth embodiment indicates the internal volume indicated by the low-temperature side heat medium in the range from the heat medium outflow port 16bo of the chiller 16 to a position of a temperature measurement unit 53dc of the fourth heat medium temperature sensor 53d. That is, the low-temperature sensor-side internal volume Vt in FIG. 20 can be indicated by oblique hatching extending to the lower right.

Subsequently, the low-temperature side device internal volume Vb will be described. The low-temperature side device internal volume Vb means an internal volume occupied by the low-temperature side heat medium for cooling the battery 31 as a target of temperature adjustment. Here, in the twelfth embodiment, the battery heat exchanger 35 is disposed for adjusting the temperature of the battery 31, and the heat medium passage of the battery 31 means a space through which the low-temperature side heat medium flows inside the battery heat exchanger 35.

Configurations of the battery 31 and the battery heat exchanger 35 according to the twelfth exemplary embodiment and the low-temperature side device internal volume Vb will be described with reference to FIGS. 22 and 23. As illustrated in FIG. 22, the battery 31 includes an assembled battery in which a plurality of battery cells 31a is stacked and arranged, and these battery cells 31a are electrically connected in series or in parallel.

The battery heat exchanger 35 includes a heat medium inflow part 35a, a heat exchange unit 35b, and a heat medium outflow part 35c, and exchanges heat between the low-temperature side heat medium circulating in the low-temperature side heat medium circuit 30 and each battery cell 31a of the battery 31.

The heat exchange unit 35b of the battery heat exchanger 35 is formed of a material having good thermal conductivity, and internally has a space through which the low-temperature side heat medium flows. A side surface of the heat exchange unit 35b is formed in a planar shape, and is in contact with the side surface of each battery cell 31a constituting the battery 31 in a heat-exchangeable manner.

The heat medium inflow part 35a is disposed on one surface side (lower side in FIGS. 22 and 23) of the heat exchange unit 35b. The heat medium inflow part 35a is a portion that allows the low-temperature side heat medium to flow into the heat exchange unit 35b.

The heat medium outflow part 35c is disposed on the other surface side (upper side in FIGS. 22 and 23) of the heat exchange unit 35b. The heat medium outflow part 35c is a portion that causes the low-temperature side heat medium circuit 30 that has passed through the inside of the heat exchange unit 35b to flow out of the battery heat exchanger 35. Therefore, the heat medium passage in the battery heat exchanger 35 includes the heat medium inflow part 35a, the heat exchange unit 35b, and the heat medium outflow part 35c.

The low-temperature side device internal volume Vb indicates an internal volume of a region in which heat exchange can be performed between the target device of temperature adjustment (that is, the battery 31) and the low-temperature side heat medium. Therefore, the low-temperature side device internal volume Vb in the twelfth embodiment can be regarded as an internal volume occupied by the low-temperature side heat medium in a region in contact with the battery 31 in a heat-exchangeable manner in the heat exchange unit 35b of the battery heat exchanger 35.

Therefore, as indicated by hatching in FIG. 23, even in the internal space of the heat exchange unit 35b, a portion above or below the contact region with the battery 31 does not correspond to the low-temperature side device internal volume Vb.

In the twelfth embodiment, the fourth heat medium temperature sensor 53d is disposed such that the low-temperature sensor-side internal volume Vt is smaller than the low-temperature side device internal volume Vb in a heat medium pipe of the chiller 16 on the heat medium outflow port 16bo side.

A case where the cooling performance of the low-temperature side heat medium in the chiller 16 is adjusted according to the temperature of the low-temperature side heat medium detected by the fourth heat medium temperature sensor 53d will be considered. For example, when the low-temperature sensor-side internal volume Vt is larger than the low-temperature side device internal volume Vb, it is assumed that the fourth heat medium temperature sensor 53d detects a temperature rise of the low-temperature side heat medium. At this time, even if the cooling performance of the chiller 16 is improved, the low-temperature side heat medium in the battery heat exchanger 35 does not exist inside the chiller 16. Therefore, the adjustment of the cooling performance of the chiller 16 is hardly reflected in the temperature of the low-temperature side heat medium.

In this regard, if the low-temperature sensor-side internal volume Vt is arranged to be smaller than the low-temperature side device internal volume Vb, the low-temperature side heat medium that has been present inside the battery heat exchanger 35 exists in the chiller 16 at the time point when the fourth heat medium temperature sensor 53d has detected the temperature rise of the low-temperature side heat medium. Therefore, the adjustment of the cooling performance of the chiller 16 according to a detection result of the fourth heat medium temperature sensor 53d is easily reflected in the temperature of the low-temperature side heat medium, and the battery 31 can be efficiently cooled via the low-temperature side heat medium.

In the heat medium pipe on the heat medium outflow port 16bo side of the chiller 16, the fourth heat medium temperature sensor 53d is disposed such that the sum of the low-temperature sensor-side internal volume Vt and the evaporator-side internal volume Vc is smaller than the low-temperature side device internal volume Vb.

With such a configuration, at the time point when the temperature rise of the low-temperature side heat medium is detected by the fourth heat medium temperature sensor 53d, the inside of the chiller 16 is filled with the low-temperature side heat medium present in the battery heat exchanger 35. Therefore, the adjustment of the cooling performance of the chiller 16 according to the detection result of the fourth heat medium temperature sensor 53d is more easily reflected in the temperature of the low-temperature side heat medium, and the cooling efficiency of the battery 31 via the low-temperature side heat medium can be enhanced.

The fourth heat medium temperature sensor 53d is disposed such that the low-temperature sensor-side internal volume Vt is smaller than the evaporator-side internal volume Vc. With this configuration, the low-temperature side heat medium when detection is performed by the fourth heat medium temperature sensor 53d reliably exists inside the chiller 16. Thus, control hunting can be suppressed with respect to the control of the cooling performance of the chiller 16 using the detection result of the fourth heat medium temperature sensor 53d.

As described above, in the air conditioner 1 according to the twelfth embodiment, even in a case where the arrangement of the fourth heat medium temperature sensor 53d is limited, it is possible to obtain the operation and effect exhibited from the configuration and operation common to the above-described embodiment as in the above-described embodiments.

Furthermore, in the air conditioner 1 according to the twelfth embodiment, the fourth heat medium temperature sensor 53d is disposed such that the low-temperature sensor-side internal volume Vt is smaller than the low-temperature side device internal volume Vb, and thus the adjustment of the cooling performance of the chiller 16 can be easily reflected on the temperature of the low-temperature side heat medium. Thus, the air conditioner 1 according to the twelfth embodiment can efficiently cool the battery 31 via the low-temperature side heat medium.

In the air conditioner 1 according to the twelfth embodiment, the fourth heat medium temperature sensor 53d is disposed such that the sum of the low-temperature sensor-side internal volume Vt and the evaporator-side internal volume Vc is smaller than the low-temperature side device internal volume Vb. Thus, the adjustment of the cooling performance of the chiller 16 can be more easily reflected on the temperature of the low-temperature side heat medium, and the cooling efficiency of the battery 31 via the low-temperature side heat medium can be improved.

In the air conditioner 1 according to the twelfth embodiment, the fourth heat medium temperature sensor 53d is disposed so that the low-temperature sensor-side internal volume Vt is smaller than the evaporator-side internal volume Vc. Thus, the air conditioner 1 can suppress the control hunting with respect to the control of the cooling performance of the chiller 16 using the detection result of the fourth heat medium temperature sensor 53d.

Thirteenth Embodiment

Next, a thirteenth embodiment different from the above-described embodiments will be described with reference to FIGS. 23 and 24. The thirteenth embodiment has, for example, the same basic configuration as that of the air conditioner 1 of the first embodiment, and is different in view of control when cooling of the battery 31 using the chiller 16 is started.

Figure 23:
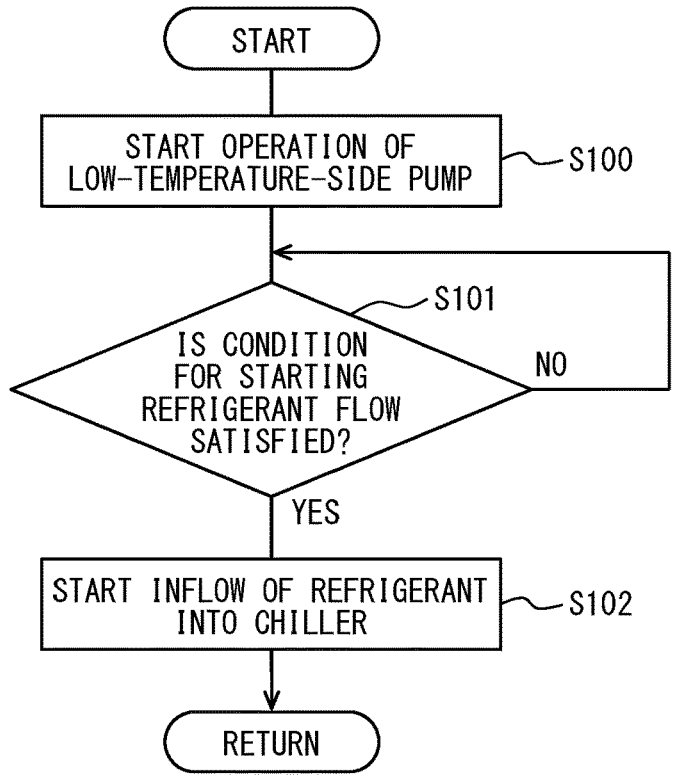
FIG. 23 is a flowchart of a control processing at start of cooling of a battery in an air conditioner according to a thirteenth embodiment.
Figure 24:
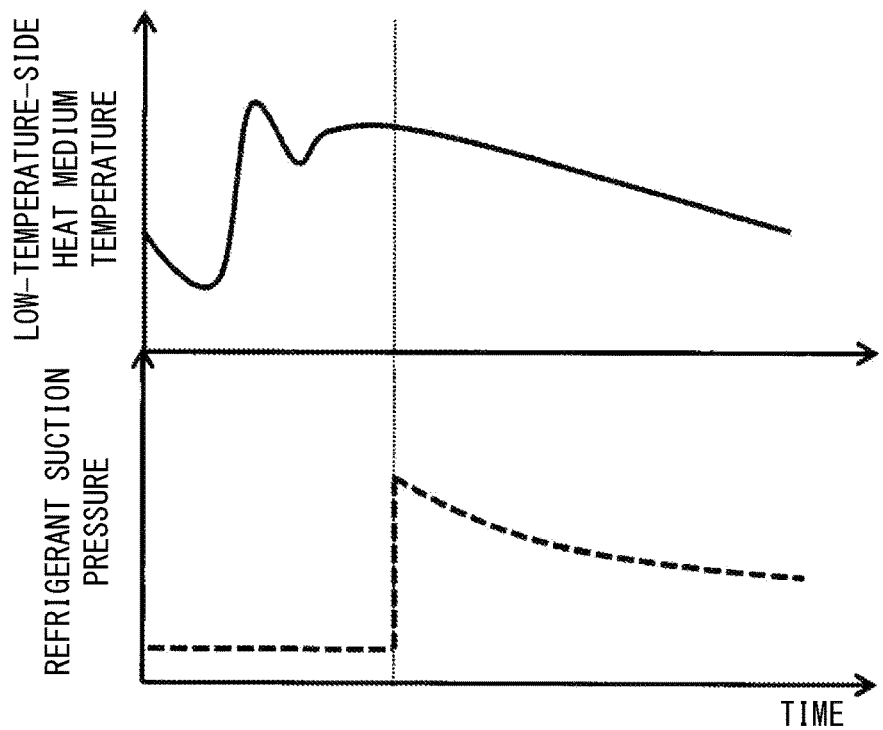
FIG. 24 is an explanatory diagram related to changes in a low-temperature side heat medium temperature and a refrigerant suction pressure at the start of cooling of the battery according to the thirteenth embodiment.

Specifically, in the thirteenth embodiment, the control device 50 executes a flowchart illustrated in FIG. 23 when the battery 31 is cooled using the chiller 16 in an environment where the outside temperature is extremely low. The control device 50 that executes the flowchart illustrated in FIG. 23 is an example of the device cooling control unit 50e.

It is also assumed that the battery 31 is cooled using the chiller 16 even in an environment where the outside temperature is extremely low. For example, when the battery 31 is rapidly charged in an extremely low temperature environment, heat is generated due to charging, and thus the battery 31 needs to be cooled.

At this time, since it is an environment where the outside air is at extremely low temperature, the temperature of the low-temperature side heat medium in the low-temperature side heat medium circuit 30 is also low. Therefore, if the cooling of the battery 31 is started as it is, it is assumed that sufficient performance cannot be exhibited. In addition, it is also assumed that the temperature of the refrigerant sucked into the compressor 11 is too low, and return of the refrigerating machine oil contained in the refrigerant is deteriorated, thereby affecting the operation of the compressor 11.

In view of these points, the air conditioner 1 according to the thirteenth embodiment executes the flowchart illustrated in FIG. 23 when the battery 31 is cooled in an environment where the outside temperature is extremely low. As illustrated in FIG. 23, first, in step S100, before the cooling of the battery 31 is started, the operation of the low-temperature side pump 34 is started before the heat pump cycle 10 is operated. Thus, in the low-temperature side heat medium circuit 30, the low-temperature side heat medium circulates through the battery 31 and the chiller 16.

In the low-temperature side heat medium circuit 30, since the low-temperature side heat medium circulates through the heat medium passage of the battery 31, the low-temperature side heat medium is heated by the heat generated in the battery 31. As illustrated in FIG. 24, the temperature of the low-temperature side heat medium fluctuates due to the heat generated in the battery 31 along with the circulation of the low-temperature side heat medium, and is stabilized at a higher temperature.

In step S101, it is determined whether or not a refrigerant circulation start condition is satisfied. The refrigerant circulation start condition means a condition for starting circulation of the low-pressure refrigerant in the refrigerant passage 16a of the chiller 16, and indicates that the temperature of the low-temperature side heat medium is stabilized at a temperature that is high to some extent.

As described above, along with the operation of the low-temperature side pump 34, the temperature of the low-temperature side heating medium is heated and stabilized by the heat generated in the battery 31. Therefore, in step S101, it is determined whether or not a predetermined circulation period has elapsed from start of operation of the low-temperature side pump 34. When it is determined that the circulation period has elapsed, it is considered that the temperature of the low-temperature side heat medium is stabilized in a state of being increased to some extent, and thus the processing proceeds to step S102. If not, the circulation of the low-temperature side heat medium in the low-temperature side heat medium circuit 30 is continued until the circulation period elapses.

In step S102, the operation of the compressor 11 is started, and inflow of the low-pressure refrigerant into the chiller 16 is started. At the time point when the processing proceeds to step S102, the low-temperature side heat medium flowing into the chiller 16 is warmed to some extent. Therefore, by starting the operation of the compressor 11 in this state, the refrigerant pressure on the low-pressure side in the refrigeration cycle can be increased to some extent. Thus, the cooling performance at an initial stage can be improved regarding the cooling of the battery 31 using the chiller 16 in a cryogenic environment.

In step S102, another mode may be employed as long as inflow of the low-pressure refrigerant into the chiller 16 can be started. That is, the present disclosure is not limited to the mode in which the operation of the compressor 11 is started. The processing may proceed to step S102 while the compressor 11 is already in operation, and in step S102, the second expansion valve 14b may be switched from the fully closed state to a throttling state.

As described above, in the air conditioner 1 according to the thirteenth embodiment, even in a case where the operation at the start of cooling the battery 31 in the cryogenic environment is changed, it is possible to obtain the operation and effect exhibited from the configuration and operation common to the above-described embodiment as in the above-described embodiments.

First Modification of Thirteenth Embodiment

In step S101 in the thirteenth embodiment, it is determined that the refrigerant circulation start condition is satisfied by the elapse of the circulation period, but the present disclosure is not limited to this mode. For example, as the refrigerant circulation start condition, it is also possible to employ a condition that fluctuation in the temperature of the low-temperature side heat medium detected by the fourth heat medium temperature sensor 53d falls within a predetermined range.

The fact that the temperature fluctuation of the low-temperature side heat medium falls within the predetermined range indicates a state in which the low-temperature side heat medium is warmed to some extent by the heat generated in the battery 31. Therefore, even when the refrigerant circulation start condition having this content is employed, a similar effect to that of the above-described thirteenth embodiment can be obtained.

Second Modification of Thirteenth Embodiment

Furthermore, as the refrigerant circulation start condition in step S101, a condition that the temperature of the low-temperature side heat medium detected by the fourth heat medium temperature sensor 53d is higher than a predetermined reference value may be employed.

When the refrigerant circulation start condition is employed, the temperature of the low-temperature side heat medium is higher than the reference value, so that the refrigerant pressure on the low-pressure side in the heat pump cycle 10 can be increased to within an assured temperature. Consequently, it is possible to ensure performance at the initial stage regarding the cooling of the battery 31 in a cryogenic environment as in the thirteenth embodiment.

Fourteenth Embodiment

Next, a fourteenth embodiment different from the above-described embodiments will be described with reference to FIG. 25. In the fourteenth embodiment, the configurations of the high-temperature side heat medium circuit 21 and the low-temperature side heat medium circuit 30 are changed from those of the above-described embodiment. In the high-temperature side heat medium circuit 21, a sixth heat medium temperature sensor 53f that detects the temperature of the high-temperature side heat medium flowing out of the heat medium refrigerant heat exchanger 12 is disposed.

Figure 25:
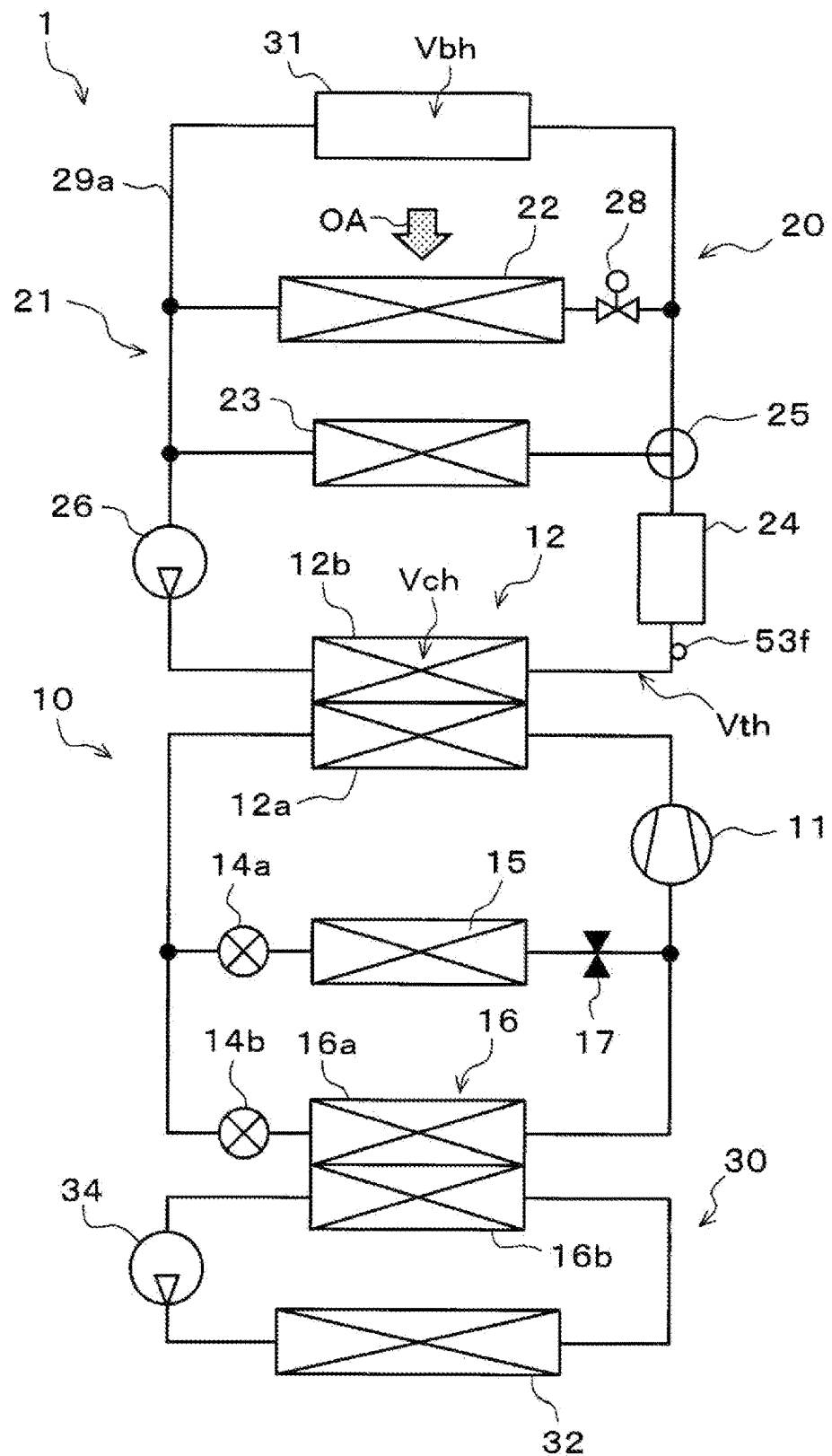
FIG. 25 is an overall configuration diagram of an air conditioner according to a fourteenth embodiment.

As illustrated in FIG. 25, the high-temperature side heat medium circuit 21 in the fourteenth embodiment is formed by connecting the battery 31 to the high-temperature side heat medium circuit 21 in the first embodiment via a warm-up passage 29a. One end side of the warm-up passage 29a is connected to the heat medium passage connecting the remaining inflow-outflow port of the high-temperature side flow rate control valve 25 and the inflow port of the radiator 22. The other end side of the warm-up passage 29a is connected to the heat medium passage connecting the outflow port of the radiator 22 and the suction port of the high-temperature side pump 26.

The heat medium passage of the battery 31 is connected to the warm-up passage 29a. The configurations of the battery 31 and the heat medium passages of the battery 31 are similar to those of the above-described embodiments. That is, the battery 31 is connected to be temperature-adjustable by the high-temperature side heat medium. Therefore, in the high-temperature side heat medium circuit 21 of the fourteenth embodiment, the radiator 22, the heater core 23, and the battery 31 are connected in parallel with respect to the flow of the high-temperature side heat medium passing through the heat medium passage 12b of the heat medium refrigerant heat exchanger 12.

A radiator on-off valve 28 is disposed on the inflow port side of the radiator 22. As in the above-described embodiment, the radiator on-off valve 28 is formed by an on-off valve, and switches whether or not the high-temperature side heat medium flows into the radiator 22. The low-temperature side heat medium circuit 30 of the fourteenth embodiment is formed by connecting the heat medium passage 16b of the chiller 16, the low-temperature side pump 34, and the outside air heat exchanger 32.

The air conditioner 1 according to the fourteenth embodiment configured as described above can execute a warm-up mode for warming up the battery 31. In the warm-up mode, the battery 31 is heated and warmed up via the high-temperature side heat medium using heat of the high-pressure refrigerant of the heat pump cycle 10 as a heat source.

Specifically, the operation in the warm-up mode will be described. The heat pump cycle 10 operates in a predetermined operation mode so that the high-temperature side heat medium can be heated by the heat of the high-pressure refrigerant in the heat medium refrigerant heat exchanger 12.

In the high-temperature side heat medium circuit 21, the control device 50 causes the high-temperature side pump 26 to operate and closes the radiator on-off valve 28. In the high-temperature side flow rate control valve 25, the control device 50 causes the inflow-outflow port on the electric heater 24 side and the inflow-outflow port on the radiator 22 side to communicate with each other, and simultaneously closes the inflow-outflow port on the heater core 23 side.

Accordingly, in the warm-up mode in the fourteenth embodiment, the high-temperature side heat medium flows and circulates in the order of the high-temperature side pump 26, the heat medium refrigerant heat exchanger 12, the electric heater 24, the high-temperature side flow rate control valve 25, the battery 31, and the high-temperature side pump 26.

That is, the high-temperature side heat medium discharged from the high-temperature side pump 26 is heated by heat exchange with the high-pressure refrigerant in the process of passing through the heat medium refrigerant heat exchanger 12. The high-temperature side heat medium heated by the heat of the high-pressure refrigerant passes through the electric heater 24 and the high-temperature side flow rate control valve 25, and flows into the heat medium passage of the battery 31. Since the high-temperature side heat medium exchanges heat with the battery 31 while passing through the heat medium passage of the battery 31, the air conditioner 1 can warm up the battery 31 via the high-temperature side heat medium.

Here, in the warm-up mode of the fourteenth embodiment, the control device 50 adjusts the refrigerant discharge capacity of the compressor 11 according to the temperature of the high-temperature side heat medium flowing out of the heat medium refrigerant heat exchanger 12. Therefore, as illustrated in FIG. 25, a sixth heat medium temperature sensor 53f is disposed on an outlet side of the heat medium passage 12b in the heat medium refrigerant heat exchanger 12 to detect the temperature of the high-temperature side heat medium flowing out of the heat medium refrigerant heat exchanger 12. The sixth heat medium temperature sensor 53f corresponds to an example of a high-temperature side temperature sensor.

As in the above-described twelfth embodiment, the arrangement position of the sixth heat medium temperature sensor 53f can be specified using a high-temperature sensor side internal volume Vth, a high-temperature side device internal volume Vbh, and a condenser side internal volume Vch. The high-temperature sensor side internal volume Vth, the high-temperature side device internal volume Vbh, and the condenser side internal volume Vch can be defined as in the twelfth embodiment.

The condenser side internal volume Vch in the fourteenth embodiment means an internal volume on the high-temperature side heat medium side in a region where the high-temperature side heat medium and the refrigerant can exchange heat via the constituent material of the heat exchange unit in the heat medium refrigerant heat exchanger 12.

The high-temperature sensor side internal volume Vth in the fourteenth embodiment means an internal volume from the outlet of the heat medium passage 12b to a temperature measurement unit of the sixth heat medium temperature sensor 53f on the downstream side of an outlet of the heat medium passage 12b in the heat medium refrigerant heat exchanger 12. The high-temperature side device internal volume Vbh means an internal volume occupied by the high-temperature side heat medium for heating the battery 31 as a target device of temperature adjustment in a warm-up mode.

In the fourteenth embodiment, the sixth heat medium temperature sensor 53f is disposed such that the high-temperature sensor side internal volume Vth is smaller than the high-temperature side device internal volume Vbh on the outlet side of the heat medium passage 12b of the heat medium refrigerant heat exchanger 12.

In the warm-up mode of the fourteenth embodiment, the refrigerant discharge capacity of the compressor 11 is changed according to the temperature of the high-temperature side heat medium detected by the sixth heat medium temperature sensor 53f to adjust the heating performance of the high-temperature side heat medium in the heat medium refrigerant heat exchanger 12.

For this reason, when the high-temperature sensor side internal volume Vth is arranged to be smaller than the high-temperature side device internal volume Vbh, the high-temperature side heat medium in the battery heat exchanger 35 exists inside the heat medium refrigerant heat exchanger 12 at a time point when a temperature rise of the high-temperature side heat medium is detected by the sixth heat medium temperature sensor 53f. Therefore, the adjustment of the heating performance of the heat medium refrigerant heat exchanger 12 according to a detection result of the sixth heat medium temperature sensor 53f is easily reflected on the temperature of the high-temperature side heat medium, and the battery 31 can be efficiently warmed up via the high-temperature side heat medium.

Further, the sixth heat medium temperature sensor 53f is disposed in the heat medium pipe on the outlet side in the heat medium passage 12b of the heat medium refrigerant heat exchanger 12 such that the sum of the high-temperature sensor side internal volume Vth and the condenser side internal volume Vch is smaller than the high-temperature side device internal volume Vbh.

With such a configuration, at a time point when a temperature change of the high-temperature side heat medium is detected by the sixth heat medium temperature sensor 53f, the inside of the heat medium refrigerant heat exchanger 12 is filled with the high-temperature side heat medium in the battery heat exchanger 35. Therefore, the adjustment of the heating performance of the heat medium refrigerant heat exchanger 12 according to a detection result of the sixth heat medium temperature sensor 53f is more easily reflected on the temperature of the high-temperature side heat medium, and the efficiency of warm-up of the battery 31 via the high-temperature side heat medium can be enhanced.

The sixth heat medium temperature sensor 53f is disposed such that the high-temperature sensor side internal volume Vth is smaller than the condenser side internal volume Vch. With this configuration, the high-temperature side heat medium when detection is performed by the sixth heat medium temperature sensor 53f reliably exists inside the heat medium refrigerant heat exchanger 12. Thus, the control hunting can be suppressed with respect to the control of the heating performance of the heat medium refrigerant heat exchanger 12 using the detection result of the sixth heat medium temperature sensor 53f.

As described above, in the air conditioner 1 according to the fourteenth embodiment, it is possible to obtain the operation and effect exhibited from the configuration and operation common to the above-described embodiment as in the above-described embodiments. In the air conditioner 1 according to the fourteenth embodiment, the sixth heat medium temperature sensor 53f is disposed such that the high-temperature sensor side internal volume Vth is smaller than the high-temperature side device internal volume Vbh. Thus, the air conditioner 1 of the fourteenth embodiment can easily reflect the adjustment of the heating performance of the heat medium refrigerant heat exchanger 12 in the warm-up mode on the temperature of the high-temperature side heat medium. Thus, the air conditioner 1 according to the fourteenth embodiment can efficiently warm up the battery 31 via the high-temperature side heat medium.

In the air conditioner 1 according to the fourteenth embodiment, the sixth heat medium temperature sensor 53f is disposed such that the sum of the high-temperature sensor side internal volume Vth and the condenser side internal volume Vch is smaller than the high-temperature side device internal volume Vbh. Thus, the adjustment of the heating performance of the heat medium refrigerant heat exchanger 12 in the warm-up mode can be more easily reflected on the temperature of the high-temperature side heat medium, and the efficiency of the warm-up of the battery 31 through the high-temperature side heat medium can be improved.

In the air conditioner 1 according to the fourteenth embodiment, the sixth heat medium temperature sensor 53f is disposed such that the high-temperature sensor side internal volume Vth is smaller than the condenser side internal volume Vch. Thus, the air conditioner 1 can suppress the control hunting with respect to the control of the heating performance of the heat medium refrigerant heat exchanger 12 using the detection result of the sixth heat medium temperature sensor 53f.

The present disclosure is not limited to the above-described embodiments, and can be variously modified as follows without departing from the gist of the present disclosure.

The above-described embodiments employ a configuration in which, as the heat pump cycle 10, the first expansion valve 14a and the interior evaporator 15, and the second expansion valve 14b and the chiller 16 are connected in parallel, but the present disclosure is not limited to this aspect.

The heat pump cycle 10 in the present disclosure is only required to include at least a decompression unit and an evaporator (for example, the second expansion valve 14b and the chiller 16) for absorbing heat from the low-temperature side heat medium circuit 30, and other configurations can be appropriately changed.

For example, a configuration may be employed in which the first expansion valve 14a and the interior evaporator 15 are removed from the configuration of the heat pump cycle 10 of the above-described embodiments, or a configuration may be employed in which a heat absorber different from the interior evaporator 15 and the chiller 16 is connected in parallel with these components. In the heat pump cycle 10, the interior evaporator 15 and the chiller 16 may be connected in series.

In the above-described embodiment, electric expansion valves are employed as the first expansion valve 14a and the second expansion valve 14b, but the present disclosure is not limited to this aspect. Various modes can be employed as long as the high-pressure refrigerant can be decompressed in the heat pump cycle 10. For example, while the second expansion valve 14b is kept to be the electric expansion valve, the first expansion valve 14a may be changed to a thermal expansion valve.

Although the heat medium refrigerant heat exchanger 12 is employed as the condenser in the present disclosure, the present disclosure is not limited to the above-described configuration. Specifically, as the condenser in the present disclosure, it is also possible to employ a sub-cool type condenser having a heat exchange unit, a receiver unit, and a subcooling portion.

In the above-described embodiments, various aspects are employed as the configuration of the heat dissipation amount adjustment unit in the high-temperature side heat medium circuit 21, but a different aspect may be employed. For example, in the first embodiment and the like described above, the heat dissipation amount in the radiator 22 and the heat dissipation amount in the heater core 23 are adjusted by the opening degrees of the outflow ports for the radiator 22 and the heater core 23, but the present disclosure is not limited to this aspect.

A configuration may be employed in which the heat dissipation amount in the radiator 22 and the heat dissipation amount in the heater core 23 are adjusted by the ratio of a time during which the outflow ports for the radiator 22 and the heater core 23 are in an open state to a time during which the outflow ports are in a closed state. At this time, a three-way valve such as the high-temperature side flow rate control valve 25 in the first embodiment may be employed, or a configuration in which an on-off valve is disposed on each of the radiator 22 side and the heater core 23 side may be employed.

In the embodiment described above, an excess, insufficiency, and the like with respect to the target temperature are determined using the blown air temperature detected by the blown air temperature sensor 52f, but the present disclosure is not limited to this mode.

Determination processing similar to that of the above-described embodiment can be performed as long as it is a physical quantity having a correlation with the temperature of the blown air supplied to the air conditioning target space. For example, the temperature of the high-temperature side heat medium on the inlet side of the heater core 23 detected by the third heat medium temperature sensor 53c may be employed. A refrigerant temperature on the high pressure side in the heat pump cycle 10 can also be employed. It is also possible to employ a refrigerant pressure on the high pressure side in the heat pump cycle 10 or a saturation temperature estimated from the refrigerant pressure on the high pressure side.

Further, in the above-described embodiments, the battery 31 is employed as the heat generation device in the present disclosure, but the present disclosure is not limited to this aspect. As the heat generation device in the present disclosure, various devices can be employed as long as the devices are mounted on a vehicle and secondarily generate heat along with operation for exhibiting a predetermined function.

For example, an inverter, a motor generator, a charger, constituent devices of an advanced driving assistance system, and the like can be employed as the heat generation device. The inverter is a power conversion unit that converts a direct current into an alternating current. Then, the motor generator outputs driving force for traveling by being supplied with electric power, and generates regenerative electric power at the time of deceleration or the like.

The charger is a charger that charges the battery 31 with electric power. The constituent devices of the advanced driving support system are constituent devices of a system developed for automating, adapting, and enhancing the vehicle system for safe and better driving, and can include a control device and the like of this system.

Although the present disclosure has been described in accordance with embodiments, it is understood that the present disclosure is not limited to such embodiments or structures. The present disclosure encompasses various modifications and variations within the scope of equivalents. In addition, while the various combinations and configurations, which are preferred, other combinations and configurations, including more, less or only a single element, are also within the spirit and scope of the present disclosure.

What is claimed is:

1. An air conditioner comprising:
  a heat pump cycle including a compressor that compresses and discharges a refrigerant, a condenser that condenses a high-pressure refrigerant compressed by the compressor by heat exchange, a decompression unit that decompresses the refrigerant flowing out of the condenser, and an evaporator that exchanges heat between a low-pressure refrigerant decompressed by the decompression unit and a low-temperature side heat medium to evaporate the refrigerant;
  a heating unit including a heating heat exchanger that heats blown air to be blown into an air conditioning target space using heat of the high-pressure refrigerant as a heat source, an outside air radiator that dissipates heat from a high-temperature side heat medium to outside air, and a heat dissipation amount adjustment unit that adjusts a heat dissipation amount of the heat of the high-temperature side heat medium dissipated to the outside air by the outside air radiator;
  a low-temperature side heat medium circuit configured such that the low-temperature side heat medium from which heat is absorbed by heat exchange in the evaporator circulates, and including a heat generation device arranged to be coolable by heat exchange with the low-temperature side heat medium; and
  a microcomputer that controls operation of the heat dissipation amount adjustment unit, wherein
  the microcomputer adjusts a heat dissipation amount in the outside air radiator by the heat dissipation amount adjustment unit such that a blown air temperature of the blown air heated by the heating heat exchanger approaches a predetermined target temperature,
  the condenser condenses the high-pressure refrigerant by exchanging heat between the high-temperature side heat medium and the high-pressure refrigerant,
  the heating unit has a high-temperature side heat medium circuit including:
    the heating heat exchanger through which the high-temperature side heat medium heated by heat exchange in the condenser circulates and heats the blown air by dissipating the heat of the high-temperature side heat medium to the blown air;
    the outside air radiator connected in parallel with the heating heat exchanger to dissipate the heat of the high-temperature side heat medium to the outside air; and
    the heat dissipation amount adjustment unit that adjusts a heat dissipation amount in the heating heat exchanger and the heat dissipation amount in the outside air radiator,
  the high-temperature side heat medium circuit includes a heating device that is capable of heating the high-temperature side heat medium,
  the heat dissipation amount adjustment unit is located between the heating device and the heating heat exchanger in a flowing direction of the high-temperature side heat medium, and
  the microcomputer adjusts an amount of heat generated by the heating device such that the blown air temperature approaches the predetermined target temperature.

2. The air conditioner according to claim 1, wherein the microcomputer starts adjustment of the heat dissipation amount in the outside air radiator by the heat dissipation amount adjustment unit when the blown air temperature is excessive with respect to the predetermined target temperature.

3. The air conditioner according to claim 1, wherein a heat exchange capacity of the outside air radiator is higher than a heat exchange capacity of the heating heat exchanger.

4. The air conditioner according to claim 1, wherein the heat dissipation amount adjustment unit includes a flow rate adjusting valve that continuously adjusts a flow rate ratio between a flow rate of the high-temperature side heat medium with respect to the heating heat exchanger and a flow rate of the high-temperature side heat medium with respect to the outside air radiator in the high-temperature side heat medium circuit.

5. The air conditioner according to claim 1, wherein the microcomputer starts heating the high-temperature side heat medium by the heating device when the blown air temperature is insufficient with respect to the predetermined target temperature.

6. The air conditioner according to claim 1, wherein the microcomputer starts heating the high-temperature side heat medium by the heating device in a state where the heat dissipation amount in the outside air radiator is reduced to be equal to or less than a predetermined reference by the heat dissipation amount adjustment unit, and in a case where the blown air temperature is insufficient with respect to the predetermined target temperature.

7. The air conditioner according to claim 1, wherein the microcomputer starts adjustment of the heat dissipation amount of the outside air radiator by the heat dissipation amount adjustment unit in a state where the amount of heat generated by the heating device is equal to or less than a predetermined threshold and in a case where the blown air temperature is higher than an upper limit value of to the predetermined target temperature.

8. The air conditioner according to claim 1, wherein
the low-temperature side heat medium circuit includes an outside air heat exchanger that exchanges heat between the low-temperature side heat medium and the outside air, and a heat exchange amount adjustment unit that adjusts a heat exchange amount in the heat generation device and a heat exchange amount in the outside air heat exchanger,
the air conditioner further includes a heat exchange amount adjustment control unit that controls operation of the heat exchange amount adjustment unit, and
the heat exchange amount adjustment control unit adjusts the heat exchange amount in the outside air heat exchanger such that the blown air temperature approaches the target temperature in a state where a cooling capacity by heat exchange between the heat generation device and the low-temperature side heat medium is maintained.

9. The air conditioner according to claim 1, wherein
the heating device is arranged in the high-temperature side heat medium circuit.

10. The air conditioner according to claim 1, wherein
the heating device is arranged between the heat dissipation amount adjustment unit and the condenser in the high-temperature side heat medium circuit.

11. The air conditioner according to claim 1, wherein
the outside air radiator and the heating heat exchanger are arranged parallel with each other at a downstream side of the heat dissipation amount adjustment unit.

\* \* \* \* \*